(12) United States Patent
Son et al.

(10) Patent No.: US 12,051,794 B2
(45) Date of Patent: Jul. 30, 2024

(54) STRETCHABLE ELECTRODE, MANUFACTURING METHOD THEREOF, AND STRETCHABLE BATTERY COMPRISING STRETCHABLE ELECTRODE

(71) Applicant: KOREA INSTITUTE OF SCIENCE AND TECHNOLOGY, Seoul (KR)

(72) Inventors: Jeong Gon Son, Seoul (KR); Jong Hyuk Park, Seoul (KR); Sang-Soo Lee, Seoul (KR); Heesuk Kim, Seoul (KR); Seungjun Chung, Seoul (KR); Tae Ann Kim, Seoul (KR); Jae Hong Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 56 days.

(21) Appl. No.: 17/873,598

(22) Filed: Jul. 26, 2022

(65) Prior Publication Data
US 2023/0216017 A1   Jul. 6, 2023

(30) Foreign Application Priority Data
Dec. 30, 2021   (KR) .................. 10-2021-0192266

(51) Int. Cl.
*H01M 4/04*   (2006.01)
*H01M 10/0525*   (2010.01)

(52) U.S. Cl.
CPC ...... *H01M 4/0404* (2013.01); *H01M 10/0525* (2013.01)

(58) Field of Classification Search
CPC ..................................................... H01M 4/04
See application file for complete search history.

(56) References Cited

U.S. PATENT DOCUMENTS

| | | |
|---|---|---|
| 2019/0334168 A1 | 10/2019 | Durstock et al. |
| 2020/0243862 A1 | 7/2020 | Hosoda et al. |

FOREIGN PATENT DOCUMENTS

| | | |
|---|---|---|
| KR | 10-2015-0134773 A | 12/2015 |
| KR | 10-2021-0105991 A | 8/2021 |
| WO | WO 2018/049158 A1 | 3/2018 |

OTHER PUBLICATIONS

Teow, Yeit Haan, et al. "Hydroxyl functionalized PVDF-TiO2 ultrafiltration membrane and its antifouling properties." Journal of Applied Polymer Science 132.21, 2015, (11 pages).

*Primary Examiner* — Austin Murata
(74) *Attorney, Agent, or Firm* — NSIP Law

(57) ABSTRACT

The present disclosure relates to a stretchable electrode, a method for preparing the same and a stretchable battery including the stretchable electrode. The stretchable electrode of the present disclosure, which is prepared by crosslinking a hydroxyl-functionalized fluorine-based polymer binder physically using a ketone-based solvent or chemically with a crosslinking agent, has superior stretchability, has improved interfacial adhesivity to an active material through Fenton's oxidation, exhibits improved stability under various mechanical deformations of the electrode such as stretching, etc. and can uniformly maintain the electrical conductivity, battery capacity and charge-discharge performance of the electrode.

In addition, the stretchable battery of the present disclosure, which includes the stretchable electrode, a stretchable current collector, a stretchable separator and a stretchable encapsulant, has improved stretchability and superior battery stability under various deformations due to high degree of freedom of structures and materials. In addition, the stretchable battery of the present disclosure can be prepared as a fiber battery by printing an electrode and a current collector sequentially on both sides of a stretchable fabric, which can be worn, e.g., around sleeves due to superior stretchability and high structural degree of freedom and retains high battery performance and mechanical stability even under mechanical deformation. Therefore, it can be applied to a mobile display for a health monitoring system or a smartwatch.

17 Claims, 31 Drawing Sheets

STRETCHABLE ELECTRODE, MANUFACTURING METHOD THEREOF, AND STRETCHABLE BATTERY COMPRISING STRETCHABLE ELECTRODE

CROSS-REFERENCE TO RELATED APPLICATION

This application claims priority to Korean Patent Application No. 10-2021-0192266 filed on Dec. 30, 2021 and all the benefits accruing therefrom under 35 U.S.C. § 119, the contents of which in its entirety are herein incorporated by reference.

BACKGROUND

1. Field

The present disclosure relates to a stretchable electrode having superior stretchability and exhibiting superior electrical conductivity, battery capacity and charge-discharge performance due to improved interfacial adhesivity to an active material, a method for preparing the same, and a stretchable battery including the stretchable electrode.

2. Description of the Related Art

Wearable and implantable electronic devices are drawing significant interests due to wide potential applications such as electronic skin, implantable health monitoring and soft robotics for augmented reality. Stretchability is an important property for the development of next-generation wearable electronic devices, which enables stable operation despite mechanical deformations such as bending, twisting and stretching. Power sources are one of the components of the wearable electronic devices, but the development of stretchable energy storage device has been slow. Whereas the stretchability of other devices can be achieved simply through miniaturization or thinning of active devices and the stretchability of substrates, energy storage devices should have stretchability on their own because the amount of active materials is directly related with the energy storage performance. Only with hard inorganic active materials, it is very difficult to operate the energy storage device under mechanical deformation.

Lithium-ion batteries (LIBs) are the most commonly used secondary energy storage systems, featuring high energy density, long life and low self-discharge rates. They are composed of positive and negative electrodes, current collectors, separators, electrolytes and encapsulants. To make stretchable batteries, all of these components must operate reliability under mechanical deformation. Many structural approaches have been proposed for the specific components of stretchable batteries, particularly electrodes.

Although stretchability can be achieved by pre-straining or mixing with a large amount of elastomers that do not participate in energy storage for most structures, this leads to deterioration of volume/area energy density and rate of performance, inevitably leading to deterioration of energy storage performance. In addition, most methods only make some specific components stretchable, rather than the entire cell system.

Although several stretchable full-cell batteries using stretchability components have been reported recently, there is no stretchable current collector that realizes an ideal stretchable battery and a current collector that stably maintains stretchability and conductivity has not been developed yet. Electrolytes and stretchable encapsulants that provide stability for a long time in the air are the biggest advantages of stretchable devices. If all the components are stretchable and can be printed easily, the applications thereof are endless.

REFERENCES OF THE RELATED ART

Patent Documents (Patent document 1) Korean Patent Publication No. 2015-0134773.
(Patent document 2) Korean Patent Publication No. 2021-0105991.

SUMMARY

The present disclosure is directed to providing a method for preparing a stretchable electrode having superior stretchability and improved interfacial adhesivity to an active material, wherein a fluorine-based polymer binder in the form of a gel physically crosslinked by Fenton's oxidation is introduced.

The present disclosure is also directed to providing a method for preparing a stretchable electrode having superior stretchability and improved interfacial adhesivity to an active material, wherein a fluorine-based polymer binder with a network structure chemically crosslinked by a crosslinking agent is introduced.

The present disclosure is also directed to providing a stretchable electrode including a physically crosslinked fluorine-based polymer binder or a chemically crosslinked fluorine-based polymer binder.

The present disclosure is also directed to providing a stretchable battery including a stretchable current collector, a stretchable separator and a stretchable encapsulant in addition to the stretchable electrode.

The present disclosure is also directed to providing a device including the stretchable battery.

The present disclosure is also directed to providing an electrical device including the stretchable electrode.

The present disclosure provides a method for preparing a stretchable electrode, which includes: preparing a hydroxyl-functionalized fluorine-based polymer binder by Fenton's oxidation by mixing a fluorine-based polymer binder in a Fenton's reagent solution; preparing a fluorine-based polymer binder solution by dissolving the hydroxyl-functionalized fluorine-based polymer binder in a ketone-based solvent; preparing an electrode slurry containing an electrode active material, a conductor and a carbonate solvent or an ionic liquid in the fluorine-based polymer binder solution; preparing a stretchable current collector including a matrix polymer, a conductive particle and a carbon material; and preparing a stretchable electrode by coating the electrode slurry on the stretchable current collector and then drying the same.

In addition, the present disclosure provides a method for preparing a stretchable electrode, which includes: preparing a hydroxyl-functionalized fluorine-based polymer binder by Fenton's oxidation by mixing a fluorine-based polymer binder in a Fenton's reagent solution; preparing a fluorine-based polymer binder solution by mixing the hydroxyl-functionalized fluorine-based polymer binder with a crosslinking agent; preparing an electrode slurry containing an electrode active material, a conductor and a carbonate solvent or an ionic liquid in the fluorine-based polymer binder solution; preparing a stretchable current collector including a matrix polymer, a conductive particle and a carbon material; coating the electrode slurry on the stretchable current collector and then drying the same; and preparing a stretchable electrode having a crosslinked network structure through heat treatment or UV irradiation of the stretchable current collector having the electrode slurry coated and dried.

In addition, the present disclosure provides a stretchable electrode formed on a stretchable current collector and including a fluorine-based polymer binder, an electrode active material and a conductor, wherein the fluorine-based polymer binder is hydroxyl-functionalized by Fenton's oxidation and then is physically crosslinked by a ketone-based solvent or is chemically crosslinked by a crosslinking agent into a gel form.

In addition, the present disclosure provides a stretchable battery including: a first stretchable electrode according to the present disclosure; a second stretchable electrode according to the present disclosure; a stretchable separator disposed between the first stretchable electrode and the second stretchable electrode; and a stretchable encapsulant formed on stretchable current collectors of the first stretchable electrode and the second stretchable electrode, wherein the first stretchable electrode is a positive electrode and the second stretchable electrode is a negative electrode.

In addition, the present disclosure provides a device including the stretchable battery, wherein the device is one selected from a transportation device and a wearable and body-attachable or body-implantable energy storage device.

In addition, the present disclosure provides an electrical device including the stretchable electrode, wherein the electrical device is one selected from an electric vehicle, a hybrid electric vehicle, a plug-in hybrid electric vehicle, wearable, a free-form energy storage device, a body-attachable or body-implantable device and a power storage device.

The stretchable electrode of the present disclosure, which has superior stretchability by crosslinking the hydroxyl-functionalized fluorine-based polymer binder physically using a ketone-based solvent or chemically with a crosslinking agent, has improved interfacial adhesivity to an active material, exhibits stability under various mechanical deformations of the electrode such as stretching, etc. and can uniformly maintain the electrical conductivity, battery capacity and charge-discharge performance of the electrode.

In addition, the stretchable battery of the present disclosure, which includes the stretchable electrode, a stretchable current collector, a stretchable separator and a stretchable encapsulant, has improved stretchability and superior battery stability under various deformations due to high degree of freedom of structures and materials.

In addition, the stretchable battery of the present disclosure can be prepared as a fiber battery by printing an electrode and a current collector sequentially on both sides of a stretchable fabric, which can be worn, e.g., around sleeves due to superior stretchability and high structural degree of freedom and retains high battery performance and mechanical stability even under mechanical deformation. Therefore, it can be applied to a mobile display for a health monitoring system or a smartwatch.

The effects of the present disclosure are not limited to those mentioned above. It is to be understood that all effects that can be inferred from the following description are included as the effects of the present disclosure.

DETAILED DESCRIPTION

Figure 1:
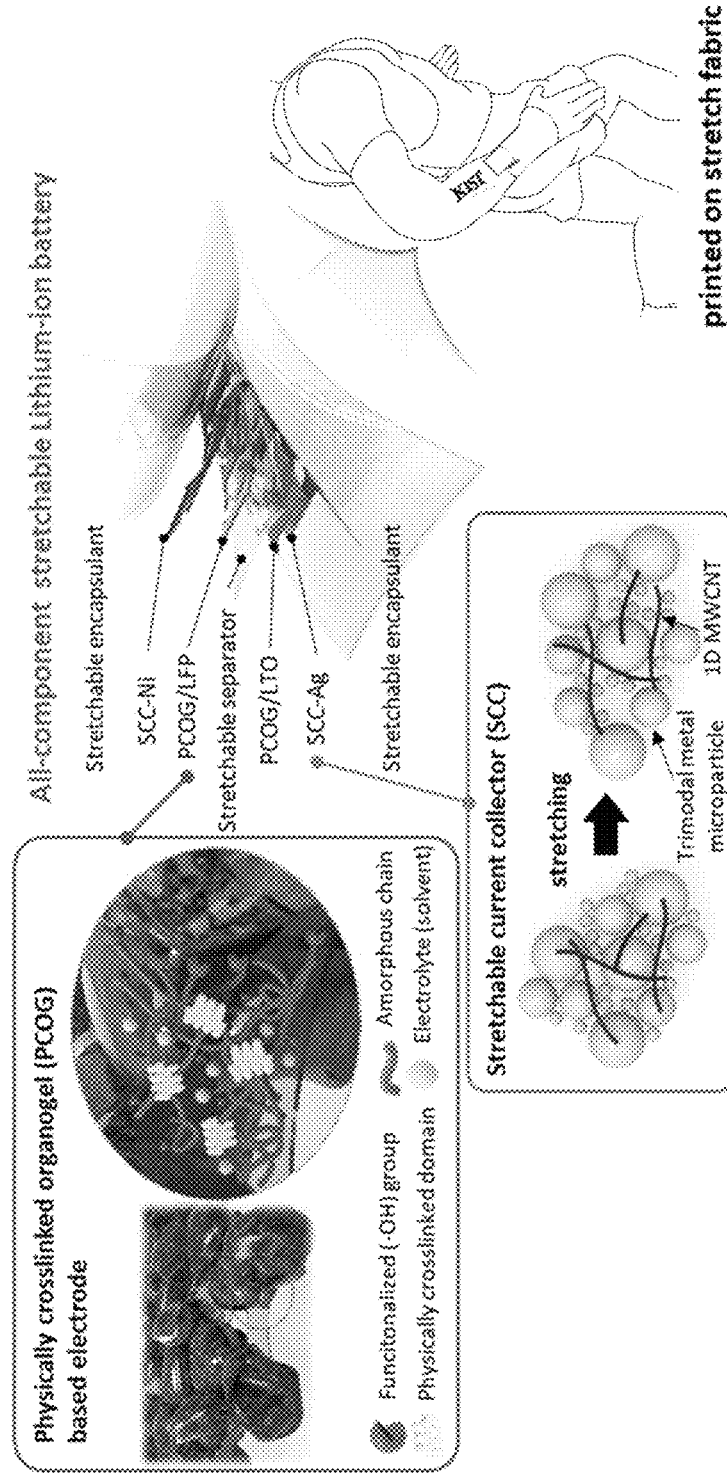
FIG. 1 is a schematic diagram of a stretchable lithium-ion battery according to an exemplary embodiment of the present disclosure.

Hereinafter, exemplary embodiments of the present disclosure are described in more detail.

The present disclosure relates to a stretchable electrode, a method for preparing the same, and a stretchable battery including the stretchable electrode.

As described above, an energy storage device for a next-generation wearable and implantable device should be soft, mechanically deformable and easily printable on any substrate or active device. A lithium-ion battery (LIB) is the most commonly used secondary energy storage system, composed of a positive electrode, a negative electrode, a current collector, a separator, an electrolyte and an encapsulant. To make a stretchable battery, stretchability should be provided through pre-straining or hybridization with an elastomer, which leads to deterioration of volume/area energy density and rate of performance, inevitably leading to deterioration of energy storage performance. In addition, most methods only make some specific components stretchable, rather than the entire cell system.

The stretchable electrode of the present disclosure, which is prepared by crosslinking a hydroxyl-functionalized fluorine-based polymer binder physically using a ketone-based solvent or chemically with a crosslinking agent, has superior stretchability, has improved interfacial adhesivity to an active material through Fenton's oxidation, exhibits improved stability under various mechanical deformations of the electrode such as stretching, etc. and can uniformly maintain the electrical conductivity, battery capacity and charge-discharge performance of the electrode.

In addition, the stretchable battery of the present disclosure, which includes the stretchable electrode, a stretchable current collector, a stretchable separator and a stretchable encapsulant, has improved stretchability and superior battery stability under various deformations due to high degree of freedom of structures and materials. That is to say, by using stretchable materials for all the components, i.e., the electrode, the current collector, the separator, the electrolyte and the encapsulant, stretchability can be improved significantly owing to the physical degree of freedom between the electrode active material and the organic electrolyte and the structural degree of freedom of the stretchable battery. In addition, the battery has superior stability and can be combined with a stretchable fabric through a printing process.

In addition, the stretchable battery can be prepared by printing an electrode and a current collector sequentially on both sides of a stretchable fabric, which can be worn, e.g., around sleeves due to superior stretchability and high structural degree of freedom and retains high battery performance and mechanical stability even under mechanical deformation. Such a fabric-based stretchable lithium-ion battery can be applied to a mobile display for a health monitoring system or a smartwatch.

Specifically, the present disclosure provides a method for preparing a stretchable electrode, which includes: (a) preparing a hydroxyl-functionalized fluorine-based polymer binder by Fenton's oxidation by mixing a fluorine-based polymer binder in a Fenton's reagent solution; (b) preparing a fluorine-based polymer binder solution by dissolving the hydroxyl-functionalized fluorine-based polymer binder in a ketone-based solvent; (c) preparing an electrode slurry containing an electrode active material, a conductor and a carbonate solvent or an ionic liquid in the fluorine-based polymer binder solution; (d) preparing a stretchable current collector including a matrix polymer, a conductive particle and a carbon material; and (e) preparing a stretchable electrode by coating the electrode slurry on the stretchable current collector and then drying the same.

Hereinafter, each step is described in detail.

(a) Preparation of Hydroxyl-Functionalized Fluorine-Based Polymer Binder

In the step of preparing the hydroxyl-functionalized fluorine-based polymer binder, Fenton's oxidation may be performed by mixing a fluorine-based polymer binder in a Fenton's reagent solution in order to enhance the adhesivity between the fluorine-based polymer binder and an active material. A hydroxyl-functionalized fluorine-based polymer binder may be prepared by the Fenton's oxidation.

In order to prepare a composite electrode having stretchability, it is essential to prevent peeling at the interface between the active material and the binder by enhancing interfacial adhesivity. In the present disclosure, the peeling may be prevented by functionalizing the fluorine-based polymer binder through Fenton's oxidation in order to enhance the interfacial adhesivity to the electrode active material. The microstructure of the electrode may be maintained without peeling when immersed in a solvent or even under mechanical deformation. In addition, the hydroxyl-functionalized fluorine-based polymer binder may be dissolved in a ketone-based solvent, which is a theta solvent, in order to maximize crystallinity (physical crosslinking). In this case, several polymer chains form a crystal as the polymer binder is dispersed in the ketone-based solvent and then dried. Due to the physical crosslinking, the electrode can have stretchability even without addition of an elastomer.

The Fenton's reagent solution may be a mixture of ferrous sulfate hydrate ($FeSO_4 \cdot 7H_2O$) and hydrogen peroxide. The Fenton's reagent solution may functionalize the fluorine-based polymer binder with a hydroxyl group by oxidizing the fluorine-based polymer binder through Fenton's oxidation.

Since the fluorine-based polymer binder has high ion conductivity in wet state due to swelling in the carbonate-based solvent or the ionic liquid, it can maintain an electrode structure without interfering with ion transfer during charge-discharge of the battery electrode.

As a specific examples, the fluorine-based polymer binder may be one or more selected from a group consisting of poly(vinylidene fluoride) (PVDF), poly(vinylidene fluoride-co-hexafluoropropylene) (PVDF-HFP) and poly(vinylidene fluoride-co-tetrafluoroethylene) (PVDF-TFE). Specifically, the fluorine-based polymer binder may be poly(vinylidene fluoride), poly(vinylidene fluoride-co-hexafluoropropylene) or a mixture thereof. Most specifically, it may be poly(vinylidene fluoride).

(b) Preparation of Fluorine-Based Polymer Binder Solution

In the step of preparing the fluorine-based polymer binder solution, the hydroxyl-functionalized fluorine-based polymer binder may be in a ketone-based solvent, which is a theta solvent, so that large crystal grains are formed after drying of the electrode and stretchability can be conferred to the electrode through physical crosslinking when it is immersed in the carbonate-based solvent or the ionic liquid.

In particular, since the hydroxyl-functionalized poly(vinylidene fluoride) has higher crystallinity than other fluorine-based polymers and the crystal grains serve as a physically crosslinked structure, crystals can be formed by dispersing in a ketone-based solvent, which is a theta solvent, and then drying at room temperature without chemical crosslinking and intrinsic elasticity can be achieved when swollen due to the carbonate-based solvent or the ionic liquid. In contrast, for the poly(vinylidene fluoride-co-hexafluoropropylene) or other fluorine-based copolymers, chemical curing is essential to provide stretchability.

The ketone-based solvent is a solvent that induces physical crosslinking and may be one or more selected from a group consisting of acetone, methyl ethyl ketone, methyl isobutyl ketone, methyl butyl ketone, diethyl ketone, cyclopentanone and cyclohexanone, specifically acetone, methyl ethyl ketone or a mixture thereof, most specifically acetone.

(c) Preparation of Electrode Slurry

In the step of preparing the electrode slurry, an electrode slurry containing an electrode active material, a conductor and a carbonate solvent or an ionic liquid in the fluorine-based polymer binder solution may be prepared.

In the fluorine-based polymer binder solution, the fluorine-based polymer binder may be in the form of a physically crosslinked organogel (PCOG) or an ion gel. The fluorine-based polymer binder in the form of an organogel is an elastic spring nanostructure with a mass-spring network, wherein a hard crystalline portion serves as the mass and an amorphous portion formed from swelling of the electrolyte and the carbonate solvent or the ionic liquid serves as a soft spring. As a result, a stretchable organogel network may be formed.

The carbonate solvent may be one or more selected from a group consisting of ethylene carbonate, diethyl carbonate, dimethyl carbonate, ethyl methyl carbonate and propylene carbonate, specifically ethylene carbonate, dimethyl carbonate or a mixture thereof.

The ionic liquid may be formed from bonding of a cation selected from a group consisting of an imidazolium-based cation, a pyrrolidinium-based cation, a piperidinium-based cation, an ammonium-based cation and a phosphonium-based cation and an anion selected from a group consisting of tetrafluoroborate ($BF_4^-$), bis(trifluoromethanesulfonyl) imide ($TFSI^-$), bis(fluorosulfonyl)imide ($FSI^-$) and hexafluorophosphate ($PF_6^-$).

The imidazolium-based cation may be 1-ethyl-3-methylimidazolium, 1-butyl-3-methylimidazolium or a mixture thereof.

The step of preparing the electrode slurry may be performed by mixing the hydroxyl-functionalized fluorine-based polymer binder with the electrode slurry containing the electrode active material, the conductor and the carbonate solvent or the ionic liquid at 1000-3000 rpm for 1-20 minutes, specifically at 1500-2500 rpm for 5-9 minutes.

The electrode active material may be a positive electrode active material or a negative electrode active material. The positive electrode active material may be one or more selected from a group consisting of $LiFePO_4$ (LFP), $LiMnPO_4$ (LMP), $LiMn_2O_4$ (LMO), $Li[Ni_xCo_{(1-x)/2}Mn_{(1-x)/2}]O_2$ ($0.1 \leq x \leq 1$) (NCM) $LiCoO_2$ (LCO), $Li[Ni_{1-x-y}Co_xAl_z]O_2$ ($0.01 \leq x \leq 0.5$, $0.01 \leq y \leq 0.3$, $0.01 \leq z \leq 0.2$) (NCA) and $Li[Ni_{0.89}Co_{0.05}Mn_{0.05}Al_{0.01}]O_2$ (NCMA), specifically LFP, NCM or a mixture thereof. And, the negative electrode active material may be one or more selected from a group consisting of $Li_4Ti_5O_{12}$ (LTO), graphite and mesocarbon microbeads (MCMBs), specifically $Li_4Ti_5O_{12}$ (LTO).

The conductor may be one or more selected from a group consisting of carbon black, Super P, acetylene black, Ketjen black, carbon nanotube and graphene, specifically Super P, carbon nanotube or a mixture thereof.

The fluorine-based polymer binder in gel form or with a network structure, the electrode active material and the conductor may be mixed at a weight ratio of 10-30:63-75:1-10, specifically 22-28:65-72:4-9, most specifically 24-26:67-70:6-8, in the electrode slurry.

The carbonate solvent or the ionic liquid may be mixed with the electrode slurry at the same time or may be mixed during battery assembly after the electrode has been prepared. The carbonate solvent or the ionic liquid may be mixed at a weight ratio of 1:0.1-10 based on the content of solid components including the fluorine-based polymer binder solution, the electrode active material and the conductor. Particularly, if the content of the fluorine-based polymer binder is below 10 wt %, stretchability may decrease or the interfacial adhesivity to an electrode active material may decrease rapidly. And, if the content exceeds 30 wt %, charge-discharge performance and current density may decline due to relatively decreased content of the electrode active material.

(d) Preparation of Stretchable Current Collector

In the step of preparing the stretchable current collector, a stretchable current collector including a matrix polymer, a conductive particle and a carbon material may be prepared. The stretchable current collector may be a stretchable printable current collector (SCC).

The matrix polymer may be one or more selected from a group consisting of polyisobutylene, a polystyrene-polyisobutylene-polystyrene block copolymer, a polystyrene-polyisoprene-polystyrene block copolymer, a polystyrene-polybutadiene-polystyrene block copolymer, a polystyrene-polyethylene-butylene-polystyrene block copolymer, ethylene-vinyl acetate and butyl rubber, specifically a block copolymer including polyisobutylene, polyisobutylene or a mixture thereof. Particularly, the polyisobutylene is advantageous over other matrix polymers in that water barrier property of 0.5 g/m$^2$/day or lower can be achieved for a film with a thickness of 2 mm and that swelling does not occur in an organic electrolyte.

The conductive particle may be used as a current collector for a positive electrode or a current collector for a negative electrode. Specifically, it may be one or more selected from a group consisting of Ag, Ni, Co, Fe, Au, Pt, Ru, Rh, Os, Ir, Pd and stainless steel. Specifically, when the conductive particle is used as a current collector for a positive electrode, it may be Ag. And, when it is used as a current collector for a negative electrode, it may be Ni.

When the conductive particle includes three metal particles having different particle sizes, it may exhibit low resistance at various strains of 0-60% as compared to when it includes only one or two metal particles. Specifically, the conductive particle may be a mixture of a first metal particle, a second metal particle and a third metal particle at a weight ratio of 1-3:2-4:4-6, specifically 1.5-2.5:2.5-3.7:4.2-5.6, most specifically 1.8-2.2:2.9-3.3:4.6-5.3.

The first metal particle may have a particle size of 50-200 nm, the second metal particle may have a particle size of 0.1-5 μm, and the third metal particle may have a particle size of 1-100 μm. Specifically, the first metal particle may have a particle size of 80-170 nm, the second metal particle may have a particle size of 0.9-4.2 μm, and the third metal particle may have a particle size of 4-60 μm.

Most specifically, the first metal particle may have a particle size of 100-150 nm, the second metal particle may have a particle size of 1-3.5 μm, and the third metal particle may have a particle size of 5-50 μm.

If the mixing ratio and the particle size of the three metal particles are not satisfied at the same time, charge-discharge performance and electrical conductivity may decline due to unstable electron transfer pathway.

The carbon material may be one or more selected from a group consisting of multi-walled carbon nanotube, single-walled carbon nanotube, double-walled carbon nanotube, Super P and conductive carbon, specifically multi-walled carbon nanotube.

The stretchable current collector, which includes a conductive particle and a porous carbon material in a matrix polymer having superior stretchability, is advantageous in that it does not swell in an organic electrolyte due to superior stretchability, exhibits superior water and oxygen barrier properties, and has superior adhesivity to an electrode layer. In addition, the stretchable current collector can stably maintain the electron transfer pathway even under stretching due to the use of a nanofiller such as carbon nanotube having an aspect ratio of several thousands. Therefore, it can be introduced in the form of an easily printable ink/paste and can provide high degree of freedom of structures and materials.

(e) Preparation of Stretchable Electrode

In the step of preparing the stretchable electrode, a stretchable electrode may be prepared by coating the electrode slurry on the stretchable current collector and then drying the same so as to increase crystallinity.

The drying may be performed overnight at room temperature in vacuo, so that the carbonate solvent or ionic liquid having a high boiling point still remains and a stretchable electrode in the form of a physically crosslinked organogel (PCOG)/active material can be prepared. If the carbonate solvent or ionic liquid has not been added during the preparation of the electrode slurry, a predetermined amount of the carbonate solvent or ionic liquid may be added after the electrode has been dried.

Although it was not described explicitly in the following examples, comparative examples, etc., for comparison with a stretchable electrode satisfying all the following five conditions, a stretchable electrode was prepared using a binder that had not undergone Fenton's reaction and a stretchable electrode was prepared using N-methyl-2-pyrrolidone (NMP), which disperses the fluorine-based polymer binder very well, instead of the ketone-based solvent. Then, the stretching stability of the prepared stretchable electrodes was analyzed.

As a result, the stretchable electrode satisfying all the following conditions showed superior stretching stability with little change in resistance even under stretching by 60% or more the decrease in energy density was minimized to a level comparable to that of the existing non-stretchable battery. In particular, due to improved interfacial adhesivity to an electrode active material, the electrode active material particle was not degenerated or separated even after repeated stretching at 50% strain for 5000 cycles and the change in resistance was very low as about 1.2.

(1) The fluorine-based polymer binder is poly(vinylidene fluoride), poly(vinylidene fluoride-co-hexafluoropropylene) or a mixture thereof. (2) The ketone-based solvent is acetone, methyl ethyl ketone or a mixture thereof. (3) The carbonate solvent is ethylene carbonate, diethyl carbonate or a mixture thereof. (4) The conductive particle is a mixture of a first metal particle, a second metal particle and a third metal particle at a weight ratio of 1.5-2.5:2.5-3.7:4.2-5.6. (5) The first metal particle has a particle size of 80-170 nm, the second metal particle has a particle size of 0.9-4.2 μm, and the third metal particle has a particle size of 4-60 μm.

When any of the five conditions was not satisfied, the change in resistance was increased greatly even at 30% strain due to decreased stretching stability of the electrode, and the separation of some active material was observed.

Although it was not described explicitly in the following examples, comparative examples, etc., stretchable lithium-ion batteries were prepared using stretchable electrodes prepared according to the method of the present disclosure while varying the following 13 conditions. The prepared stretchable batteries were subjected to repeated tensile test at 50% strain for 8000 cycles and charge-discharge test for 500 cycles, followed by testing of durability, electrode stability, charge-discharge capacity, battery life characteristics and capacity maintenance.

As a result, change in resistance hardly occurred even at repeated tensile test at 50% strain for 8000 cycles when all the following conditions were satisfied. In addition, the separation of the electrode material and breakage of the electrode did not occur even after the charge-discharge cycles, and the stretchable battery exhibited superior durability and electrode stability due to strong binding to the electrode active material. In addition, after 500 charge-discharge cycles, the battery showed improved performance with the capacity of the electrode maintained at 95% or higher and the decrease in output density being about 5% or lower.

(1) The Fenton's reagent solution is a mixture of ferrous sulfate hydrate ($FeSO_4 \cdot 7H_2O$) and hydrogen peroxide. (2) The fluorine-based polymer binder is poly(vinylidene fluoride). (3) The ketone-based solvent is acetone. (4) The carbonate solvent is ethylene carbonate. (5) The electrode active material is a positive electrode active material or a negative electrode active material. (6) The positive electrode active material is $LiFePO_4$ (LFP) and the negative electrode active material is $Li_4Ti_5O_{12}$ (LTO). (7) The conductor is Super P. (8) The electrode slurry is a mixture of fluorine-based polymer binder in gel form or having a network structure, the electrode active material and the conductor at a weight ratio of 24-26:67-70:6-8. (9) The matrix polymer is polyisobutylene. (10) The conductive particle is Ag or Ni. (11) The conductive particle is a mixture of a first metal particle, a second metal particle and a third metal particle at a weight ratio of 1.8-2.2:2.9-3.3:4.6-5.3. (12) The first metal particle has a particle size of 100-150 nm, the second metal particle has a particle size of 1-3.5 μm, and the third metal particle has a particle size of 5-50 μm. (13) The carbon material is multi-walled carbon nanotube.

When any of the 13 conditions was not satisfied, mechanical stability was unsatisfactory because separation or breakage of the electrode occurred in the repeated tensile test for 8000 cycles. As a result, the life characteristics of the battery were poor as the capacity of the electrode was decreased rapidly after 500 charge-discharge cycles.

In addition, the present disclosure provides a method for preparing a stretchable electrode, which includes: (a) preparing a hydroxyl-functionalized fluorine-based polymer binder by Fenton's oxidation by mixing a fluorine-based polymer binder in a Fenton's reagent solution; (b) preparing a fluorine-based polymer binder solution by mixing the hydroxyl-functionalized fluorine-based polymer binder with a crosslinking agent; (c) preparing an electrode slurry containing an electrode active material, a conductor and a carbonate solvent or an ionic liquid in the fluorine-based polymer binder solution; (d) preparing a stretchable current collector including a matrix polymer, a conductive particle and a carbon material; (e) coating the electrode slurry on the stretchable current collector and then drying the same; and (f) preparing a stretchable electrode having a crosslinked network structure through heat treatment or UV irradiation of the stretchable current collector having the electrode slurry coated and dried.

The step (a) may be performed in the same manner as the above-described method for preparing a stretchable electrode using a fluorine-based polymer binder wherein stretchability is conferred through physical crosslinking using a ketone-based solvent.

(b) Preparation of Fluorine-Based Polymer Binder

In the step of preparing the fluorine-based polymer binder, a fluorine-based polymer binder in the form of a crosslinked network structure may be prepared by mixing the fluorine-based polymer binder with a crosslinking agent. The fluorine-based polymer binder may form a network structure as amorphous fluorine-based polymer chains are chemically crosslinked.

The crosslinking agent may be a crosslinking agent for thermal curing or UV curing. As specific examples, the crosslinking agent may be one or more selected from a group consisting of a bisphenol-based crosslinking agent, a peroxide-based crosslinking agent, a polyamine-based crosslinking agent, a triazine-based crosslinking agent, an oxazole-based crosslinking agent, an imidazole-based crosslinking agent, an azide-based crosslinking agent and a thiazole-based crosslinking agent. Specifically, the crosslinking agent for thermal curing may be a bisphenol-based crosslinking agent, and the crosslinking agent for UV curing may be an azide-based crosslinking agent.

The bisphenol-based crosslinking agent may be one or more selected from a group consisting of bisphenol A, bisphenol E, bisphenol S, bisphenol F, bisphenol AF and bisphenol B, specifically one or more selected from a group consisting of bisphenol A, bisphenol AF and bisphenol E, most specifically bisphenol E.

The azide-based crosslinking agent may be one or more selected from a group consisting of diphenyl azide, diallyl azide and 2,6-bis(4-azidobenzylidene)-4-methylcyclohexanone, specifically 2,6-bis(4-azidobenzylidene)-4-methylcyclohexanone. The diphenyl azide may be bis(fluorophenyl azide), specifically 2,6-bis(4-azidobenzylidene)-4-methylcyclohexanone.

The steps (c)-(e) may be performed in the same manner as the above-described method for preparing a stretchable electrode using a fluorine-based polymer binder wherein stretchability is conferred through physical crosslinking using a ketone-based solvent.

(f) Preparation of Stretchable Electrode having Crosslinked Network Structure

In the step of preparing the stretchable electrode, a stretchable electrode having a crosslinked network structure may be prepared through heat treatment or UV irradiation of the stretchable current collector having the dried electrode slurry formed.

The heat treatment may be performed at 150-200° C. for 30 minutes to 2 hours, specifically at 160-180° C. for 50 minutes to 1.5 hours, for thermal curing. And, the UV irradiation may be performed by irradiating UV with a wavelength of 350-380 nm at about 140-170 $mJ/cm^{-2}$ to prepare a stretchable electrode in the form of a chemically crosslinked organogel/active material.

If the carbonate solvent or the ionic liquid has not been added during the preparation of the electrode slurry, a predetermined amount of the carbonate solvent or ionic liquid may be added after the electrode has been dried.

Although it was not described explicitly in the following examples, comparative examples, etc., stretchable lithium-ion batteries were prepared using stretchable electrodes prepared according to the method of the present disclosure while varying the following 9 conditions. The prepared stretchable batteries were subjected to repeated tensile test at 50% strain and charge-discharge test for 5000 cycles, followed by testing of durability, electrode stability, charge-discharge capacity, battery life characteristics and capacity maintenance.

As a result, the change in resistance was 1.2 or smaller at repeated tensile test at 50% strain for 1000 cycles when all the following conditions were satisfied. In addition, the separation of the electrode material and breakage of the electrode did not occur even after the charge-discharge cycles, and the stretchable battery exhibited superior durability and electrode stability due to strong binding to the electrode active material. In addition, the stretchable battery maintained high charge-discharge capacity for a long time, and the negative electrode using LTO maintained capacity at 97% or higher after 200 charge-discharge cycles. As a result, it was confirmed that the battery performance was comparable to that of the general non-stretchable battery electrode.

(1) The Fenton's reagent solution is a mixture of ferrous sulfate hydrate ($FeSO_4 \cdot 7H_2O$) and hydrogen peroxide. (2) The fluorine-based polymer binder is poly(vinylidene fluoride-co-hexafluoropropylene) (PVDF-HFP). (3) The crosslinking agent is a crosslinking agent for thermal curing or UV curing, the crosslinking agent for thermal curing is bisphenol E or AF, and the crosslinking agent for UV curing is 2,6-bis(4-azidobenzylidene)-4-methylcyclohexanone. (4) The electrode active material is a positive electrode active material or a negative electrode active material. (5) The positive electrode active material is $LiFePO_4$ (LFP), and the negative electrode active material is $Li_4Ti_5O_{12}$ (LTO). (6) The conductor is Super P. (7) The electrode slurry is a mixture of the fluorine-based polymer binder having a network structure, the electrode active material and the conductor at a weight ratio of 24-26:67-70:6-8. (8) The crosslinking agent is mixed in the fluorine-based polymer binder solution at a weight ratio of 0.01-0.05 based on solid contents. (9) The carbonate-based solvent is ethylene carbonate, the ionic liquid is (1-ethyl-3-methylimidazolium bis(trifluoromethanesulfonyl)imide, and the carbonate-based solvent or the ionic liquid is mixed in the electrode slurry at a weight ratio of 1:1-4 based on solid contents.

When any of the 9 conditions was not satisfied, the separation of the electrode material or the breakage of the electrode occurred in the repeated tensile test for 5000 cycles. In particular, mechanical stability was very poor at various strains due to poor interfacial adhesivity to an electrode active material when the microstructure was investigated by in-situ SEM.

In addition, the present disclosure provides a stretchable electrode formed on a stretchable current collector and including a fluorine-based polymer binder, an electrode active material and a conductor, wherein the fluorine-based polymer binder is hydroxyl-functionalized by Fenton's oxidation and then is physically crosslinked by a ketone-based solvent or is chemically crosslinked by a crosslinking agent into a gel form.

The stretchable electrode may be a positive electrode or a negative electrode.

In addition, the present disclosure provides a stretchable battery including: a first stretchable electrode according to the present disclosure; a second stretchable electrode according to the present disclosure; a stretchable separator disposed between the first stretchable electrode and the second stretchable electrode; and a stretchable encapsulant formed on stretchable current collectors of the first stretchable electrode and the second stretchable electrode, wherein the first stretchable electrode is a positive electrode and the second stretchable electrode is a negative electrode.

The first stretchable electrode and the second stretchable electrode, which include a fluorine-based polymer binder functionalized by physical crosslinking or chemical crosslinking, are advantageous in that they have superior stretchability, charge-discharge capacity and electrode stability due to improved interfacial adhesivity to an electrode active material.

The stretchable separator may be in the form of one selected from a group consisting of a film, a sheet, a fabric and a nonwoven, specifically in the form of a film or a fabric.

The stretchable separator may be in the form of a gel swollen by drying a fluorine-based polymer binder solution containing a fluorine-based polymer binder and a carbonate solvent or an ionic liquid.

The fluorine-based polymer binder may be in the form of a gel physically crosslinked after hydroxyl functionalization by Fenton's oxidation or chemically crosslinked by a crosslinking agent. The fluorine-based polymer binder may have enhanced binding ability to an active material by containing hydroxyl groups through the Fenton's oxidation and may be prepared into a gel through physical crosslinking or chemical crosslinking by a crosslinking agent.

As a specific example, the fluorine-based polymer binder may be poly(vinylidene fluoride-co-hexafluoropropylene) (PVDF-HFP).

The stretchable current collector may be a stretchable printable current collector (SCC). Specifically, the stretchable current collector may include a matrix polymer, a conductive particle and a carbon material.

The matrix polymer may be polyisobutylene, a polystyrene-polyisobutylene-polystyrene block copolymer, butyl rubber or a mixture thereof, specifically polyisobutylene.

The conductive particle may be used as a current collector for a positive electrode or a current collector for a negative electrode. As a specific example, it may be one or more selected from a group consisting of Ag, Ni, Co, Fe, Au, Pt, Ru, Rh, Os, Ir, Pd and stainless steel. Specifically, when the conductive particle is used as a current collector for a positive electrode, it may be Ag. And, when it is used as a current collector for a negative electrode, it may be Ni.

The conductive particle may be a mixture of a first metal particle, a second metal particle and a third metal particle at a weight ratio of 1-3:2-4:4-6, specifically 1.5-2.5:2.5-3.7:4.2-5.6, most specifically 1.8-2.2:2.9-3.3:4.6-5.3.

The first metal particle may have a particle size of 100-150 nm, the second metal particle may have a particle size of 1-3.5 μm, and the third metal particle may have a particle size of 5-50 μm.

The carbon material may be one or more selected from a group consisting of multi-walled carbon nanotube, single-walled carbon nanotube, double-walled carbon nanotube, Super P and conductive carbon, specifically multi-walled carbon nanotube.

The stretchable encapsulant may be polyisobutylene, a polystyrene-polyisobutylene-polystyrene block copolymer, butyl rubber or a mixture thereof, specifically polyisobutylene. The polyisobutylene may have a weight-average molecular weight of 500,000-3,000,000 g/mol, specifically 700,000-2,300,000 g/mol, most specifically 900,000-1,200,000 g/mol.

The polyisobutylene has superior barrier property and has superior stability because it does not swell in an organic electrolyte. Therefore, it can be used as a matrix polymer for an encapsulant or a current collector. Due to these properties, the polyisobutylene can be used in a stretchable battery as a stretchable encapsulant and can provide long-term stability.

The stretchable battery include, in addition to one or more selected from a group consisting of the first and second stretchable electrodes, the stretchable separator, stretchable current collector and the stretchable encapsulant, an electrolyte wherein 1 M LiPF$_6$ is dissolved or a LiTFSI and EMIMTFSI are mixed at a weight ratio of 1:1 in an EC/DEC/DMC (1:1:1 vol %) solvent.

FIG. 1 is a schematic diagram of a stretchable lithium-ion battery according to an exemplary embodiment of the present disclosure. Referring to FIG. 1, the stretchable lithium-ion battery has a multi-layered structure including stretchable electrodes (PCOG/LFP, PCOG/LTO), a stretchable current collector (SCC), a stretchable separator (PCOG) and a stretchable encapsulant. The stretchable battery is prepared by printing the stretchable electrodes, the stretchable current collector and the stretchable encapsulant sequentially on both sides of a stretchable fabric as a stretchable separator.

In FIG. 1, the stretchable electrodes are physically crosslinked organogel/positive electrode active material (PCOG/LFP) or a physically crosslinked organogel/negative electrode active material (PCOG/LTO) formed from a ketone-based solvent through physical crosslinking to increase crystallinity. The stretchable electrode shows stable stretchability because the fluorine-based polymer is physically crosslinked and exhibits superior interfacial adhesivity to an electrode active material because the hydroxyl-functionalized moiety binds the electrode active material well.

In FIG. 1, the stretchable current collector (SCC) has a structure wherein 1-dimensional multi-walled carbon nanotube and three metal particles having different particle sizes are mixed in a matrix polymer having stretchability. It can be seen that multiple penetration pathways can be maintained in a structurally loose state.

As described above, since the stretchable battery according to the present disclosure uses stretchable and printable materials for all components including the electrode, the current collector, the separator and the encapsulant, a stretchable battery system with remarkably superior stretchability can be provided. In addition, since the stretchable battery of the present disclosure allows use of a printing process, the structural degree of freedom is increased greatly and printing on a stretchable fabric is possible. A fabric-based stretchable lithium-ion battery is advantageous in that it can be used as a mobile display for a health monitoring system or a smartwatch.

The present disclosure also provides a device including the stretchable battery according to the present disclosure, wherein the device is one selected from a transportation device and a wearable and body-attachable or body-implantable energy storage device.

The present disclosure also provides an electrical device including the stretchable electrode according to the present disclosure, wherein the electrical device is one selected from an electric vehicle, a hybrid electric vehicle, a plug-in hybrid electric vehicle, a wearable, free-form energy storage device, a body-attachable or body-implantable device and a power storage device.

Hereinafter, the present disclosure will be described more specifically through examples. However, the present disclosure is not limited by the following examples.

Example 1

Preparation of Stretchable PCOG/LFP Positive Electrode and PCOG/LTO Negative Electrode

[Materials]

For swelling test of encapsulant films, PDMS (Sylgard 184, Dow Corning), polyurethane (PU, C85A, BASF) and styrene-ethylene-butylene-styrene (SEBS, G1657M, Kraton) were dissolved in n-hexane (Sigma-Aldrich), dimethylformamide (DMF, Sigma-Aldrich) and chloroform (Sigma-Aldrich), respectively. An encapsulant film was prepared by dissolving polyisobutylene (PIB, mean $M_w$=1,000,000, Sigma-Aldrich) in toluene (Sigma-Aldrich). As active materials, $Li_4Ti_5O_{12}$ (LTO, MTI Corporation), $LiFePO_4$ (LFP, EQ-Lib-LFPO-S21, MTI Corporation) and mesocarbon microbeads (MCMB, MTI Corporation) were used. For preparation of a PCOG film, polyvinylidene fluoride (PVDF, weight-average $M_w$=534,000 g/mol, powder, Sigma-Aldrich), poly(PVDF-HFP) (mean $M_w$=400,000 g/mol, pellet, Sigma-Aldrich) and acetone (Sigma-Aldrich) were used. For preparation of a commercial battery electrode, a N-methyl-2-pyrrolidone (NMP, Sigma-Aldrich) solvent was used. For a stretchable current collector, 150 nm, 2-3.5 μm and 5-8 μm Ag particles (Sigma-Aldrich), 100 nm, 1 μm and 50 μm Ni particles (Sigma-Aldrich) and multi-walled carbon nanotubes (MWCNT, length=20-100 μm, mean diameter=~20 nm, purity >95 wt %, CNT Co., Ltd.) were prepared.

(1) Preparation of Electrode Slurry

Hydroxyl-functionalized PVDF (F-PVDF) was prepared by Fenton's oxidation by adding pure PVDF powder (5 g), 0.695 g of $FeSO_4 \cdot 7H_2O$ (Sigma-Aldrich) and 25 mL of 35 wt % hydrogen peroxide to ethanol (25 mL) and then stirring at 50° C. for 2 hours. After filtering the obtained F-PVDF, iron salt impurities adsorbed to the F-PVDF were removed by washing with 1 M $H_2SO_4$. Then, F-PVDF powder was obtained by drying the impurity-removed F-PVDF overnight in a vacuum oven. The obtained F-PVDF powder (110 mg) was dissolved in acetone (3 mL), which is a ketone-based solvent, to obtain F-PVDF in the form of a viscous liquid. Then, a positive electrode slurry (PCOG/LFP) and a negative electrode slurry (PCOG/LTO) were prepared by adding the F-PVDF, an active material (LFP, LTO) and Super P at a weight ratio of 25:68:7 and then adding ethylene carbonate, which is a carbonate solvent, and mixing at 2000 rpm for 7 minutes using a Thinky mixer (ARV-310 (Thinky Corporation)) such that the weight ratio of solid contents: carbonate solvent:ketone-based solvent was 1:4:7.

(2) Preparation of Stretchable Current Collector (SCC-Ag) for Negative Electrode and Stretchable Current Collector (SCC-Ni) for Positive Electrode A PIB solution was prepared by dissolving 1 g of PIB in chloroform (7 mL) at 60° C. for 3 hours. After adding 3 g of Ag particles (mixture of 150 nm, 2-3.5 μm and 5-8 μm Ag particles at a weight ratio of 2:3:5) and 10 mg of MWCNT to the PIB solution, a mixture was prepared by mixing at 2000 rpm for 7 minutes using a Thinky mixer. Then, after coating the mixture on a glass substrate using a doctor blade, an SCC-Ag current collector film for a negative electrode was prepared by drying at 60° C. for 2 hours. Similarly, an SCC-Ni current collector film for a positive electrode was prepared by mixing Ni particles (mixture of 100 nm, 1 μm and 50 μm particles at a weight ratio of 2:3:5), MWCNT and PIB. The thickness of the prepared SCC-Ag current collector film for a negative electrode and SCC-Ni current collector film for a positive electrode was 300 μm.

(3) Preparation of Stretchable PCOG/LFP Positive Electrode and PCOG/LTO Negative Electrode After coating the prepared positive electrode slurry (PCOG/LFP) and negative electrode slurry (PCOG/LTO) on the SCC-Ag current collector film and the SCC-Ni current collector film (thickness 300 μm, speed 5 mm/s) using a doctor blade, a stretchable PCOG/LFP positive electrode (SCC-Ag current collector film)/(PCOG/LFP positive electrode) and a PCOG/LTO negative electrode (SCC-Ni current collector film)/(PCOG/LTO negative electrode) were prepared by drying overnight at room temperature in vacuo. PCOG refers to a physically crosslinked organogel.

Example 2

Preparation of Stretchable Lithium-Ion Battery (LIB)

(1) Preparation of Stretchable PCOG Separator

After mixing PVDF-HFP pellets with acetone, which is a ketone-based solvent for inducing physical crosslinking, at a weight ratio of 1:7, a hydroxyl-functionalized F-PVDF-HFP solution was prepared by Fenton's oxidation by stirring at 50° C. for 1 hour. The F-PVDF-HFP solution was coated on a glass substrate using a doctor blade. Then, after forming a porous structure by immersing the glass substrate with the PVDF-HFP solution coated in a water bath for 3 hours, a PCOG (physically crosslinked organogel) separator was prepared by drying in vacuo at 70° C. for 6 hours. Then, a dense surface of the PCOG separator was removed by an oxygen RIE process (Femtoscience Inc. VITA, $O_2$ 20 sccm, 20 mTorr, 100 W, 25 min). Before battery assembly, the PCOG separator was completely soaked in a carbonate-based electrolyte wherein 1 M $LiPF_6$ was dissolved in an ethylene carbonate (EC)/diethyl carbonate (DEC)/dimethyl carbonate (DMC) (1:1:1 vol %) solvent to obtain a stretchable separator in the form of a gel.

(2) Preparation of Stretchable Lithium-Ion Battery (LIB)

After attracting a PIB encapsulant film on one surface of the (SCC-Ag current collector film)/(PCOG/LFP positive electrode) and (SCC-Ni current collector film)/(PCOG/LTO negative electrode) prepared in Example 1, they were immersed in an electrolyte wherein 1 M $LiPF_6$ was dissolved in an EC/DEC/DMC (1:1:1 vol %) solvent at room temperature for 1 hour. The mass ratio of the positive electrode (PCOG/LFP) and the negative electrode (PCOG/LTO) was 1:1.3. Then, the PCOG separator was stacked between the other surface of the PCOG/LFP positive electrode and the other surface of the PCOG/LTO negative electrode. After applying PIB resin (5 wt % PIB in toluene) around the electrodes of the PIB film like an adhesive, the two stretchable electrodes were laminated. After attaching the PIB encapsulant film, a stretchable lithium-ion battery was prepared by injecting an electrolyte through a syringe.

Example 3

Preparation of Stretchable Lithium-Ion Battery (LIB)

A stretchable lithium-ion battery was prepared in the same manner as in Example 2, except that the mass ratio of the positive electrode (PCOG/LFP) and the negative electrode (PCOG/MCMB) was changed to 2.3:1 to increase operation voltage.

Example 4

Preparation of Stretchable Lithium-Ion Battery (LIB)

A stretchable lithium-ion battery was prepared in the same manner as in Examples 1 and 2, except that (1-ethyl-3-methylimidazolium bis(trifluoromethylsulfonyl)imide ([EMIM][TFSI])) was used as an ionic liquid instead of the carbonate solvent-based electrolyte to form an ion gel (IG) instead of the organogel (OG) and a positive electrode (PCIG/LFP) and a negative electrode (PCIG/graphite) were prepared using graphite powder for the negative electrode.

Example 5

Preparation of Stretchable Lithium-Ion Battery Screen-Printed on Stretchable Fabric In order to print a stretchable lithium-ion battery on a stretchable fabric, a paper mask bearing the institute's logo was prepared using a cutter (Silhouette, Lindon, UT, USA). 11.7 mg/cm$^2$ a PCOG/LFP positive electrode slurry was coated on the mask attached to a stretchable fabric using a doctor blade and then dried. Then, a positive electrode was prepared by screen-printing an SCC-Ag current collector film on the coated PCOG/LFP positive electrode layer and then drying the same. After reversing the stretchable fabric, a negative electrode was prepared by screen-printing a PCOG/LTO negative electrode layer and an SCC-Ni current collector film sequentially in the same manner. In order to prevent electrolyte leakage, PIB resin was applied on the stretchable fabric on which the positive electrode or the negative electrode was formed using a brush. Finally, after attaching a PIB encapsulant film, a stretchable lithium-ion battery screen-printed on the stretchable fabric was prepared by injecting an electrolyte through a syringe.

Example 6

Preparation of Stretchable Lithium-Ion Battery (LIB)

Hydroxyl-functionalized PVDF-HFP was prepared by Fenton's oxidation by adding pure PVDF-HFP powder (5 g), 0.695 g of $FeSO_4 \cdot 7H_2O$ (Sigma-Aldrich) and 25 mL of 35 wt % hydrogen peroxide to ethanol (25 mL) and then stirring at 50° C. for 2 hours. After filtering the obtained F-PVDF-HFP, iron salt impurities adsorbed to the F-PVDF-HFP were removed by washing with 1 M $H_2SO_4$. Then, F-PVDF-HFP powder was obtained by drying the impurity-removed F-PVDF-HFP overnight in a vacuum oven.

An F-PVDF-HFP solution was prepared by adding 5 wt % of bisphenol AF, which is a crosslinking agent for thermal curing, to the obtained F-PVDF-HFP powder (110 mg) and dissolving in NMP (3 mL). Then, a positive electrode slurry (PCOG/LFP) and a negative electrode slurry (PCOG/LTO) were prepared by adding a binder, an active material (LFP, LTO) and Super P at a weight ratio of 25:68:7 to the F-PVDF-HFP solution and then adding ethylene carbonate, which is a carbonate solvent, and mixing at 2000 rpm for 7 minutes using a Thinky mixer (ARV-310 (Thinky Corporation)) such that the weight ratio of solid contents:carbonate solvent:ketone-based solvent was 1:4:7. After coating the positive electrode slurry (PCOG/LFP) and the negative electrode slurry (PCOG/LTO) on the current collector film using a doctor blade and then drying overnight at room temperature in vacuo, stretchable positive electrode and negative electrode were prepared by conducting thermal curing at 170° C. for 1 hour.

Comparative Example 1

Preparation of PVDF/LFP Positive Electrode and PVDF/LTO Negative Electrode Using Pristine PVDF A PVDF/LFP positive electrode and a PVDF/LTO negative electrode were prepared in the same manner as in Example 1 by preparing a pristine PVDF-based electrode slurry except for dissolving pristine PVDF, instead of F-PVDF, in NMP, mixing with a doctor blade and then drying at 130° C. PIB/Ag was prepared as a current collector for the negative electrode, and PIB-Ni as a current collector for the positive electrode.

Test Example 1

XPS, DSC, FT-IR and XRD Analysis of F-PVDF and Pristine PVDF

X-ray photoelectron spectroscopy (XPS) analysis was conducted to investigate the bonding structure of the F-PVDF prepared in Example 1 and the pristine PVDF for comparison. In addition, the crystal structure of the F-PVDF and the pristine PVDF depending on wetting was analyzed after immersing in NMP or acetone and then evaporating the solvent, and peel test was conducted as follows to quantitatively measure the adhesivity of the electrode coating and the cohesivity of the coated particles. For the peel test, each binder solution was coated on a polyimide (PI) film with a size of 10×50 mm$^2$ and a test specimen was prepared by attaching another PI film to the binder solution (binder thickness: ~150 μm). The result is shown in FIGS. 2-5.

Figure 2:
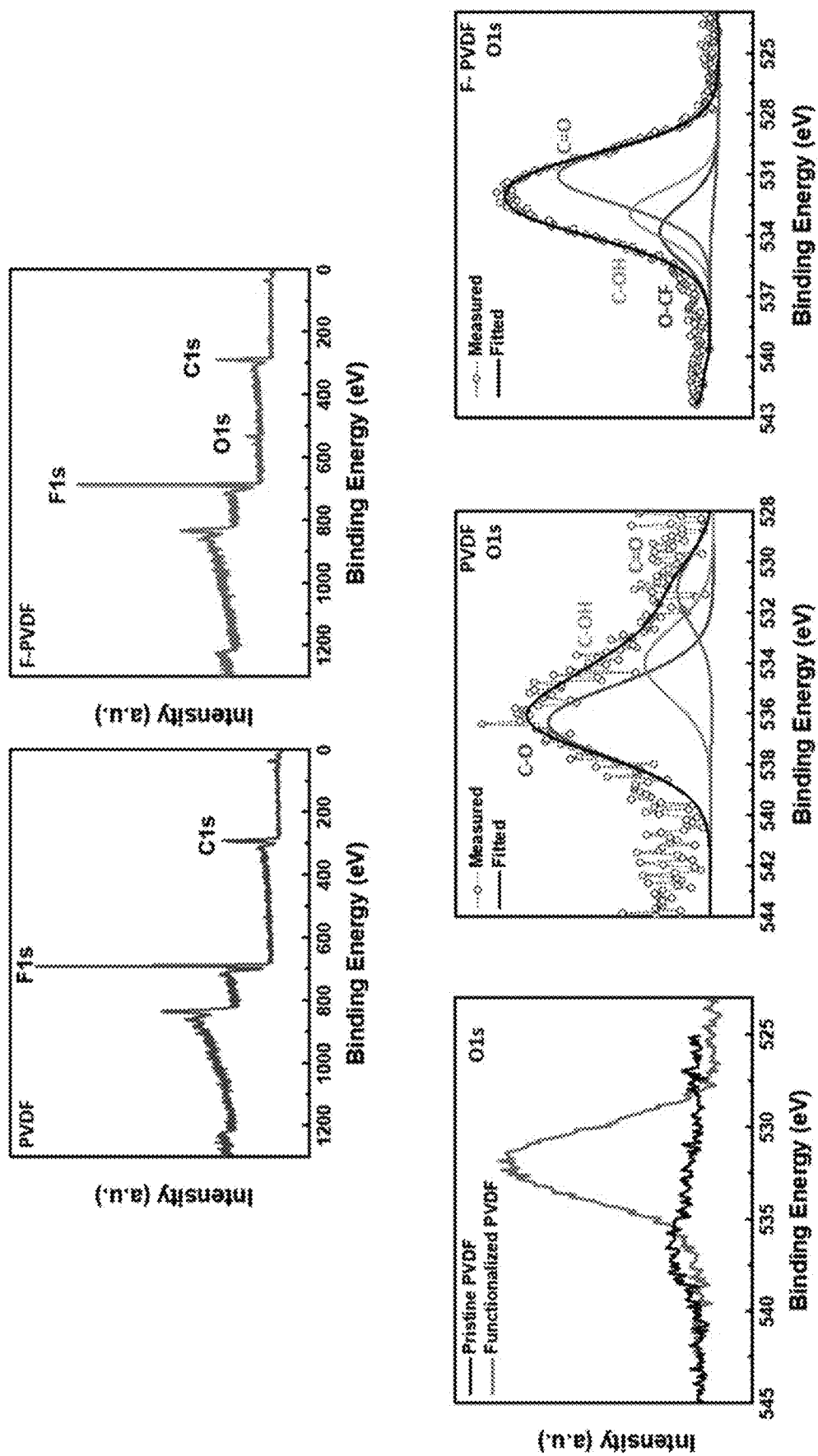
FIG. 2 shows the XPS spectra of F-PVDF prepared in Example 1 and pristine PVDF for comparison.

FIG. 2 shows the XPS spectra of the F-PVDF prepared in Example 1 and the pristine PVDF for comparison. Referring to FIG. 2, the hydroxyl-functionalized PVDF (F-PVDF) film of Example 1, which was formed by Fenton's oxidation, showed the intensity of the oxygen peak (O1s) increase from 0% to 6.02% and the intensity of the fluorine peak (F1s) decreased from 67.1% to 56.1% as compared to the pristine PVDF.

Figure 3A:
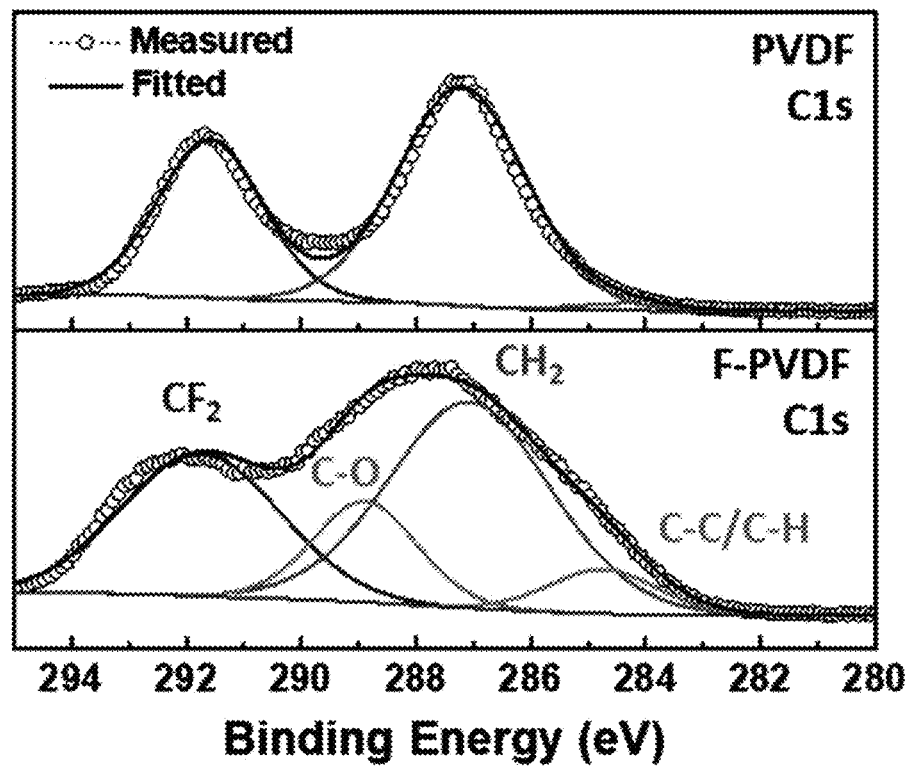
FIG. 3A shows the X-ray photoelectron C1s spectra of F-PVDF prepared in Example 1 and pristine PVDF for comparison.
Figure 3B:
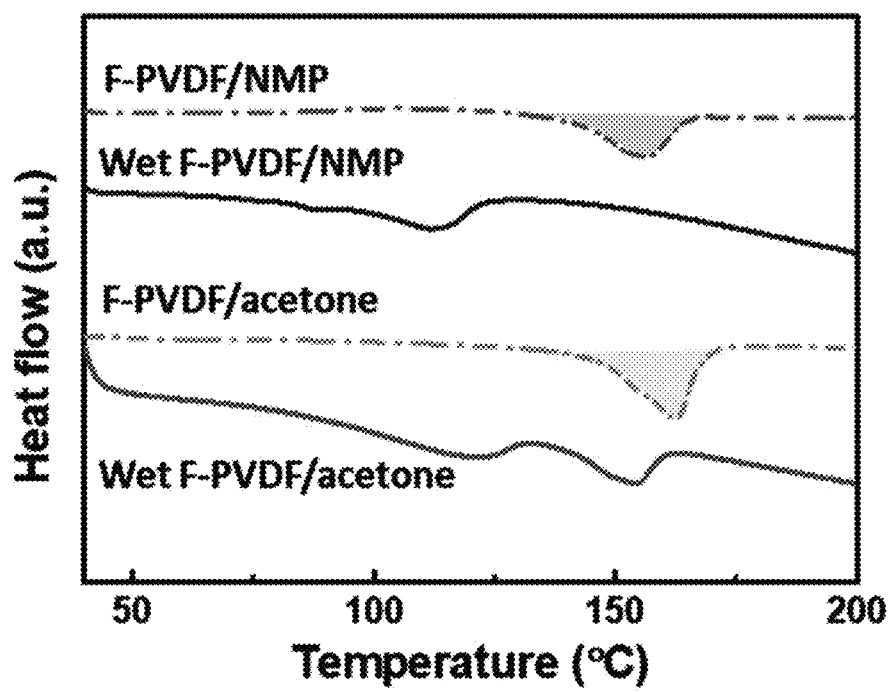
FIG. 3B shows the differential scanning calorimetry (DSC) (10° C./min) curves of a dried F-PVDF/NMP film and a F-PVDF/acetone film (red solid line) in acetone at room temperature (red broken line) and N-methylpyrrolidone (NMP) at 60° C. (blue broken line) and a wet F-PVDF/NMP film and a wet F-PVDF/acetone film immersed in acetone (red solid line) and NMP (blue solid line)
Figure 3C:
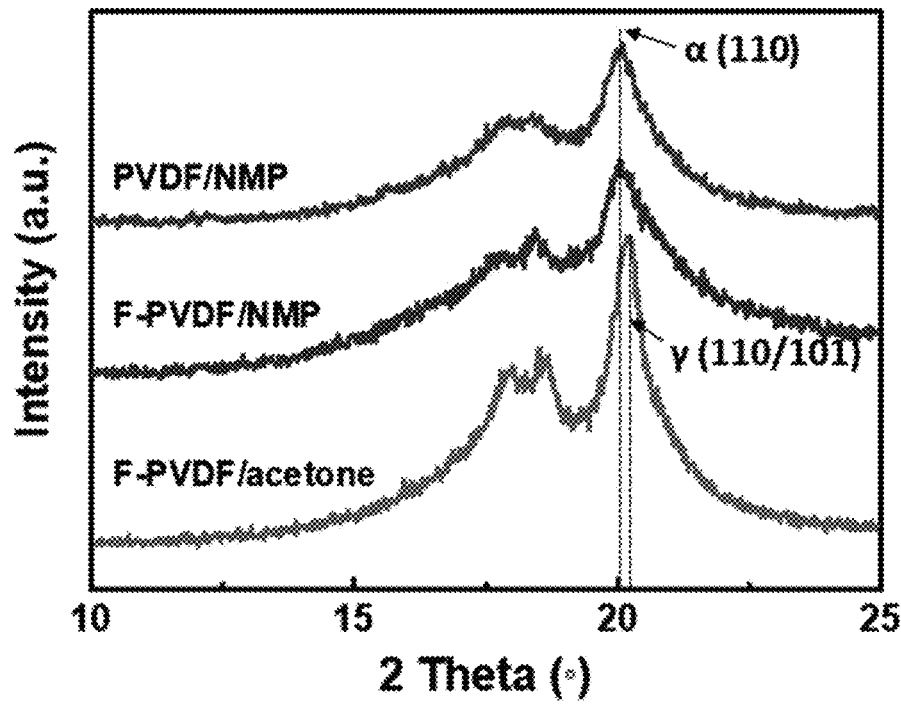
FIG. 3C shows the X-ray diffraction (XRD) patterns of a dried pristine PVDF/NMP film (gray), an F-PVDF/NMP film (blue) and an F-PVDF/acetone film (red)
Figure 3D:
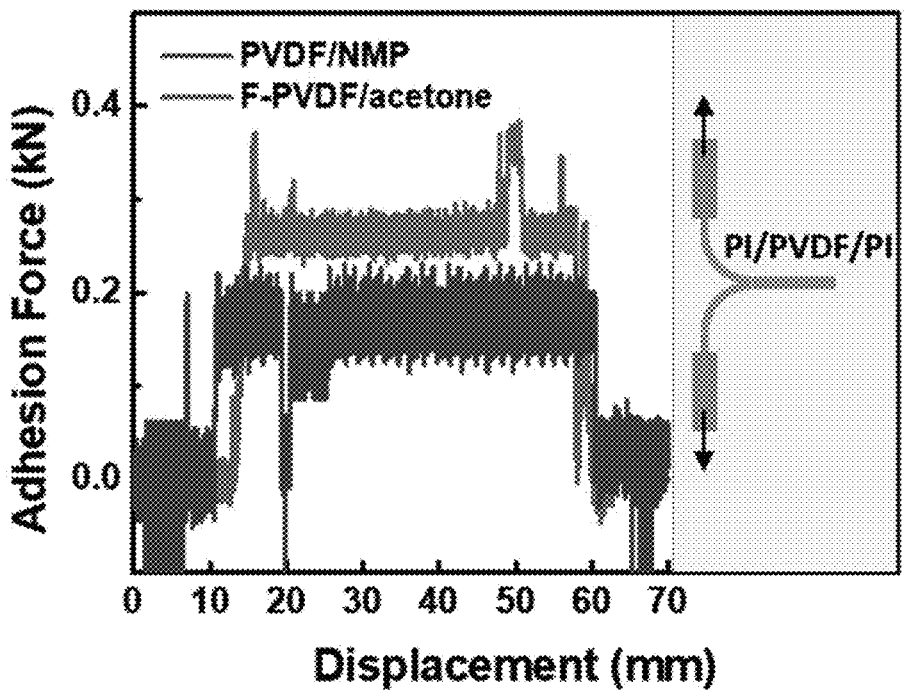
FIG. 3D shows the adhesion measurement result of a dried PVDF/NMP film and an F-PVDF/acetone film through peel test.

FIG. 3A shows the X-ray photoelectron C1s spectra of F-PVDF prepared in Example 1 and pristine PVDF for comparison, FIG. 3B shows the differential scanning calorimetry (DSC) (10° C./min) curves of the dried F-PVDF/NMP film and the F-PVDF/acetone film (red solid line) in acetone at room temperature (red broken line) and N-methylpyrrolidone (NMP) at 60° C. (blue broken line) and the wet F-PVDF/NMP film and the wet F-PVDF/acetone film immersed in acetone (red solid line) and NMP (blue solid line), FIG. 3C shows the X-ray diffraction (XRD) patterns of the dried pristine PVDF/NMP film (gray), the F-PVDF/NMP film (blue) and the F-PVDF/acetone film (red), and FIG. 3D shows the adhesion measurement result of the dried PVDF/NMP film and the F-PVDF/acetone film through peel test.

Figure 4A:
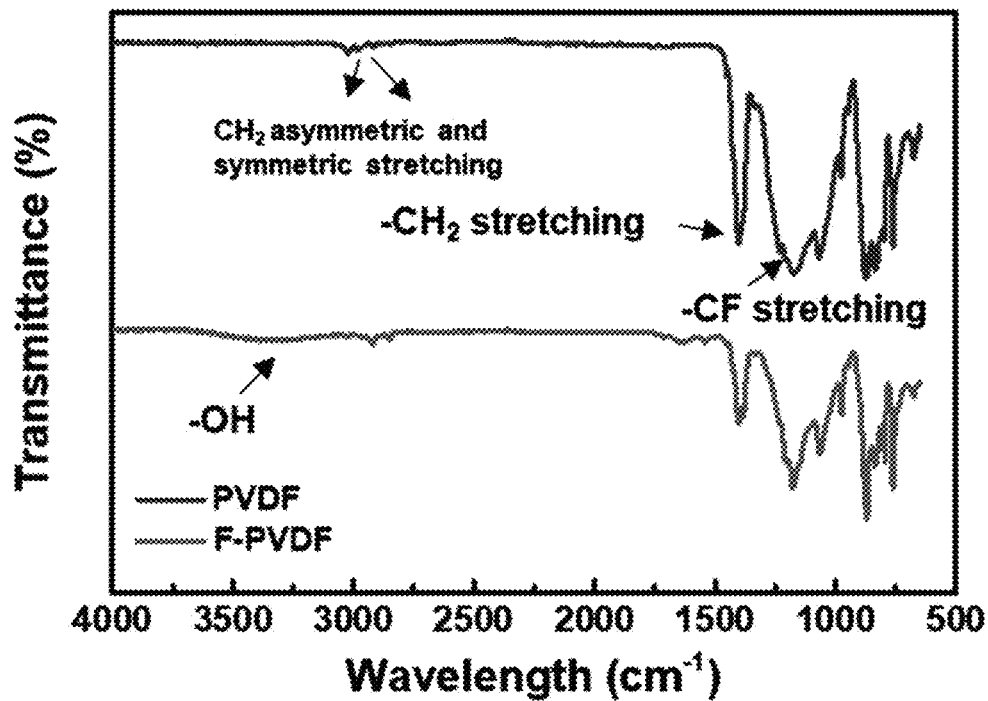
FIG. 4A shows the FT-IR spectra of F-PVDF prepared in Example 1 and pristine PVDF powder for comparison and FIG. 4B shows the FT-IR spectra of PVDF/NMP (gray), F-PVDF/NMP (blue) and F-PVDF/acetone (red) films.
Figure 4B:
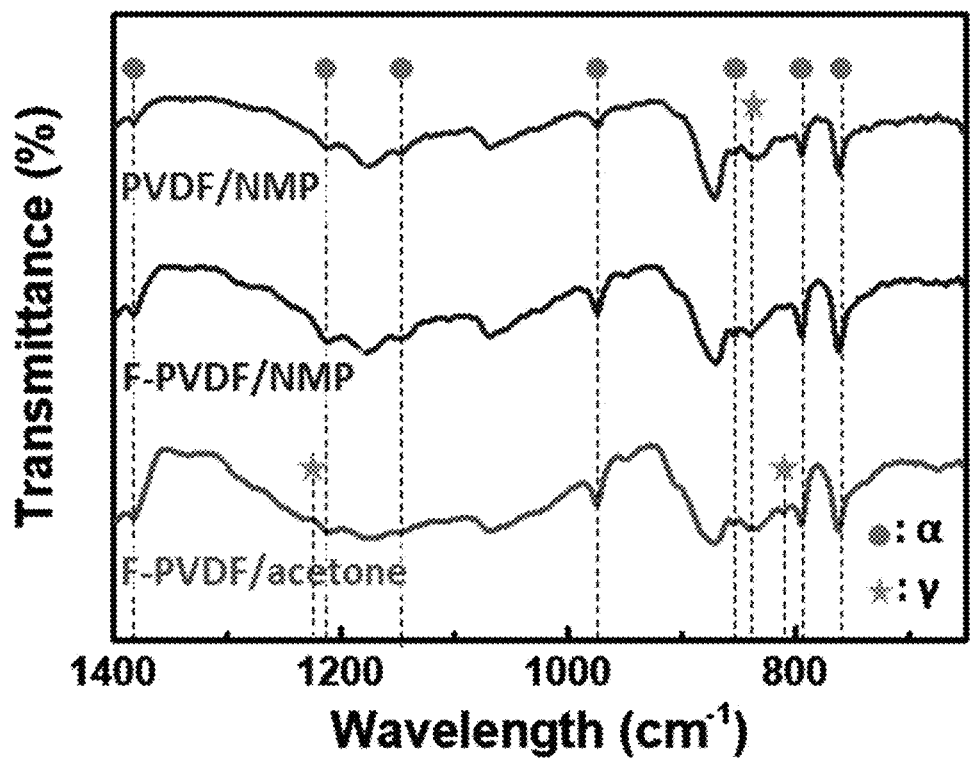

FIG. 4A shows the FT-IR spectra of the F-PVDF prepared in Example 1 and the pristine PVDF powder for comparison and FIG. 4B shows the FT-IR spectra of the PVDF/NMP (gray), F-PVDF/NMP (blue) and F-PVDF/acetone (red) films.

Figure 5:
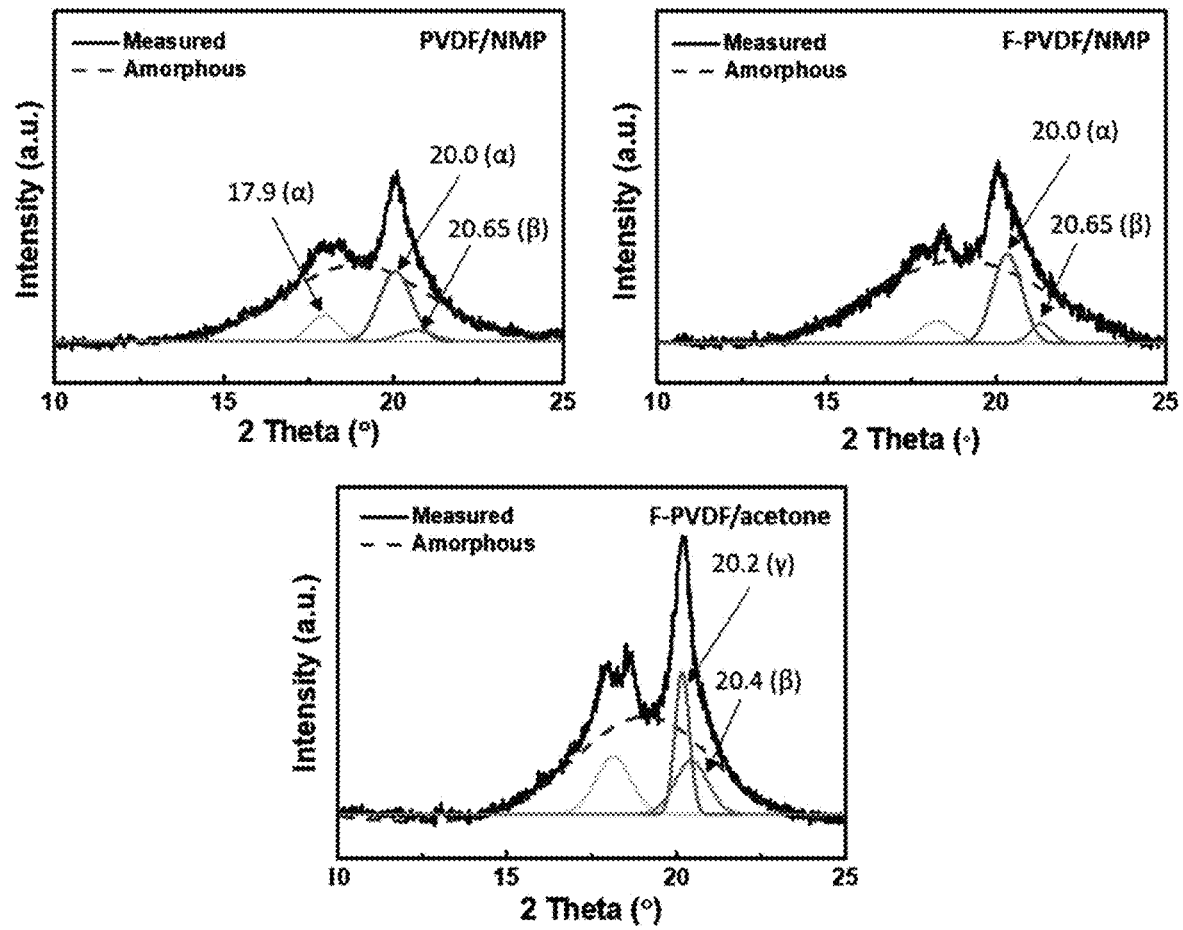
FIG. 5 shows the XRD spectra of PVDF/NMP, F-PVDF/NMP and F-PVDF/acetone films using F-PVDF prepared in Example 1 and pristine PVDF.

FIG. 5 shows the XRD spectra of the PVDF/NMP, F-PVDF/NMP and F-PVDF/acetone films using the F-PVDF prepared in Example 1 and the pristine PVDF.

As seen from FIG. 3A and FIG. 4A, the F-PVDF of Example 1 showed a new strong CO peak at the binding energy of 288.9 eV (C1s) whereas the C—F peak at the binding energy of 291.7 eV was less strong. In addition, the F-PVDF of Example 1 showed a new hydroxyl group (OH) absorption peak in the FT-IR spectrum at 3350 cm$^{-1}$. This indicates that the partially hydroxyl-functionalized F-PVDF facilitated the interaction with the electrode active material.

Also, referring to FIG. 3B, when the difference in the crystallinity of the F-PVDF film after the solvent evaporation and the change in crystallites due to electrolyte wetting were investigated by differential scanning calorimetry, the melting temperatures ($T_m$) of the F-PVDF/N-methylpyrrolidone (NMP) and F-PVDF/acetone films were 156° C. and 162° C., respectively. It was confirmed that the F-PVDF/acetone film was more crystalline and a physically cross-linked crystalline structure was formed due to gelation during the evaporation.

For the wet F-PVDF/NMP film (blue solid line), the melting temperature of the crystallites formed by treatment with NMP was shifted to 112° C., indicating that the crystals were swollen completely. However, for the wet F-PVDF/acetone film (red solid line), two melting temperature peaks were observed for the crystallites. The low-temperature peak at 123° C. corresponded to the partially swollen F-PVDF and the high-temperature peak at 154° C. corresponded to the unswelled crosslinked structure. This confirms the superior electrolyte stability of the F-PVDF film because the rigid physical crosslinked structure could be maintained even when the F-PVDF film was immersed in the electrolyte.

Referring to FIG. 3C, FIG. 4B and FIG. 5, the PVDF/NMP film was mainly in α-phase, whereas the F-PVDF/NMP film had α- and γ-phase crystallites. In addition, whereas the PVDF/acetone film contained relatively small (7.5 nm) α-phase crystallites, the crystallites of the F-PVDF/acetone film were larger in acetone (16.9 nm) than in NMP (8.4 nm). This suggests that physical crosslinking between polymer chains can only be achieved with crystallites formed from acetone because the number of PVDF chains that make up the crystallites can be multiplied only when the size is close to the radius of gyration (polydispersity index=12 nm) of PVDF.

As seen from FIG. 3D, the adhesion strength of the F-PVDF/NMP film to the PI film was 1.5 times higher than that of the pristine PVDF/NMP film. The appreciably increased adhesion strength of the F-PVDF/NMP film was due to the hydroxyl group introduced by functionalization. Accordingly, it can be seen that the F-PVDF-based stretchable electrode can maintain stretchability without peeling of the electrolyte due to the enhanced interface between the electrode active material and the binder.

Test Example 2

Analysis of Resistance of Stretchable Electrode and Stretchable Current Collector to Strain The morphological change and resistance of the PCOG/LFP positive electrode, the PCOG/LTO negative electrode and the stretchable current collector (SCC-Ag) for a negative electrode prepared in Example 1 and the PVDF/LFP positive electrode prepared in Comparative Example 1 were analyzed at 0-140% strain. In addition, the change in resistance depending on stretching/releasing cycles was analyzed. The result is shown in FIGS. 6-8.

Figure 6A:
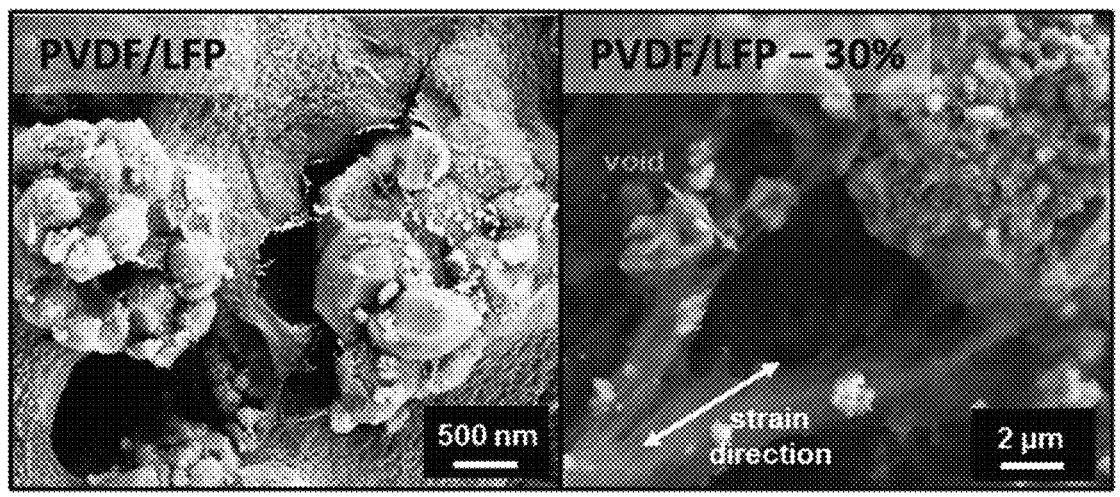
FIGS. 6A to 6E show the SEM images of a PVDF/LFP positive electrode prepared in Comparative Example 1 (FIG. 6A), a PCOG/LFP positive electrode prepared in Example 1 (FIG. 6B) and a stretchable current collector (SCC-Ag) for a negative electrode under unstrained and 50% strain conditions (FIG. 6D), the variation of resistance with strain for a PCOG/LTO negative electrode prepared in Example 1 (red), a PCOG/LFP positive electrode (blue) and a PVDF/LFP positive electrode prepared in Comparative Example 1 (black) (FIG. 6C), and the variation of resistance with strain for a current collector (PIB/Ag) for a negative electrode prepared in Comparative Example 1 (gray) and a current collector for a positive electrode (PIB/Ni) (blue) (FIG. 6E).
Figure 6B:
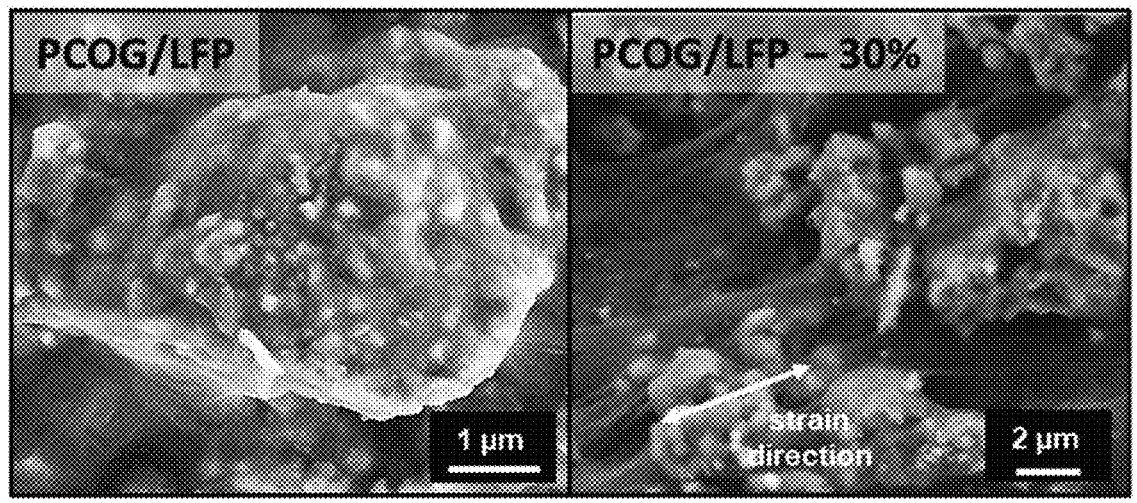
Figure 6C:
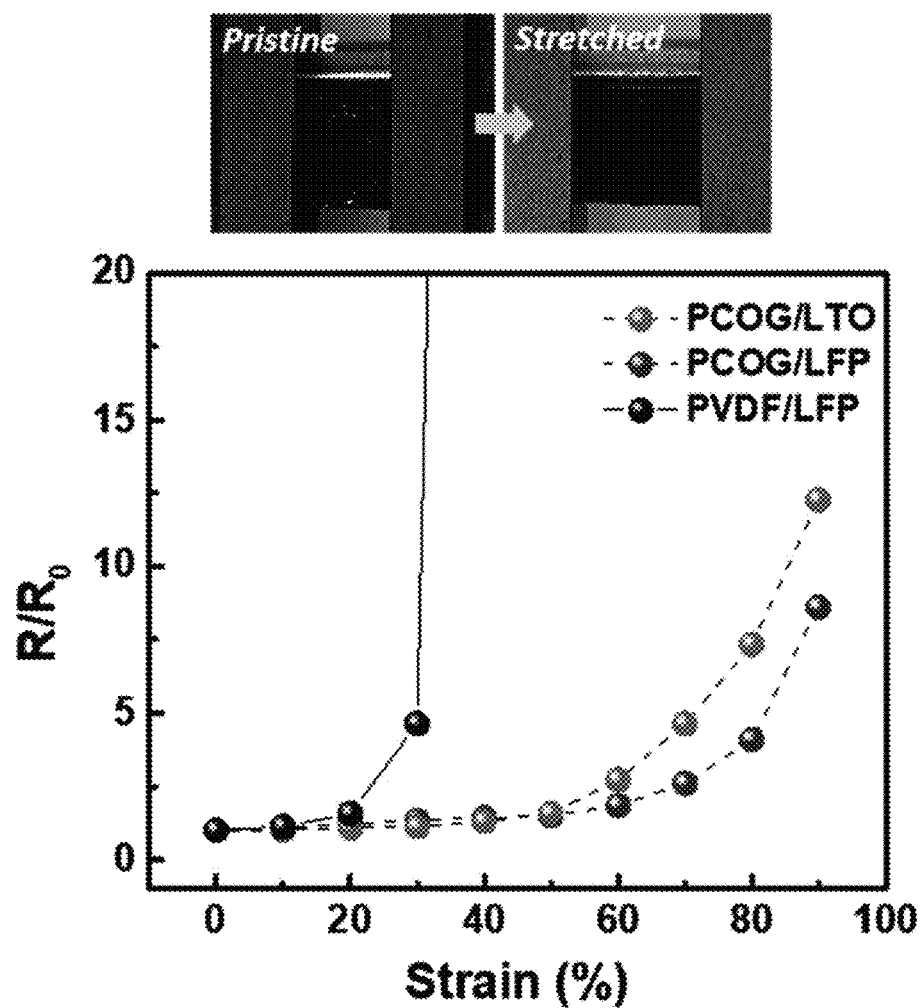
Figure 6D:
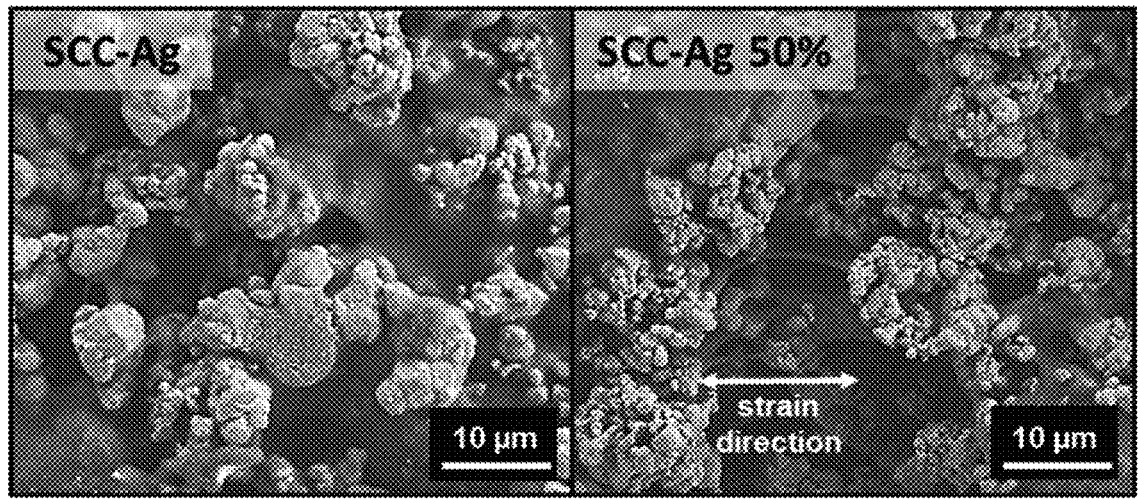
Figure 6E:
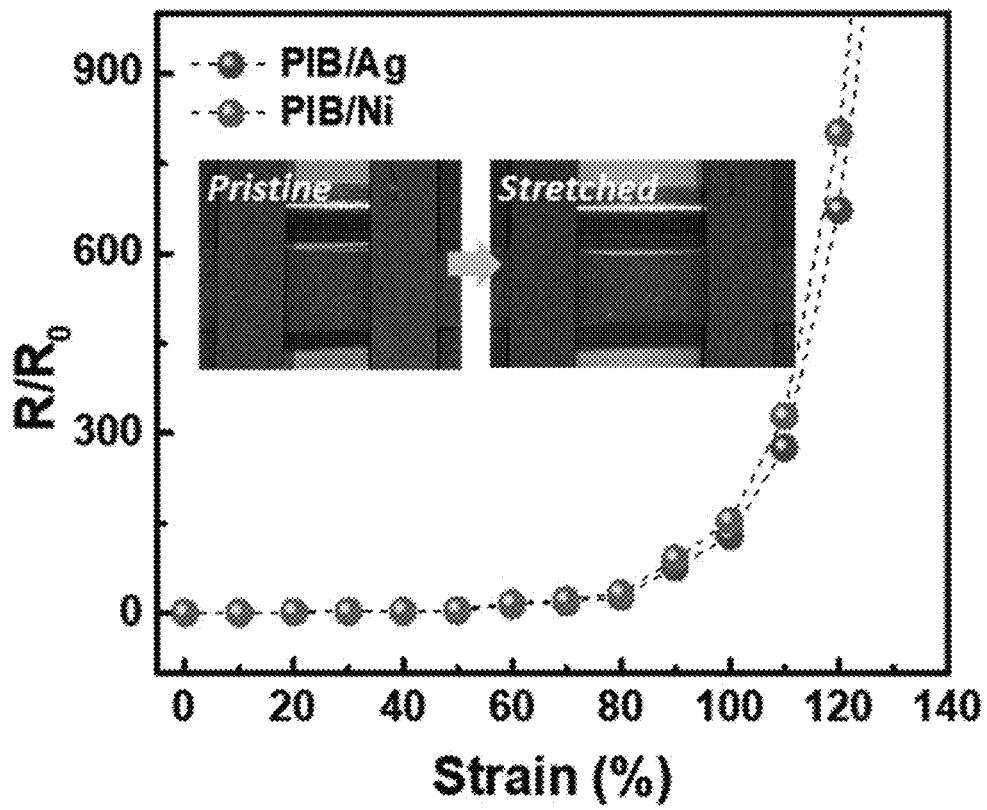

FIGS. 6A to 6E show the SEM images of the PVDF/LFP positive electrode prepared in Comparative Example 1 (FIG. 6A), the PCOG/LFP positive electrode prepared in Example 1 (FIG. 6B) and the stretchable current collector (SCC-Ag) for a negative electrode under unstrained and 50% strain conditions (FIG. 6D), the variation of resistance with strain for the PCOG/LTO negative electrode prepared in Example 1 (red), the PCOG/LFP positive electrode (blue) and the PVDF/LFP positive electrode prepared in Comparative Example 1 (black) (FIG. 6C), and the variation of resistance with strain for the current collector (PIB/Ag) for a negative electrode prepared in Comparative Example 1 (gray) and the current collector for a positive electrode (PIB/Ni) (blue) (FIG. 6E).

As seen from FIGS. 6A and 6B, the PVDF/LFP positive electrode of Comparative Example 1 contained a large number of voids between the LFP active material and the PVDF binder and delamination occurred at 30% strain due to poor adhesion. In contrast, in the PCOG/LFP positive electrode of Example 1, LFP particles were covered uniformly without voids and the network structure was maintained without debonding from the particles even in the deformed state. Since the PCOG/LFP positive electrode had a physically crosslinked crystalline portion a portion partially swollen in the electrolyte and hydroxyl functional groups for strong adhesion, stretchability was maintained even at 30% strain despite the low content of F-PVDF in gel form.

Also, referring to FIG. 6C, when the resistance of the PCOG/LTO negative electrode and the PCOG/LFP positive electrode of Example 1 and the PVDF/LFP positive electrode of Comparative Example 1 was measured at various strains, the resistance of the PCOG-based PVDF/LFP positive electrode and PCOG/LTO negative electrode barely changed up to 50% strain, started to increase at 60%, and showed increase by a factor of 8 at 90% strain. In contrast, the PVDF/LFP positive electrode of Comparative Example 1 cracked at a strain lower than 40%.

Also, referring to FIGS. 6D and 6E, the Ag particles were uniformly distributed in PIB in the initial state for the SCC-Ag current collector and the SCC-Ni current collector of Example 1, and the conductive particles maintained a dense conductive network at 50% strain due to the elastic properties of the PIB.

In addition, the electrical conductivity of the SCC-Ag current collector and the SCC-Ni current collector was 3,912 and 2,105 S/cm, respectively. The resistance of the SCC-Ni current collector and the SCC-Ag current collector increased slightly from 7.4 to 43Ω and from 2.1 to 12Ω, respectively, from no strain to 50% strain, and stable deformation was achieved up to 130% strain.

Meanwhile, the PIB/Ag current collector (gray) and the PIB/Ni current collector (blue) of Comparative Example 1 showed stable deformation even at 80% strain due to the elastic properties of the PIB.

Figure 7A:
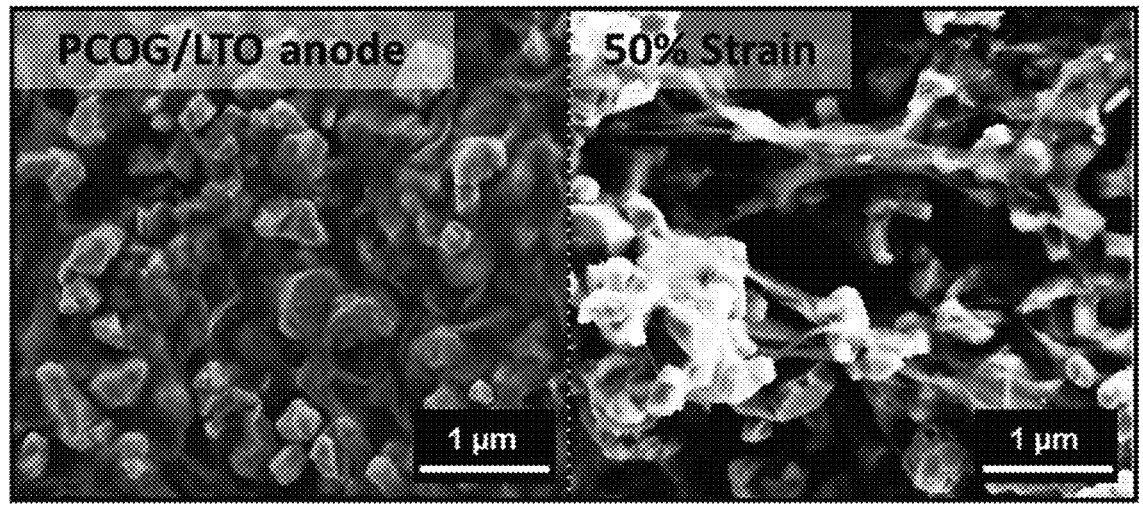
FIGS. 7A and 7B show the SEM images of a PCOG/LTO negative electrode prepared in Example 1 (FIG. 7A) and a stretchable current collector (SCC-Ni) for a positive electrode under unstrained and 50% strain conditions (FIG. 7B).
Figure 7B:
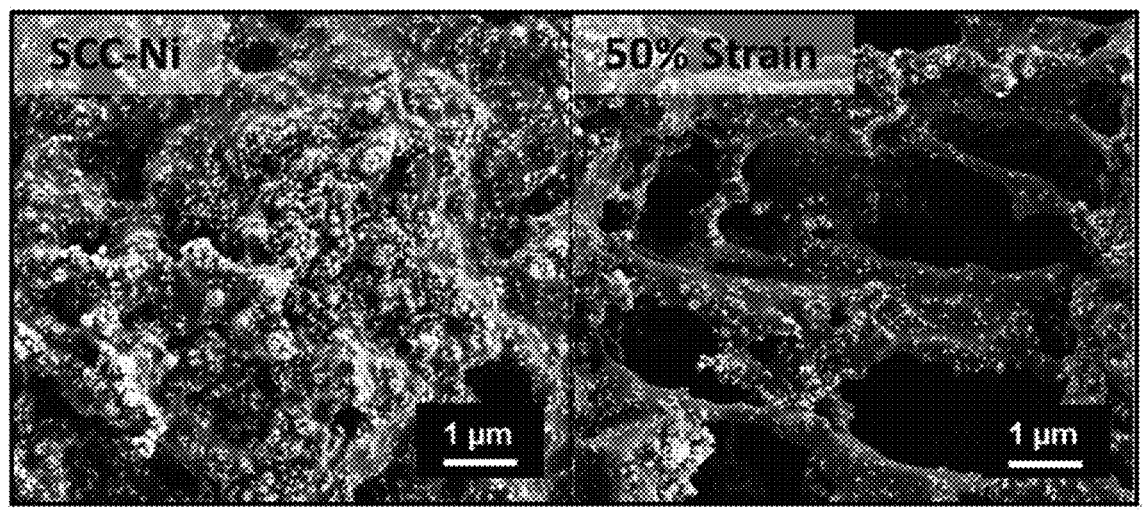

FIGS. 7A and 7B show the SEM images of the PCOG/LTO negative electrode prepared in Example 1 (FIG. 7A) and the stretchable current collector (SCC-Ni) for a positive electrode under unstrained and 50% strain conditions (FIG. 7B). As seen from FIGS. 7A and 7B, the PCOG/LTO negative electrode also showed similar morphological stability even at 50% strain. In addition, for the SCC-Ni current collector, the Ni particles were uniformly distributed in PIB in the initial state, and the conductive particles maintained a dense conductive network at 50% strain due to the elastic properties of the PIB.

Figure 8A:
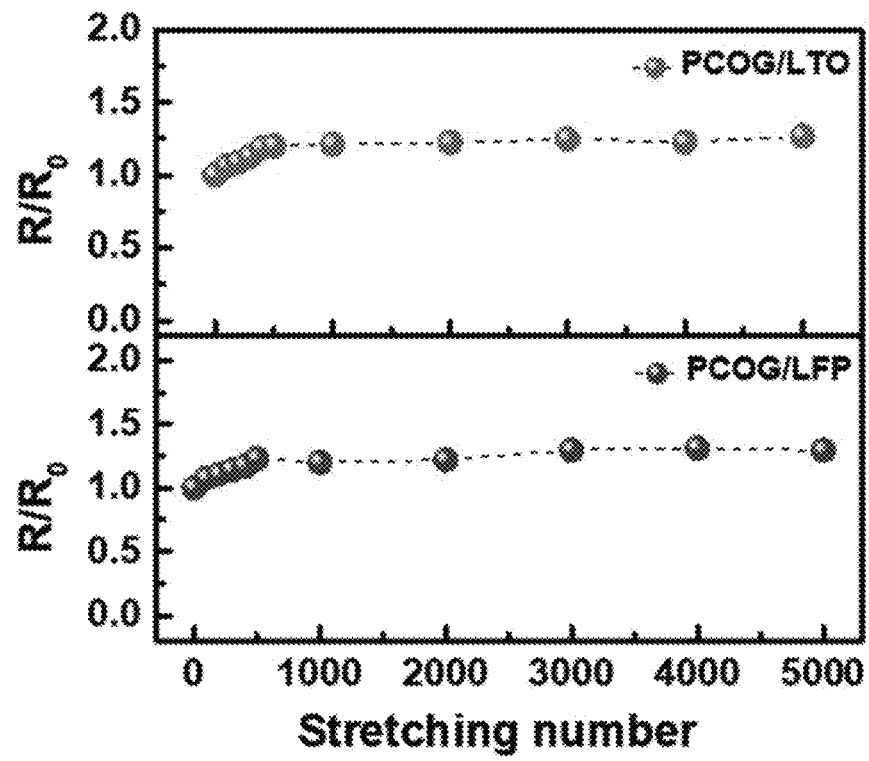
FIGS. 8A and 8B show the resistivity of a PCOG/LTO negative electrode and a PCOG/LFP positive electrode prepared in Example 1 (FIG. 8A) and an SCC-Ag current collector for a negative electrode and an SCC-Ni current collector for a positive electrode depending on repeated stretching/releasing cycles at 50% strain (FIG. 8B).
Figure 8B:
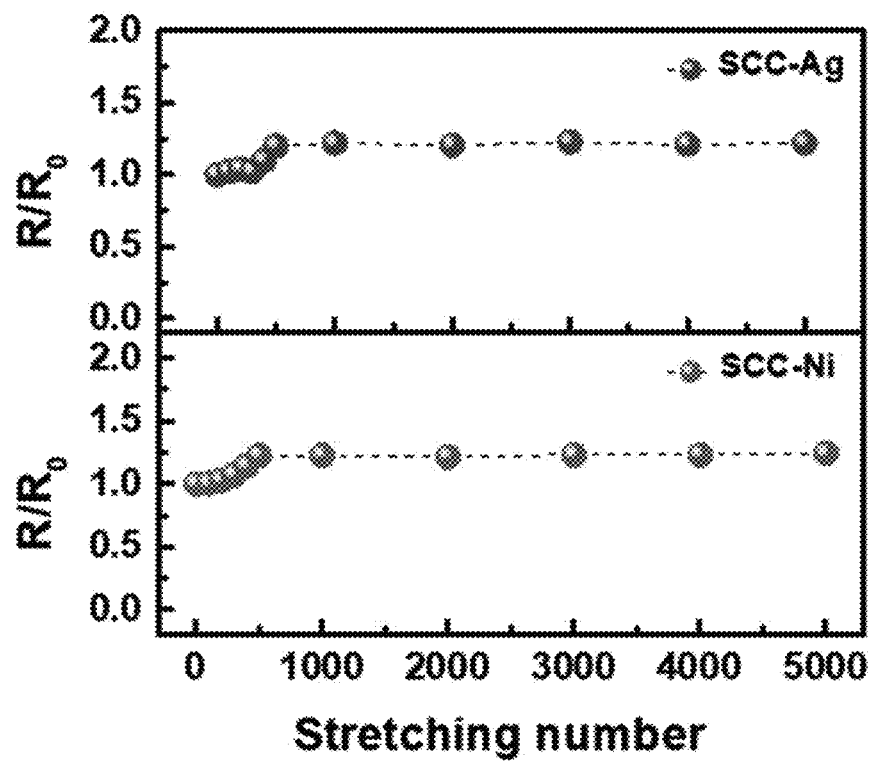

FIGS. 8A and 8B show the resistivity of the PCOG/LTO negative electrode and the PCOG/LFP positive electrode prepared in Example 1 (FIG. 8A) and the SCC-Ag current collector for a negative electrode and the SCC-Ni current collector for a positive electrode depending on repeated stretching/releasing cycles at 50% strain (FIG. 8B). Referring to FIGS. 8A and 8B, the PCOG/LTO negative electrode and the PCOG/LFP positive electrode showed very stable strain characteristics with little change in resistance and showed superior electrical stability with resistance change by 1.22 and 1.24, respectively, after 5,000 stretching/releasing cycles at 50% strain. Through this, it can be seen that F-PVDF with improved stretchability and interfacial adhesivity can be used in the existing lithium-ion battery together with a general binder material and a stretchable battery can be prepared with the existing material and process.

Test Example 3-1

Analysis of Swelling Ratio of Stretchable Current Collector for Matrix Polymer

For a matrix polymer (PIB) of the stretchable current collector prepared in Example 1, the swelling ratio of general SEBS, PDMS and PU elastomer films was measured under a saturated vapor of a liquid electrolyte. Specifically, the swelling ratio was evaluated by analyzing the change in the thickness of an elastomer film including a liquid electrolyte using Filmetrics F20 under a saturated vapor of a 6 M $LiPF_6$ electrolyte in a 1:1:1 EC:DMC:DEC carbonate mixture solvent in a sealed chamber (9.5 mL) with a quartz window. The result is shown in FIG. 9.

Figure 9:
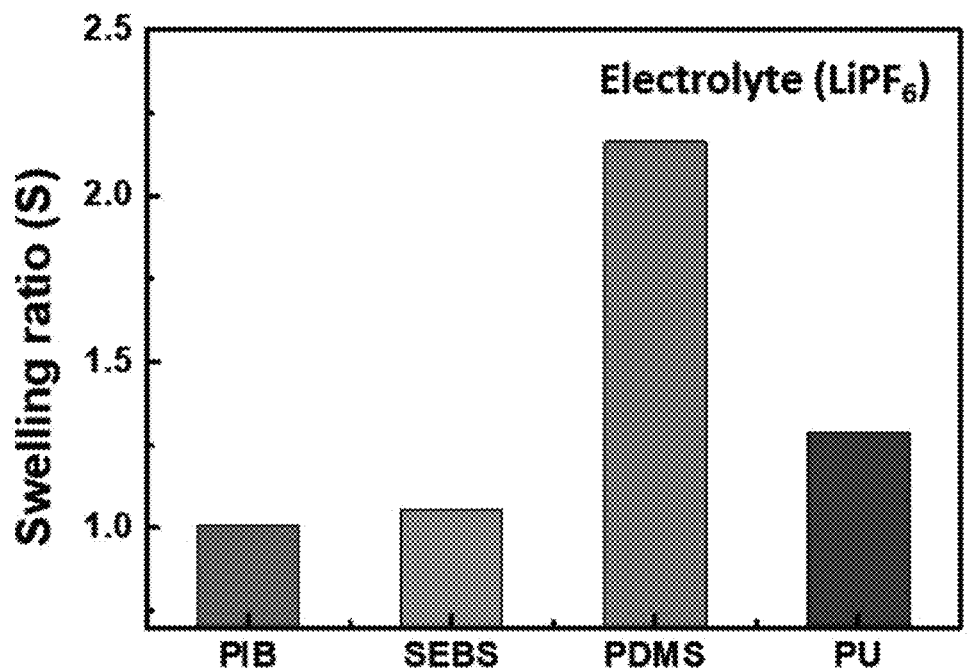
FIG. 9 shows a result of measuring the swelling ratio of a stretchable current collector prepared in Example 1 under a saturated vapor of a 6 M $LiPF_6$ electrolyte in a mixture of a matrix polymer (PIB) and 1:1:1 EC:DMC:DEC carbonates depending on the thickness of an elastomer film including SEBS, PDMS or PU.

FIG. 9 shows a result of measuring the swelling ratio of the stretchable current collector prepared in Example 1 under a saturated vapor of a 6 M $LiPF_6$ electrolyte in a mixture of a matrix polymer (PIB) and 1:1:1 EC:DMC:DEC carbonates depending on the thickness of an elastomer film including SEBS, PDMS or PU. Referring to FIG. 9, whereas the PIB film of Example 1 showed little change in thickness (swelling ratio, $S=t/t_0$), PDMS, which is an elastomer commonly used in a stretchable battery, showed significant swelling with S=2.25. The thickness change of the PU film was 1.25. For a stretchable battery, if the current collector is unnecessarily swollen by the electrolyte, a large amount of the electrolyte is necessary. Therefore, when the PIB film of Example 1 which hardly swells is used, the delamination between the electrode and the SCC can be prevented. It was confirmed that the PIB solution of Example 1 can be printed in any order together with the electrode coating solution.

Test Example 3-2

Analysis of Resistance Depending on Conductive Particle and Carbon Material of Stretchable Current Collector For the stretchable current collector prepared in Example 1, resistance was analyzed at 0-60% strain for Ag particles with different sizes (tri-modal, bi-modal, uni-modal) as the conductive particle and carbon material (MWCNT). The result are shown in FIGS. 10A and 10B.

Specifically, Ag particles with three sizes were used to investigate the effect of the size of the Ag particles in the SCC-Ag composite and the presence of 0.2 wt % multi-walled carbon nanotube (MWCNT) on the resistance under strain and the stability of electrical conductivity. As the Ag particles, Ag nanoparticles (Ag nano) with a size smaller than 150 nm and Ag microparticles with a size of 2-3.5 μm (Ag microA) and 5-8 μm (Ag microB) were used. For the unimodal system, only Ag microB was used. For the bimodal system, Ag nano and Ag microB were mixed at a weight ratio of 4:6. For the trimodal Ag system, Ag nano, Ag microA and microB were mixed at a weight ratio of 2:3:5.

Figure 10A:
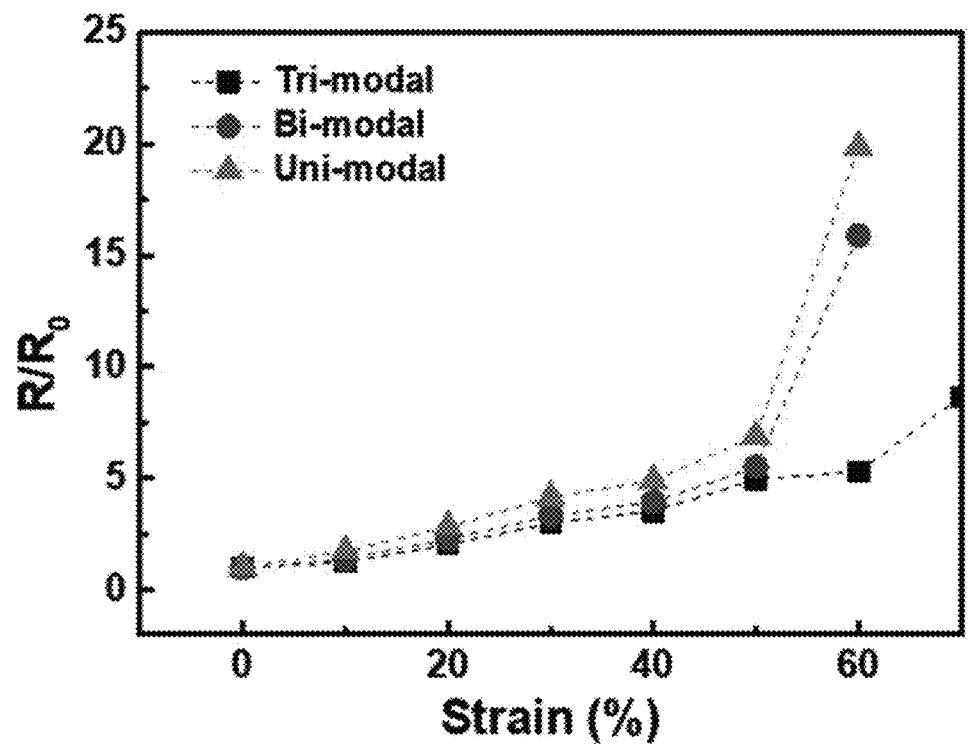
FIGS. 10A and 10B show the variation of resistance of a stretchable current collector prepared in Example 1 for Ag particles (tri-modal, bi-modal, uni-modal) and carbon materials (MWCNT) at 0-60% strains.
Figure 10B:
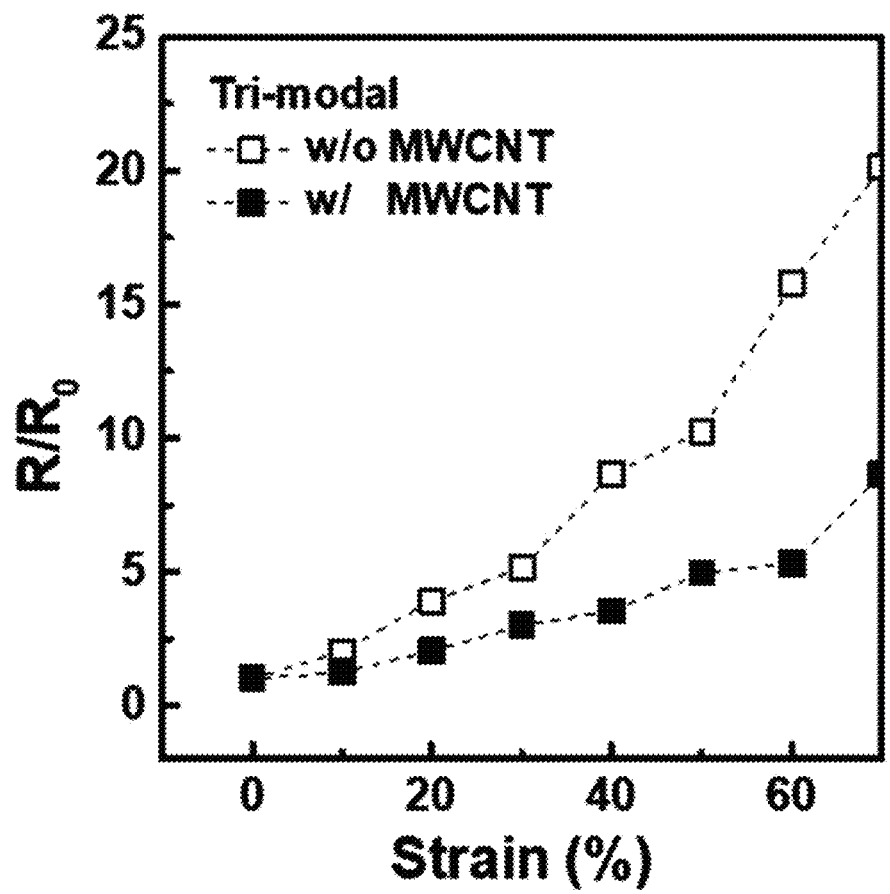

FIGS. 10A and 10B show the variation of resistance of a stretchable current collector prepared in Example 1 for Ag particles (tri-modal, bi-modal, uni-modal) and carbon materials (MWCNT) at 0-60% strains. As seen from FIGS. 10A and 10B, the resistance was lowest for the tri-modal Ag particles as compared to the bi-modal or uni-modal particles. In addition, electrical stability was improved when the stretchable current collector contained MWCNT (w/MWCNT) because the interaction between the Ag particles was increased and the network was formed more stably.

Test Example 4

Figure 11:
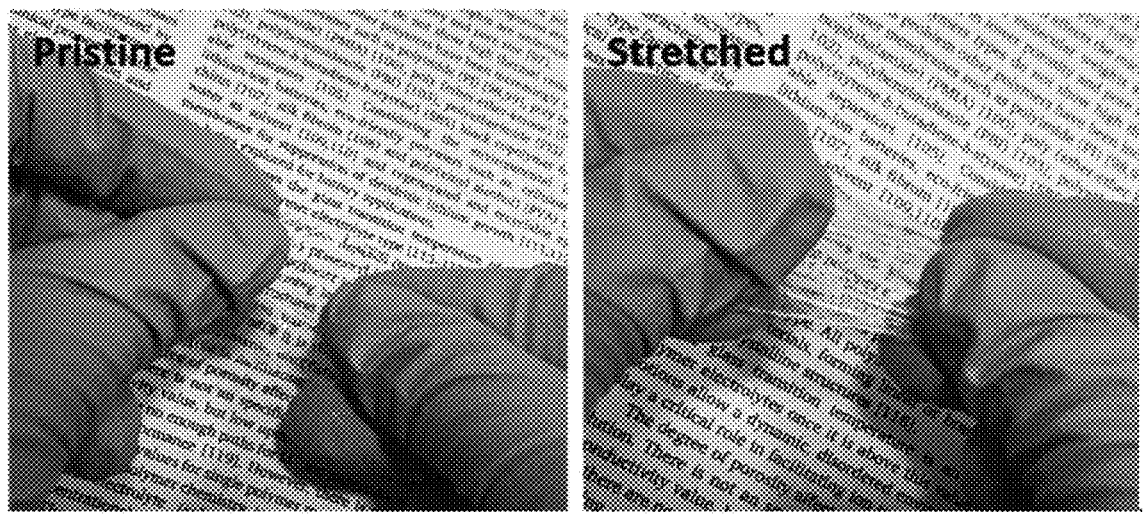
FIG. 11 shows a resulting of testing the stretchability of a PVDF-HFP-based stretchable separator (PCOG separator) prepared in Example 2.
Figure 12:
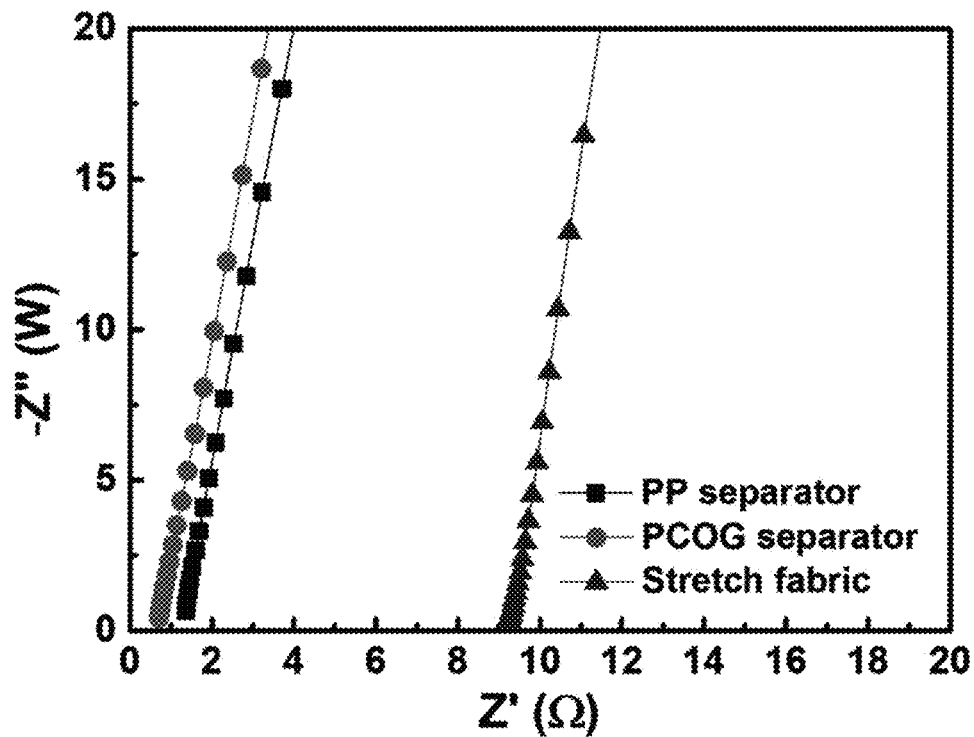
FIG. 12 shows the Nyquist plots and bulk resistance of batteries (stainless steel/separator/stainless steel) using a PCOG separator prepared in Example 2, an existing PP separator and a stretchable fabric.
Figure 13:
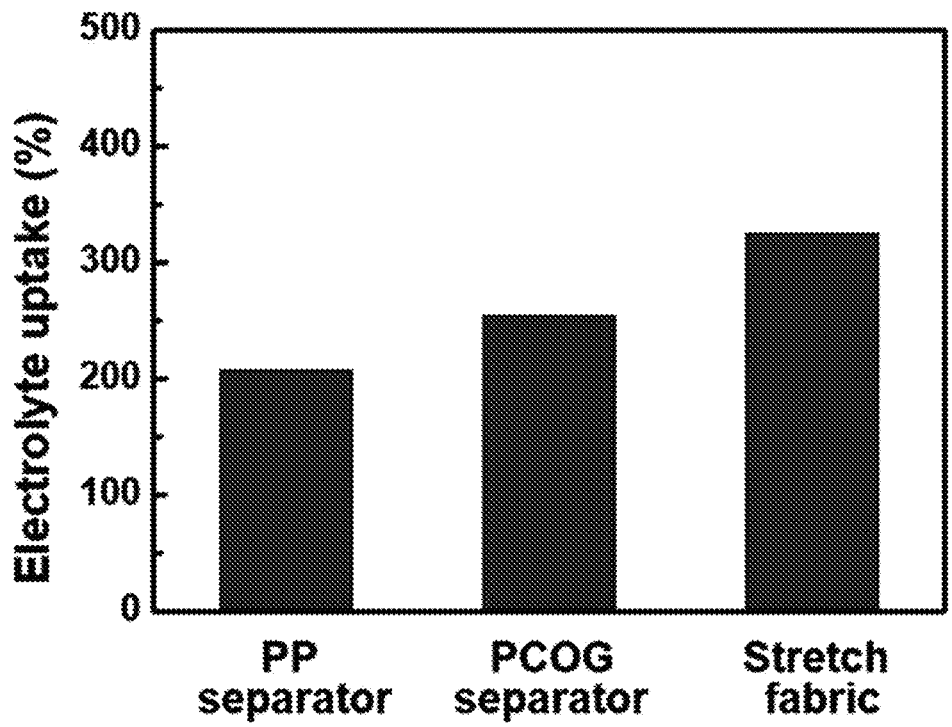
FIG. 13 shows a result of comparing the electrolyte uptake of a PCOG separator prepared in Example 2, an existing PP separator and a stretchable fabric.
Figure 14A:
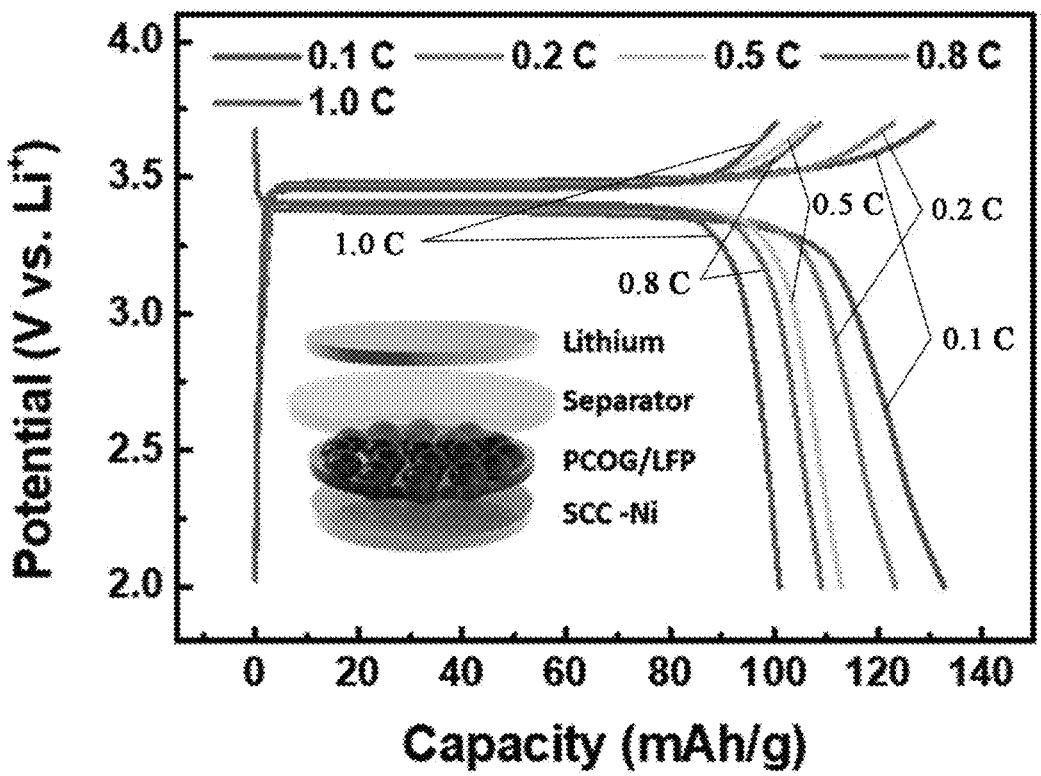
FIGS. 14A to 14F show the schematics, cycling performance and coulombic efficiency of a PCOG/LFP positive electrode (FIGS. 14A and 14B), a PCOG/LTO negative electrode (FIGS. 14C and 14D) and a PCOG full cell (FIGS. 14E and 14F) prepared in Example 2.
Figure 14B:
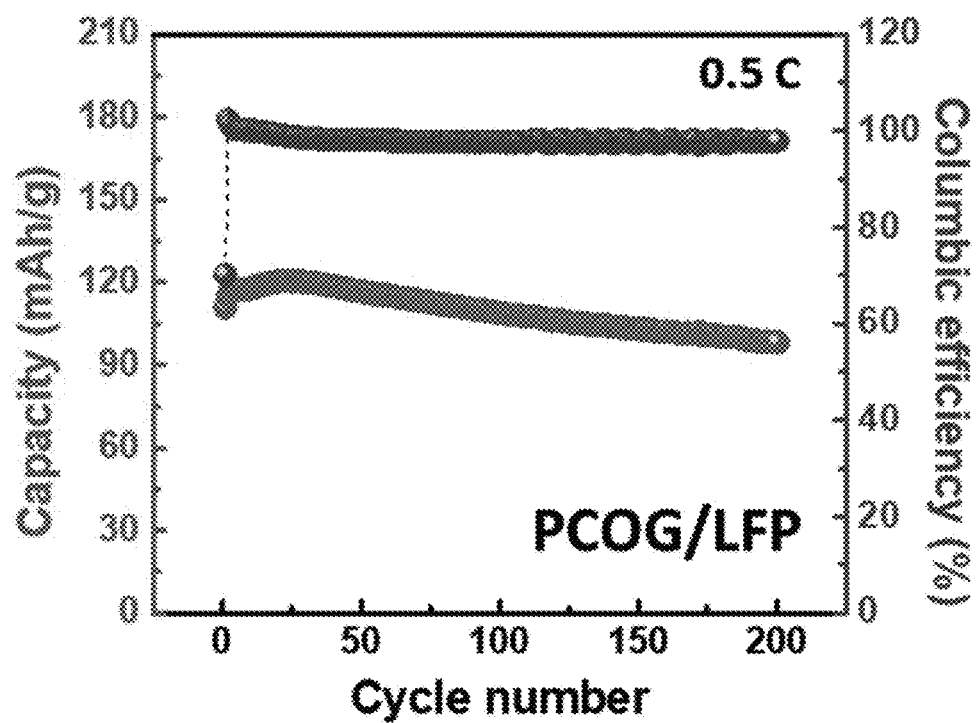
Figure 14C:
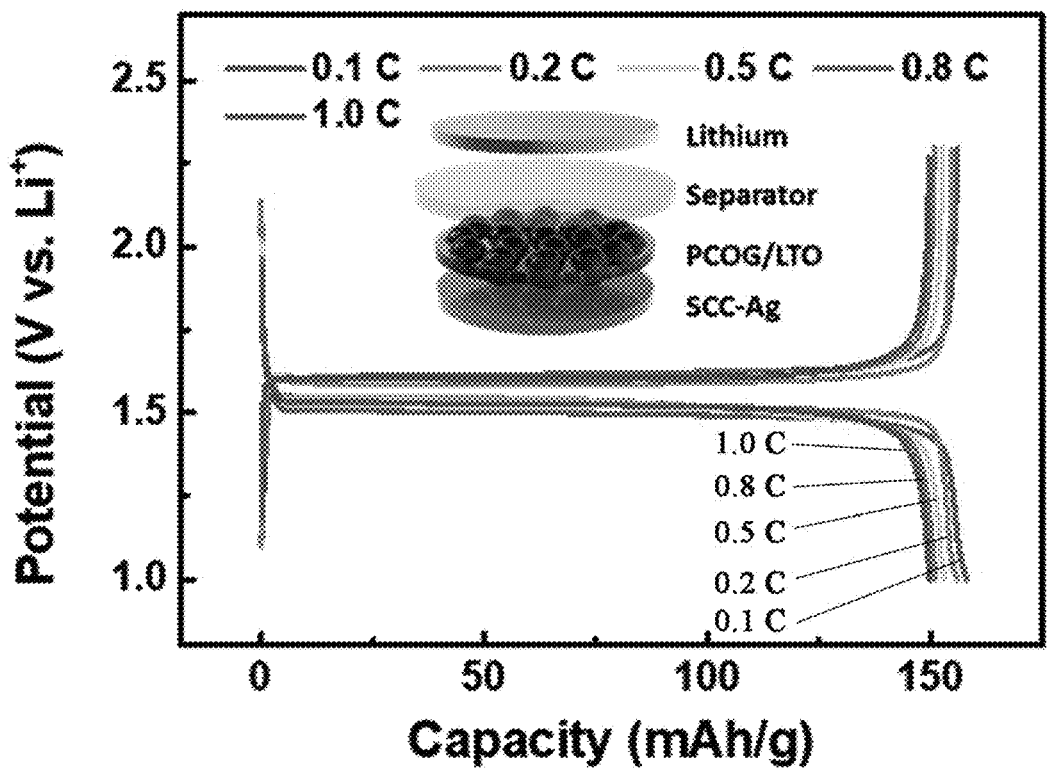
Figure 14D:
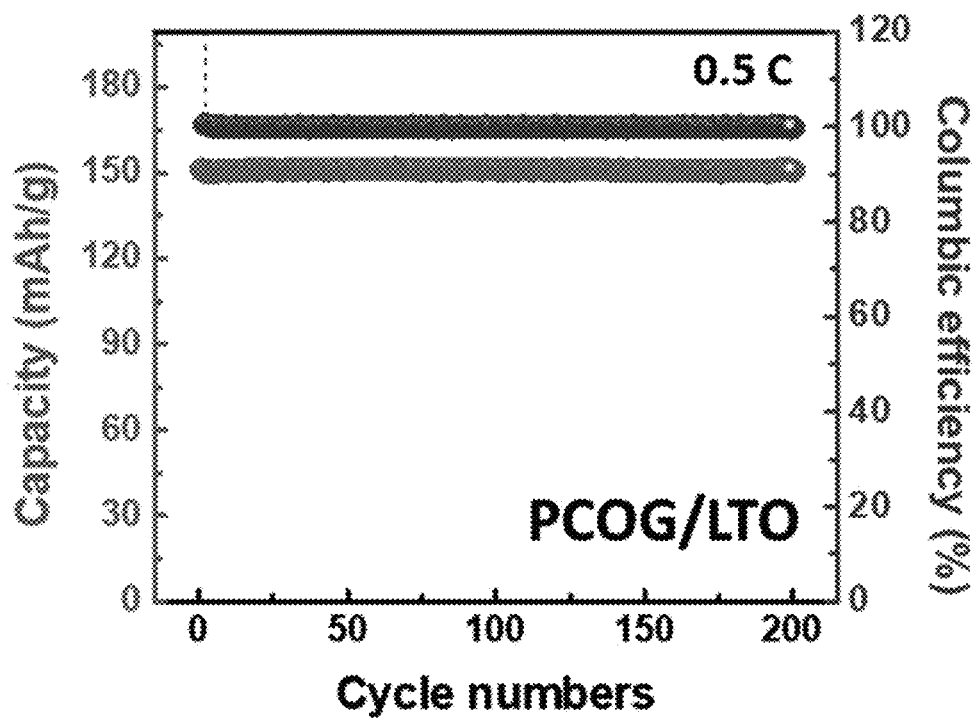
Figure 14E:
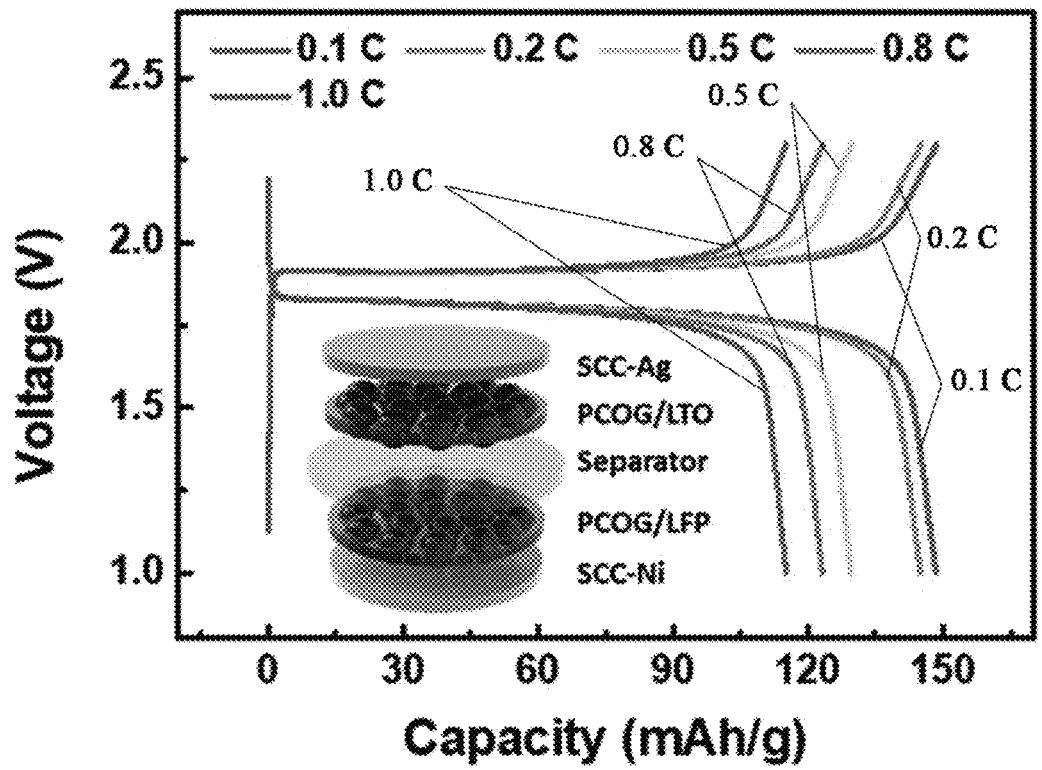
Figure 14F:
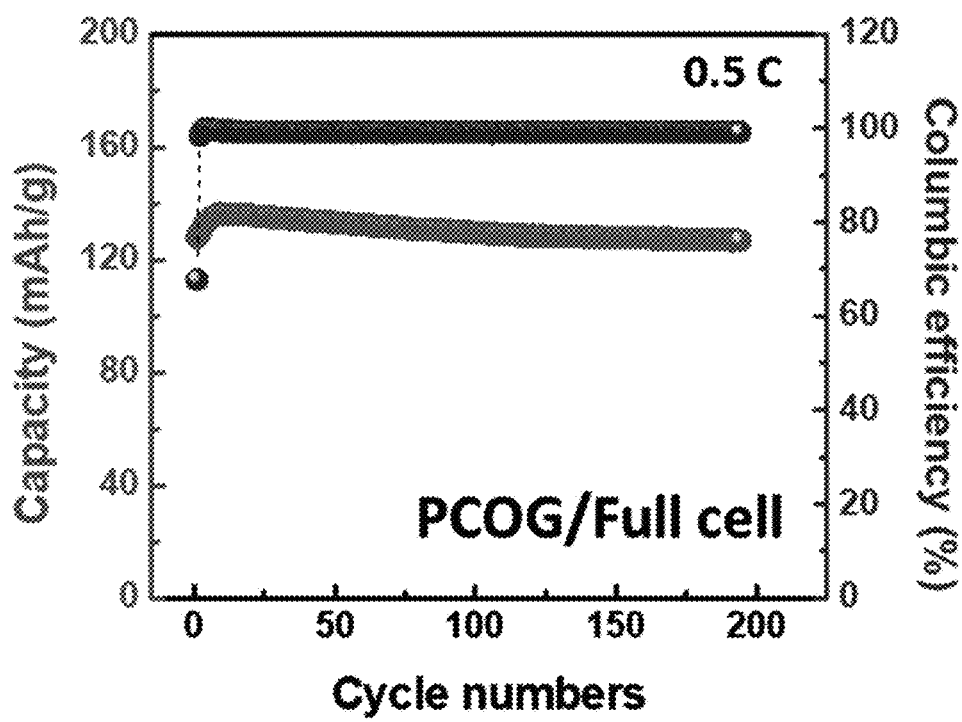

Analysis of Nyquist Plot, Bulk Resistance and Electrolyte Uptake of Stretchable Separator The Nyquist plot, bulk resistance and electrolyte uptake were analyzed for the stretchable separator prepared in Example 2 (PCOG separator). The result is shown in FIG. 11-13. For comparison, a battery was prepared using the existing PP separator and a stretchable fabric (stainless steel/separator/stainless steel).

FIG. 11 shows a resulting of testing the stretchability of the PVDF-HFP-based stretchable separator (PCOG separator) prepared in Example 2. Referring to FIG. 11, the electrolyte-impregnated PCOG separator showed superior stretchability and transparency owing to physical crosslinking. Therefore, it can be used as a stretchable separator.

FIG. 12 shows the Nyquist plots and bulk resistance of the batteries (stainless steel/separator/stainless steel) using the PCOG separator prepared in Example 2, an existing PP separator and a stretchable fabric. Referring to FIG. 12, the PP separator (black) showed a resistance of 1.4Ω, and the PCOG separator (red) showed the lowest resistance of 0.8Ω. The stretchable fabric (blue) had the highest resistance of 9.2Ω. In particular, the ion conductivity of the PCOG separator and the PP separator was slightly higher than that of the stretchable fabric as 0.986 mS/cm and 0.518 mS/cm, respectively.

FIG. 13 shows a result of comparing the electrolyte uptake of the PCOG separator prepared in Example 2, the existing PP separator and the stretchable fabric. Referring to FIG. 13, the electrolyte uptake was 200% for the PP separator, 250% or higher for the PCOG separator, and 300% or higher for the stretchable fabric.

Test Example 5

Analysis of Electrochemical Performance of Stretchable Battery

For the stretchable battery prepared in Example 2, the electrochemical performance of the PCOG/LFP positive electrode and the PCOG/LTO negative electrode was analyzed at 0.1 C, 0.2 C, 0.5 C, 0.8 C and 1.0 C. The test at constant current was conducted in a half-cell configuration using a standard 2032 coin cell with lithium metal as a counter electrode, PCOG as a separator and 1 M $LiPF_6$ in EC/DEC/DMC (1:1:1 vol %) as an electrolyte. The result is shown in FIGS. 14 to 17.

FIGS. 14A to 14F show the schematics, cycling performance and coulombic efficiency of the PCOG/LFP positive electrode (FIGS. 14A and 14B), the PCOG/LTO negative electrode (FIGS. 14C and 14D) and the PCOG full cell (FIGS. 14E and 14F) prepared in Example 2.

Figure 15A:
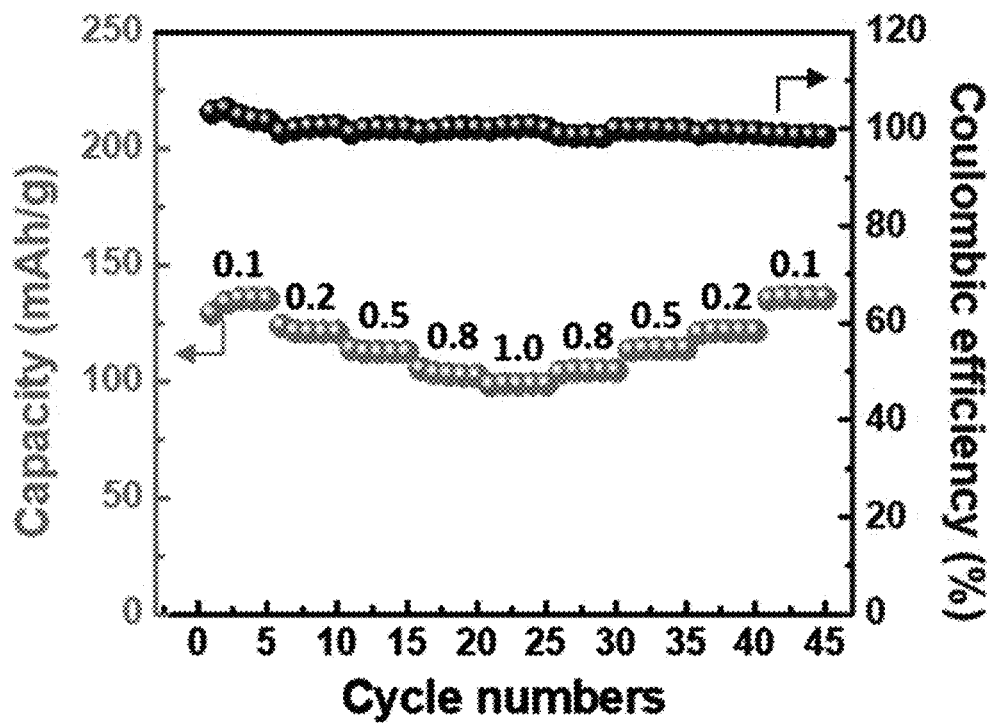
FIGS. 15A to 15C show the rate performance and coulombic efficiency of a PCOG/LFP positive electrode, a PCOG/LTO negative electrode and a PCOG full cell prepared in Example 2.
Figure 15B:
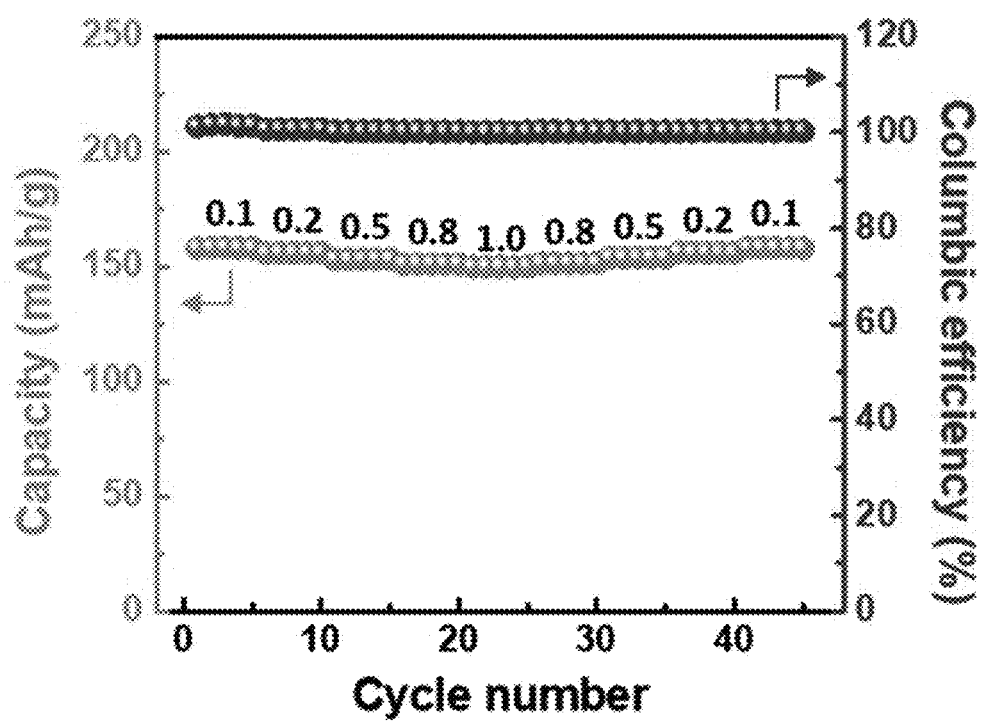
Figure 15C:
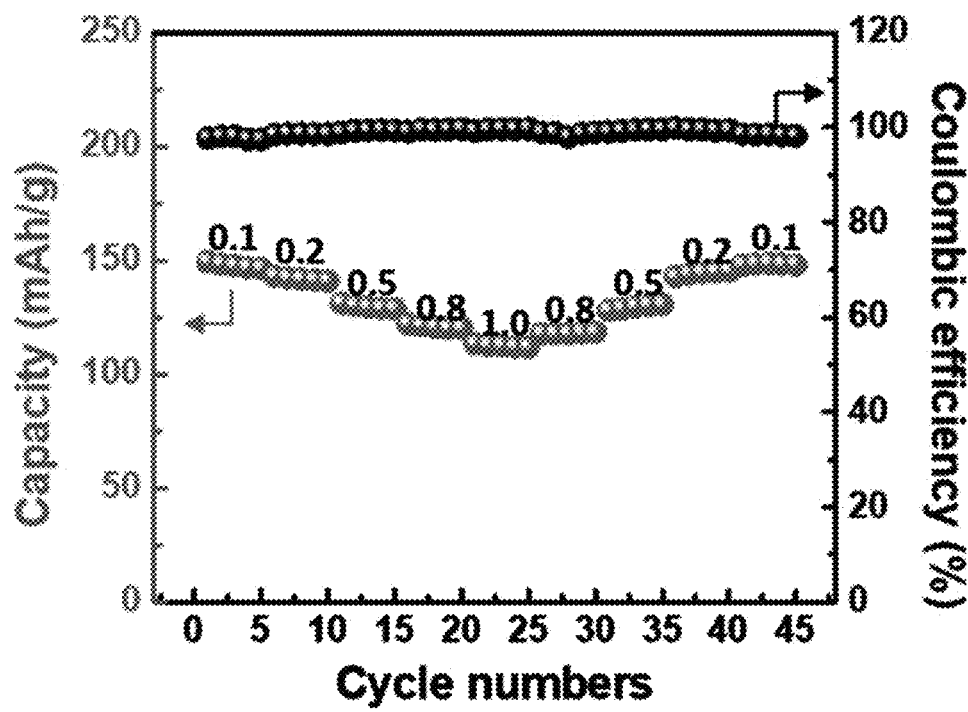

FIGS. 15A to 15C show the rate performance and coulombic efficiency of the PCOG/LFP positive electrode, the PCOG/LTO negative electrode and the PCOG full cell prepared in Example 2.

Referring to FIGS. 14A to 14F and FIGS. 15A to 15C, the discharge capacity of the PCOG/LFP positive electrode was 135, 121, 112, 102 and 99 mAh/g at 0.1, 0.2, 0.5, 0.8 and 1 C, respectively. Furthermore, the discharge capacity of the PCOG/LTO negative electrode was 158, 156, 153, 151 and 150 mAh/g at 0.1, 0.2, 0.5, 0.8 and 10, respectively. The discharge capacity of the PCOG/LFP positive electrode and the PCOG/LTO negative electrode after 200 cycles was 85% and 99%, respectively.

In addition, the discharge capacity of the LIB including the PCOG/LFP positive electrode and the PCOG/LTO negative electrode was 149 and 112 mAh/g at 0.2 and 1 C, respectively. Besides, the coulombic efficiency of all of the PCOG/LFP positive electrode, the PCOG/LTO negative electrode and the PCOG/LIB battery at 0.5 C was close to 100%.

Referring to FIG. 15C, the stretchable battery including the stretchable PCOG showed a very stable discharge capacity of 128 mAh/g at 0.5 C with a high capacity retention rate of 99% after 200 cycles. Through this, it was confirmed that all of the PCOG/LFP positive electrode, the PCOG/LTO negative electrode and the PCOG full cell have stable electrochemical performance.

Figure 16A:
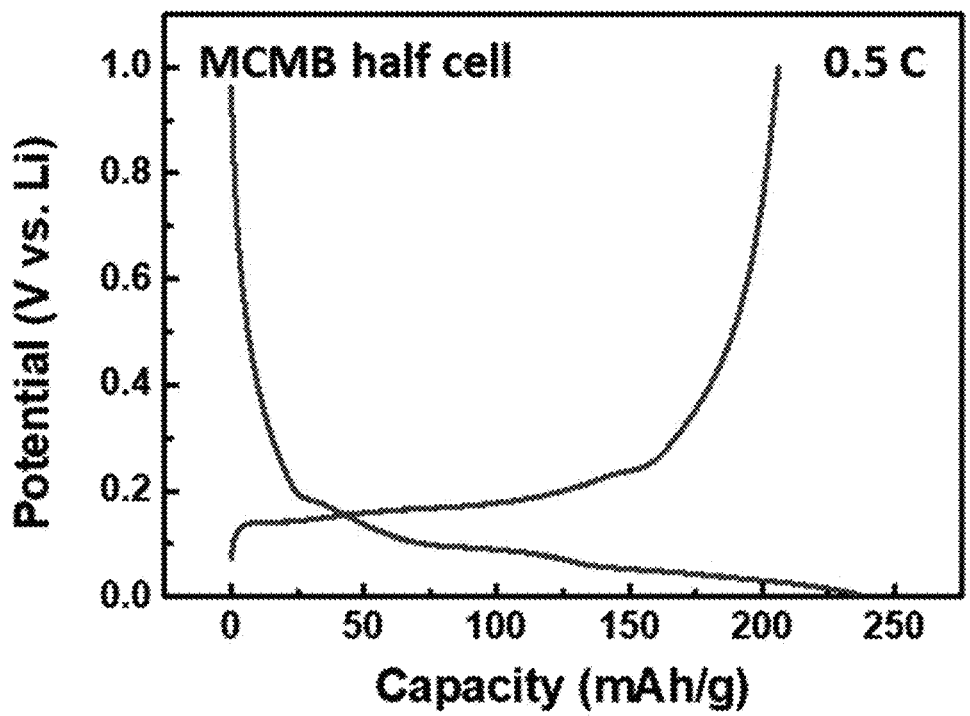
FIG. 16A shows the charge-discharge performance at 0.5 C
Figure 16B:
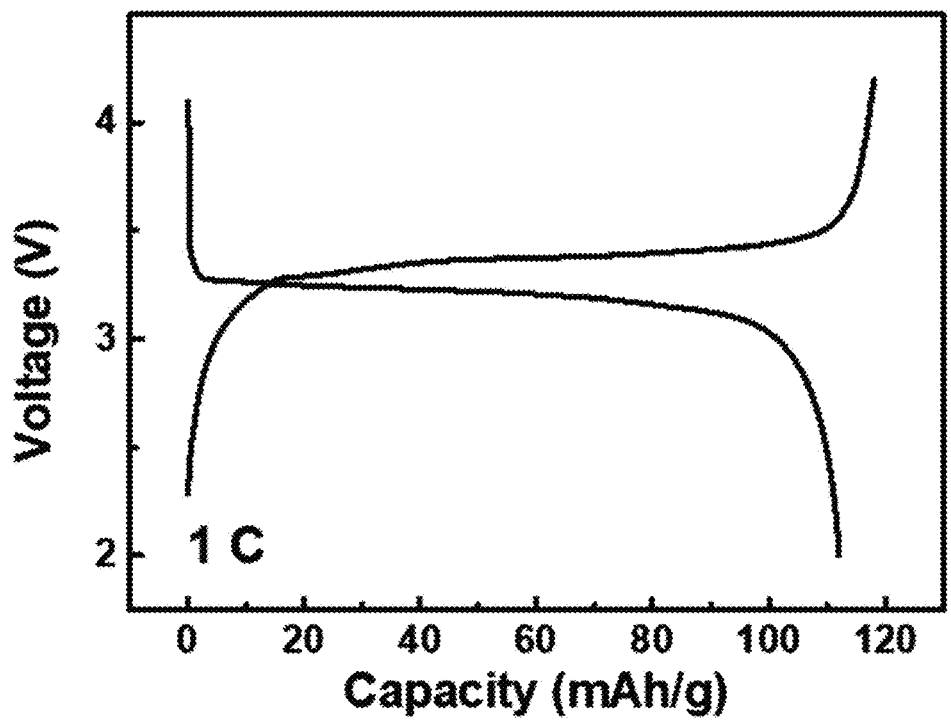
FIG. 16B shows the charge-discharge performance at 1 C of a half-cell using PCOG/MCMB (mesocarbon microbead) which is an MCMB-based stretchable electrode prepared in Example 3.

FIG. 16A shows the charge-discharge performance at 0.5 C and FIG. 16B shows the charge-discharge performance at 1 C of the half-cell using PCOG/MCMB (mesocarbon microbead) which is an MCMB-based stretchable electrode prepared in Example 3. Referring to 16, the battery using the PCOG/MCMB (mesocarbon microbead) stretchable positive electrode showed high performance with a battery capacity of 230 mAh/g at 0.5 C. In addition, although not shown in FIGS. 16A and 16B, the half-cell including PCOG/LFP and PCOG/graphite operated successfully at an operation voltage of 3.3 V and 0.5 C with a capacity of 142 mAh/g. Through this, it was confirmed that excellent cycling performance and high reversibility can be achieved by using stretchable positive electrode and negative electrode.

Figure 17:
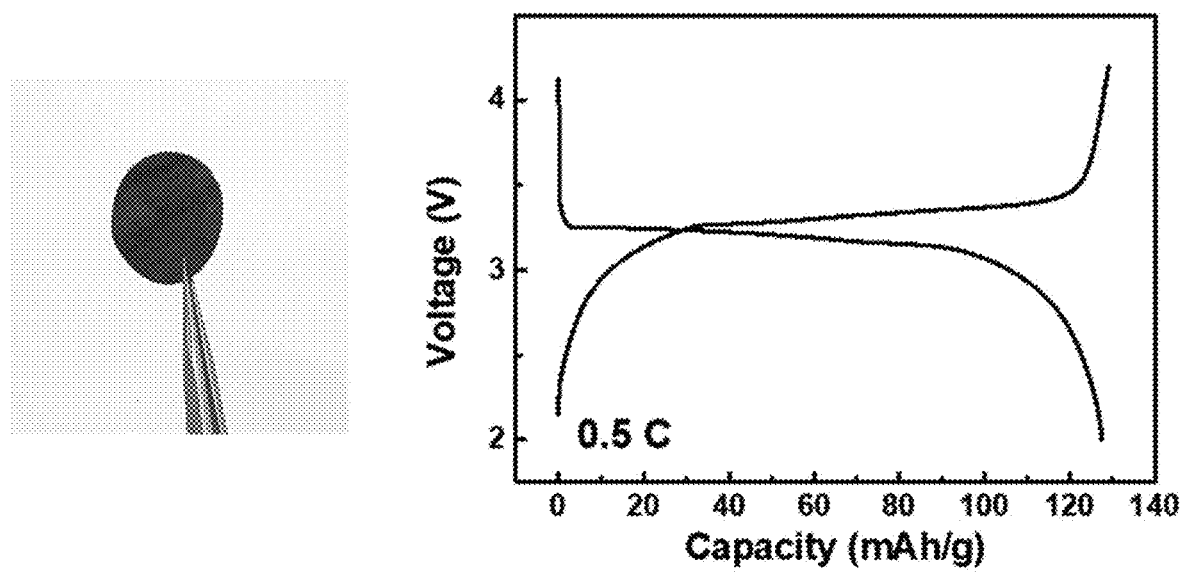
FIG. 17 shows the photograph and the charge-discharge performance at 0.5 C of a stretchable battery including an ionic liquid and a PCIG/LFP positive electrode, prepared in Example 4.

FIG. 17 shows the photograph and the charge-discharge performance at 0.5 C of the stretchable battery including an ionic liquid and a PCIG/LFP positive electrode, prepared in Example 4. Referring to FIG. 17, it can be seen that, for the same stretchable battery, the battery capacity was 128 mAh/g at 0.5 C when an ionic liquid was used instead of a carbonate solvent.

Test Example 6

Analysis of Battery Capacity and Coulombic Efficiency of Stretchable Lithium-Ion Battery For the stretchable battery prepared in Example 2, the battery capacity and coulombic efficiency depending on various strains and charge-discharge cycles were analyzed. The result is shown in FIGS. 18 and 19.

Figure 18A:
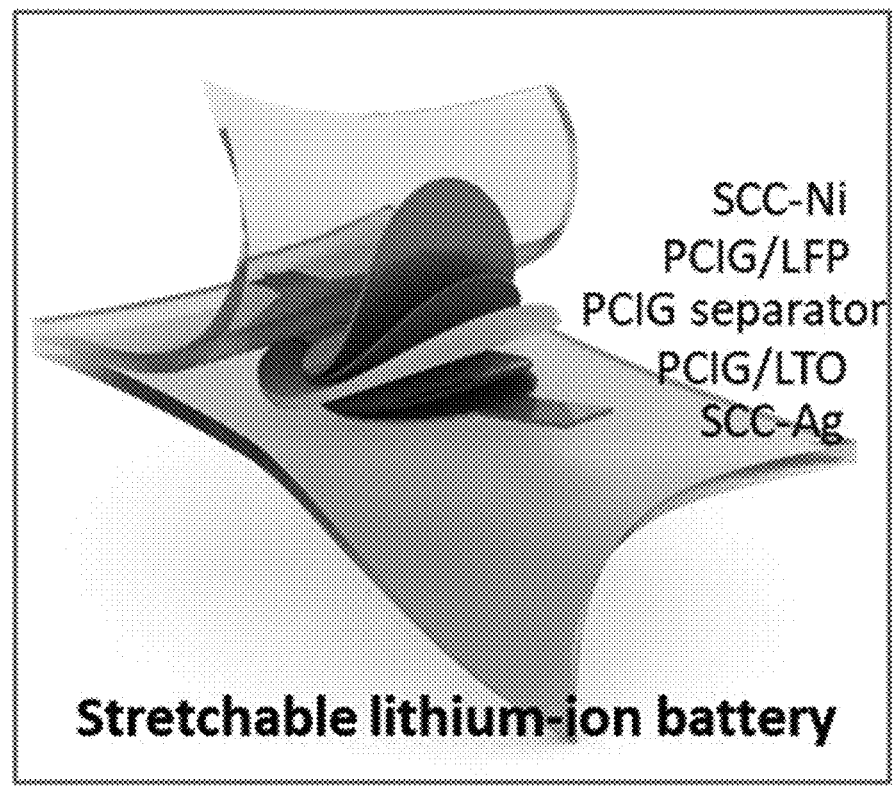
FIGS. 18A to 18E show the schematic diagram of a stretchable battery prepared in Example 2 (FIG. 18A), the charge-discharge curves of the stretchable battery in stretched (black), 50% stretched (red) and released (blue) states at 0.5 C (FIG. 18B), the capacity and coulombic efficiency of the stretchable battery at 0.5 C for 70 cycles (FIG. 18C), the change in capacity under repeated stretching/releasing between 0% strain and 50% strain (FIG. 18D) and the photographs of light-emitting diode lamps using the stretchable battery in various deformed states (FIG. 18E).
Figure 18B:
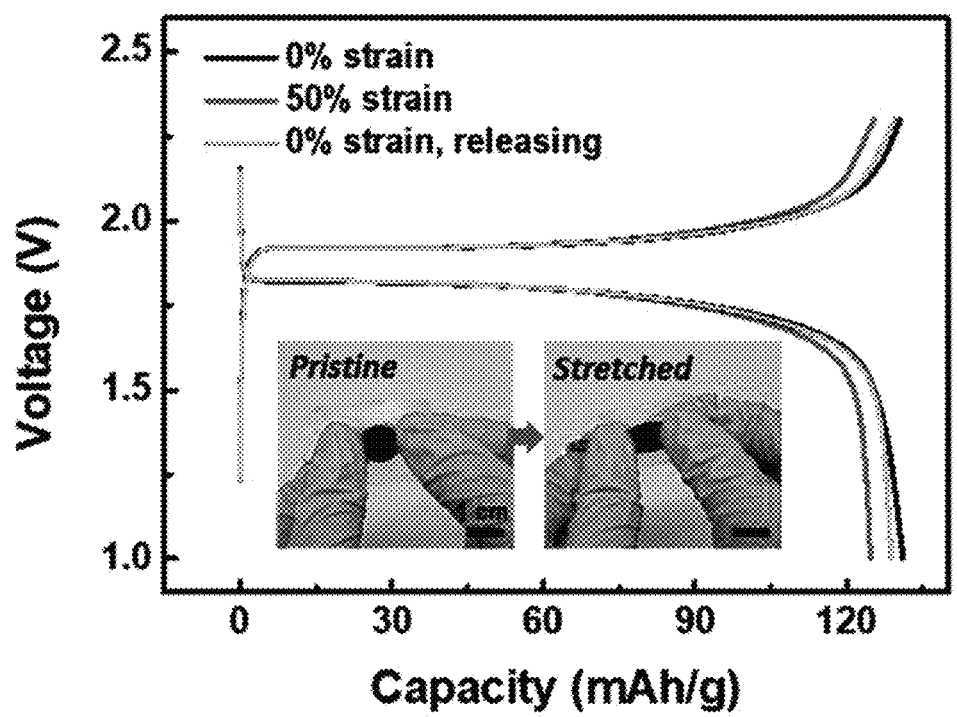
Figure 18C:
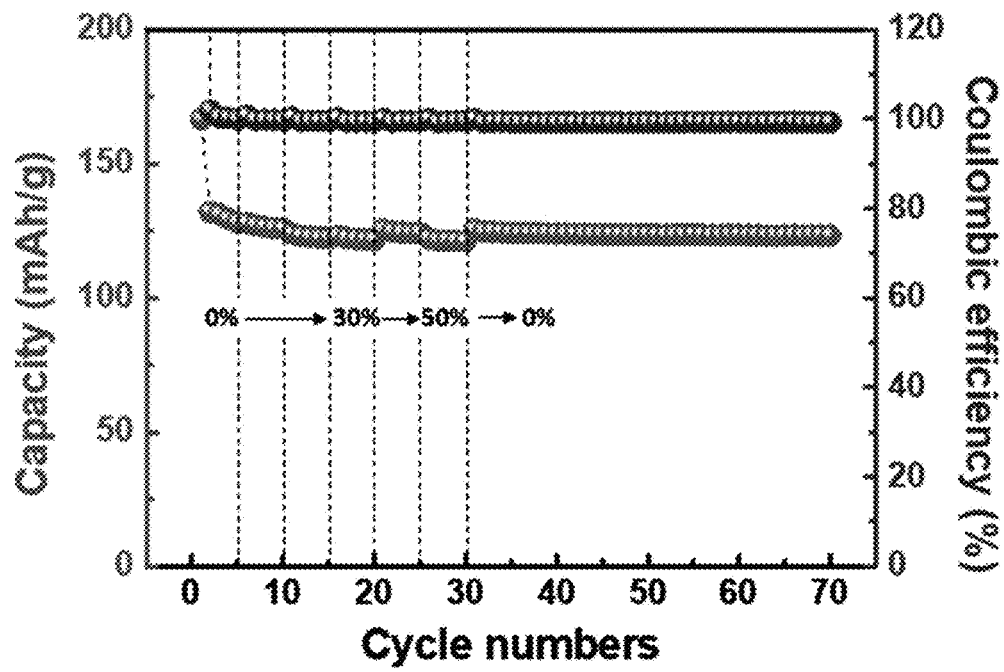
Figure 18D:
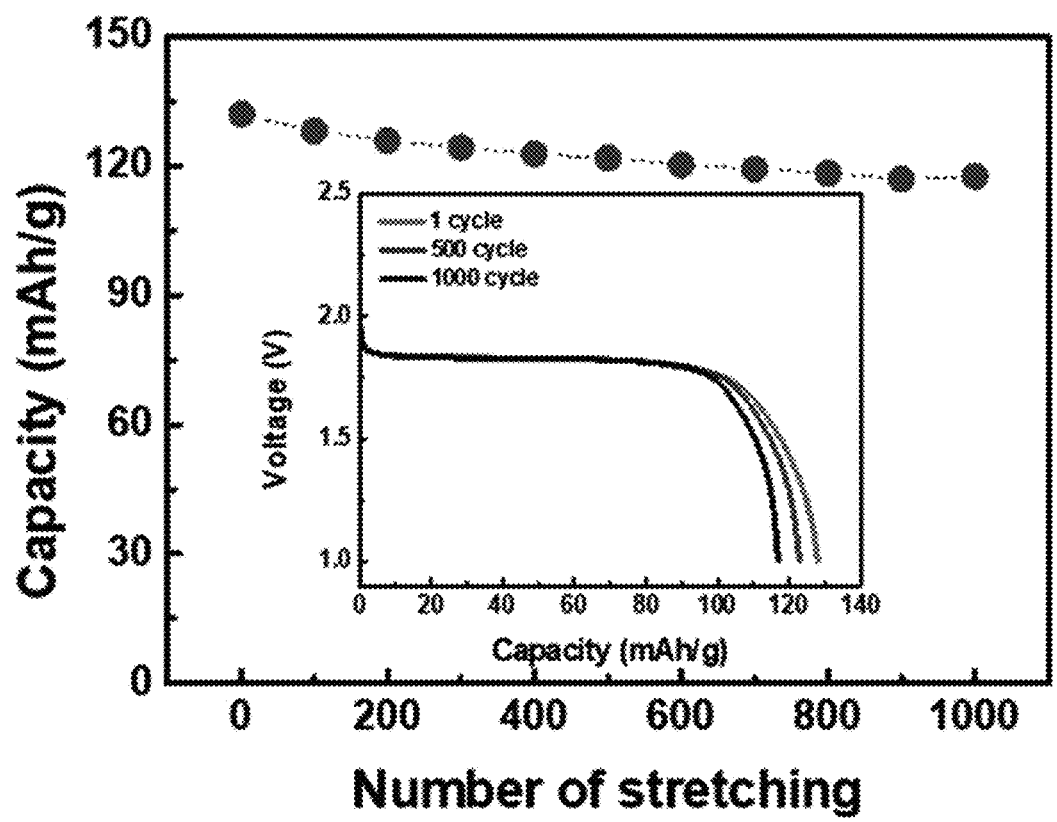
Figure 18E:
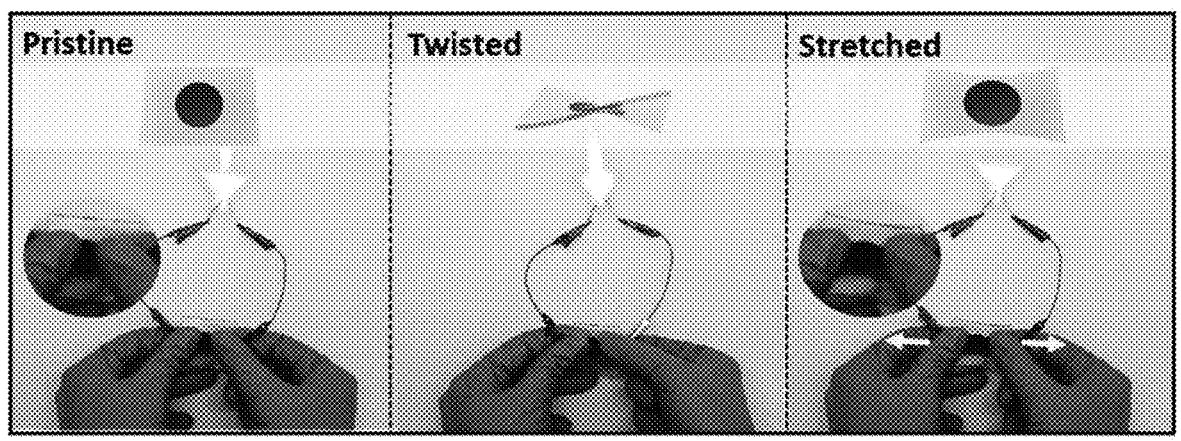

FIGS. 18A to 18E show the schematic diagram of the stretchable battery prepared in Example 2 (FIG. 18A), the charge-discharge curves of the stretchable battery in stretched (black), 50% stretched (red) and released (blue) states at 0.5 C (FIG. 18B), the capacity and coulombic efficiency of the stretchable battery at 0.5 C for 70 cycles (FIG. 18C), the change in capacity under repeated stretching/releasing between 0% strain and 50% strain (FIG. 18D) and the photographs of light-emitting diode lamps using the stretchable battery in various deformed states (FIG. 18E).

Figure 19:
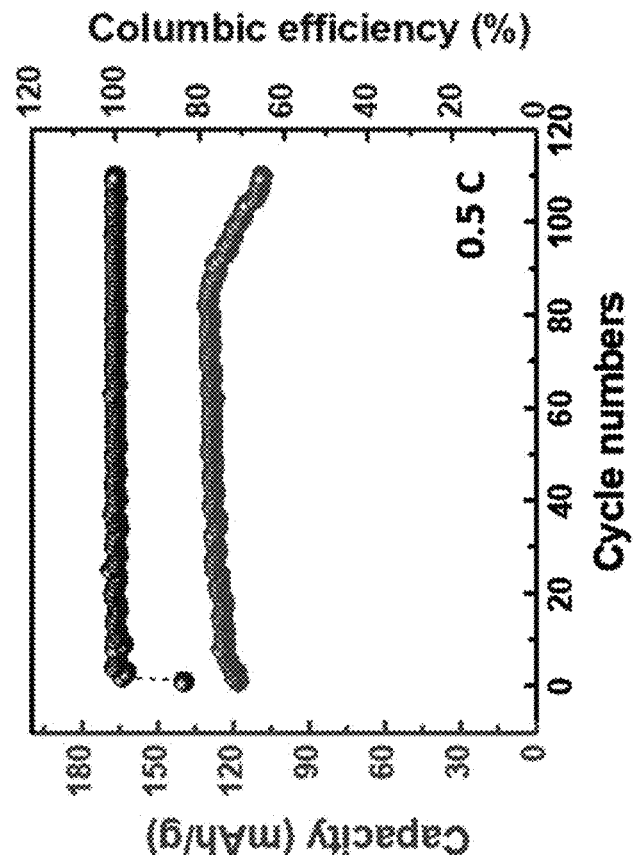
FIG. 19 shows the rate performance, cycle performance and coulombic efficiency of a stretchable battery prepared in Example 2.
Figure 19:
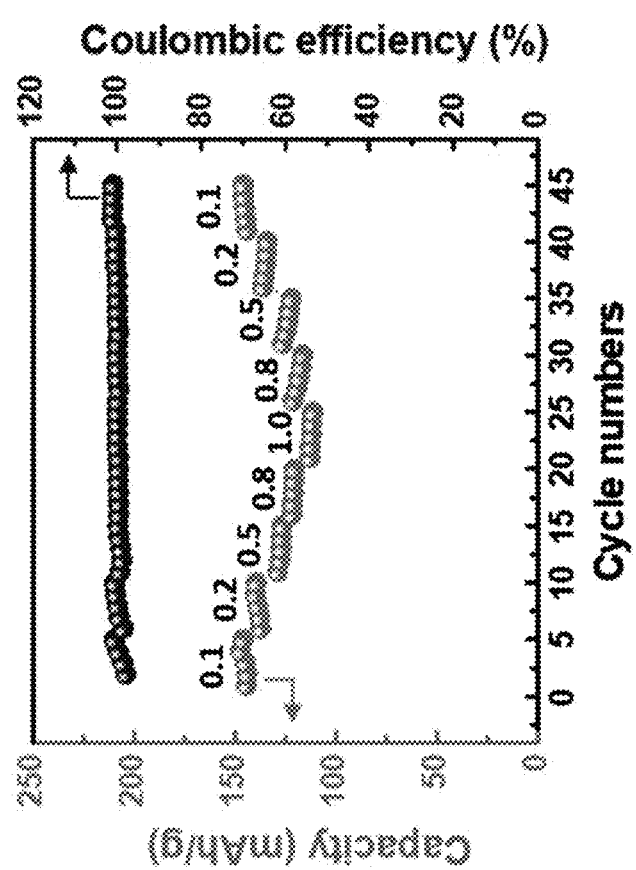

FIG. 19 shows the rate performance, cycle performance and coulombic efficiency of the stretchable battery prepared in Example 2.

Referring to FIG. 18A, the components of the stretchable battery were prepared by a solution doctor blade process and a printable solution process in order to provide a free form factor for a stretchable battery and greatly increase its applicability. The thickness of the negative electrode, the PCOG separator and the positive electrode was 100, 20 and 100 μm, respectively, and the total thickness of the stretchable battery was smaller than 1 mm including the encapsulant layer.

Referring to FIG. 18B, as a result of evaluating the mechanical stability of the stretchable battery in the air, it exhibited a discharge capacity of 131 mAh/g at 0.5 C before stretching and maintained capacities of 124 and 128 mAh/g at 50% strain and recovery to 0% strain, respectively.

Referring to FIG. 18C, when the stretchable battery was tested at various trains from 0% to 50% with 10% intervals at 0.5 C for 5 cycles, the charge-discharge characteristics of the stretchable LIB was hardly changed (92% capacity retained at 50% strain) and showed long-term stability even after 70 cycles.

Referring to FIG. 18D, the stretchable battery showed superior stretchability even after 1,000 repetitions of repeated stretching/releasing at 50% strain and the discharge capacity was maintained at 89% or higher at 0.5 C. In addition, although not shown in FIGS. 18A to 18E, the stretchable battery using the PCIG/graphite negative electrode and the PCIG/LFP positive electrode of Example 4 showed a discharge capacity of 132 mAh/g at 0.5 C and the operation voltage was maintained stably at 3.2-3.35 V.

Referring to FIGS. 18A to 18E and 19, the discharge capacity of the stretchable battery of Example 2 was 144, 137, 128, 121 and 112 mAh/g at 0.1, 0.2, 0.5, 0.8 and 1 C, respectively. In addition, the aerial and volumetric capacities at 0.5 C were 1.5 mAh/cm² and 3.75 mAh/cm³, respectively, and the total thickness of the positive electrode, the negative electrode and the separator of the stretchable battery was 0.4 mm. Furthermore, the aerial and volumetric energy densities of the stretchable battery were 2.3 mWh/cm² and 57.5 mWh/cm³, respectively. In addition, when the long-term stability of the stretchable battery in the air was investigated, it exhibited superior long-term stability with 92% of capacity retention after 110 cycles at 0.5 C in the air, rather than in a glove box.

Test Example 7

Analysis of Electrochemical Performance of Stretchable Battery Under Bending Conditions The electrochemical performance of stretchable lithium-ion batteries prepared using the stretchable electrodes prepared in Examples 2 and 3 was analyzed under various bending conditions. The result is shown in FIGS. 20 and 21.

Figure 20:
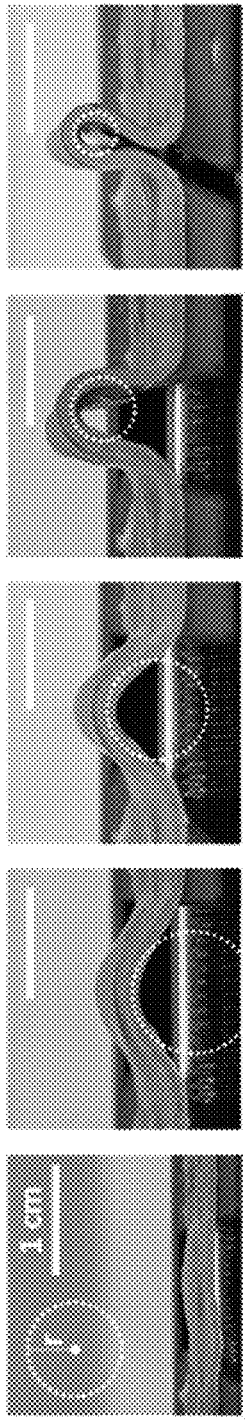
FIG. 20 shows the photographs of a stretchable battery including a PCOG/LFP positive electrode and a PCOG/MCMB negative electrode, prepared in Example 4, under various bending conditions and the charge-discharge performance at 0.5 C.
Figure 20:
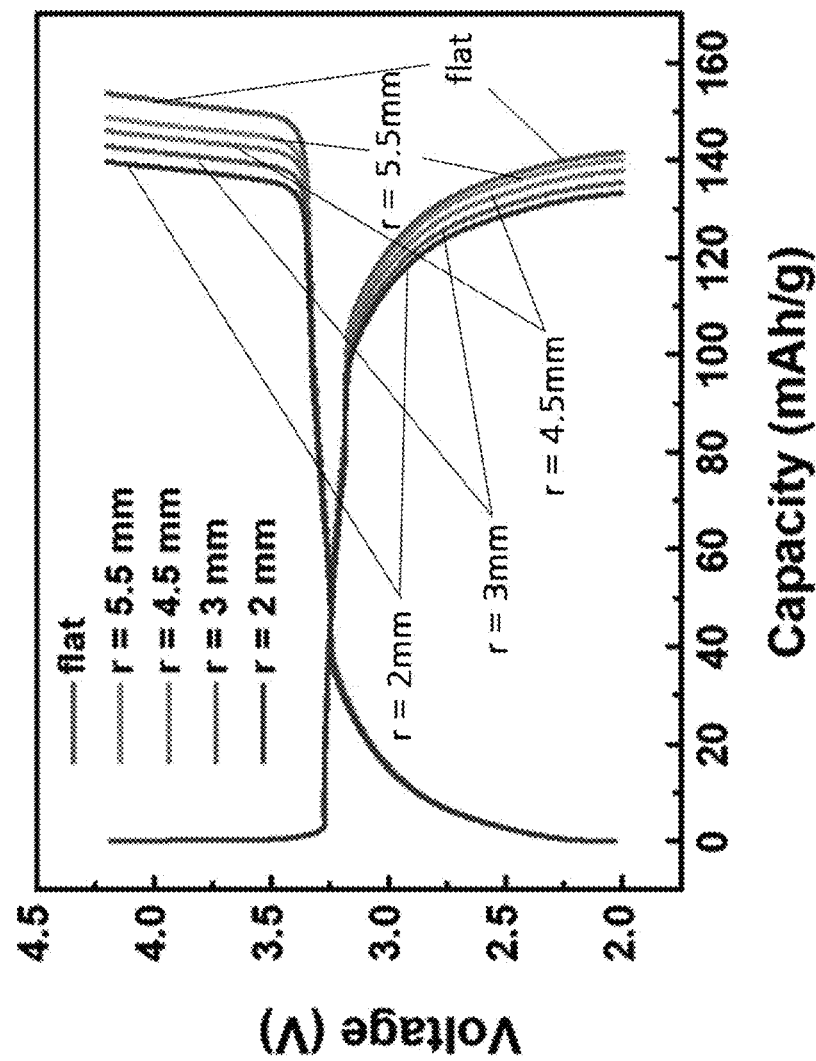

FIG. 20 shows the photographs of the stretchable battery including the PCOG/LFP positive electrode and the PCOG/MCMB negative electrode, prepared in Example 4, under various bending conditions and the charge-discharge performance at 0.5 C. Referring to FIG. 20, the stretchable battery had superior mechanical stability as a result of bending test with a radius of curvature of 2 mm due to the excellent stretchability of the PCOG electrode and the SCC current collector.

Figure 21A:
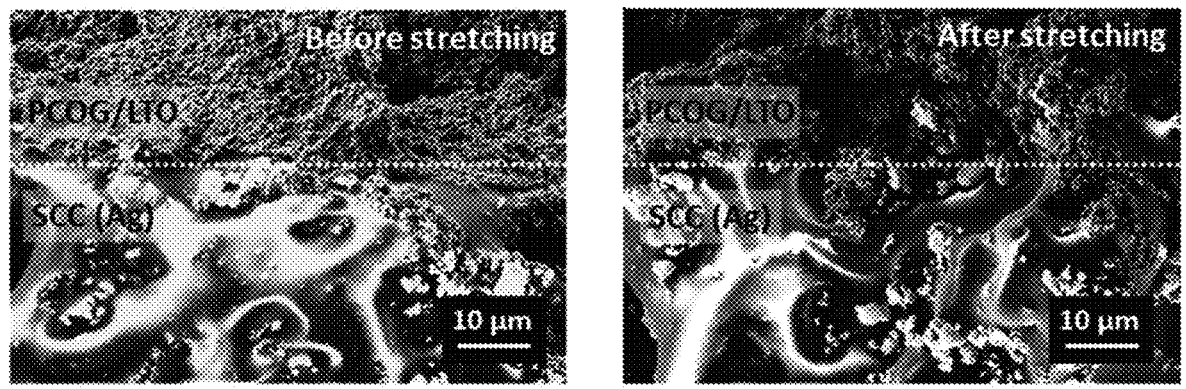
FIGS. 21A and 21B show the SEM images of a PCOG/LTO negative electrode and an SCC-Ag current collector prepared in Example 2 (FIG. 21A) and the interface between the PCOG/LFP positive electrode and the SCC-Ni current collector after 100 repetitions of stretching/releasing at 50% strain (FIG. 21B).
Figure 21B:
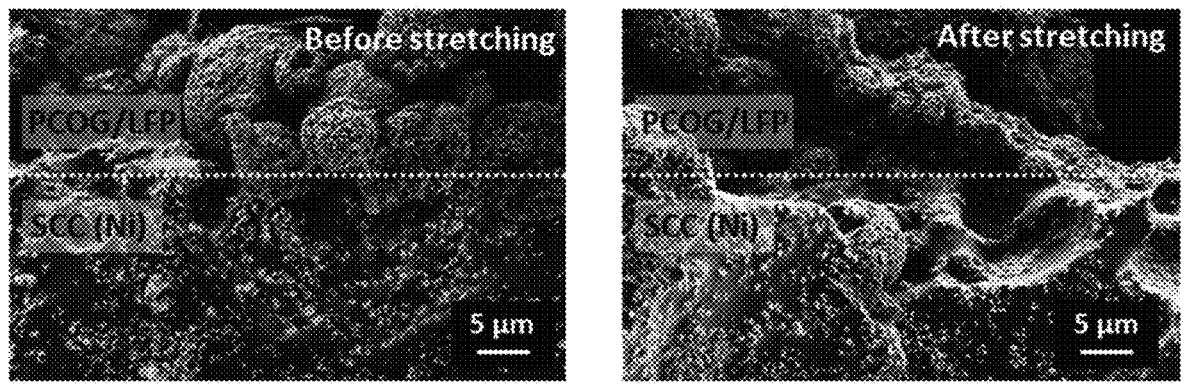

FIGS. 21A and 21B show the SEM images of the PCOG/LTO negative electrode and the SCC-Ag current collector prepared in Example 2 (FIG. 21A) and the interface between the PCOG/LFP positive electrode and the SCC-Ni current collector after 100 repetitions of stretching/releasing at 50% strain (FIG. 21B). Referring to FIGS. 21A and 21B, no peeling or void was observed between the electrode and the SCC even after 100 repeated stretching/releasing cycles at 50%. Through this, it can be seen that the interfacial adhesivity between the electrode active material and the current collector was improved significantly.

Test Example 8

Electrochemical Analysis of Stretchable Lithium-Ion Battery Screen-Printed on Stretchable Fabric The electrochemical performance of the stretchable battery prepared in Example 5 was analyzed. The result is shown in FIGS. 22 to 26.

Figure 22A:
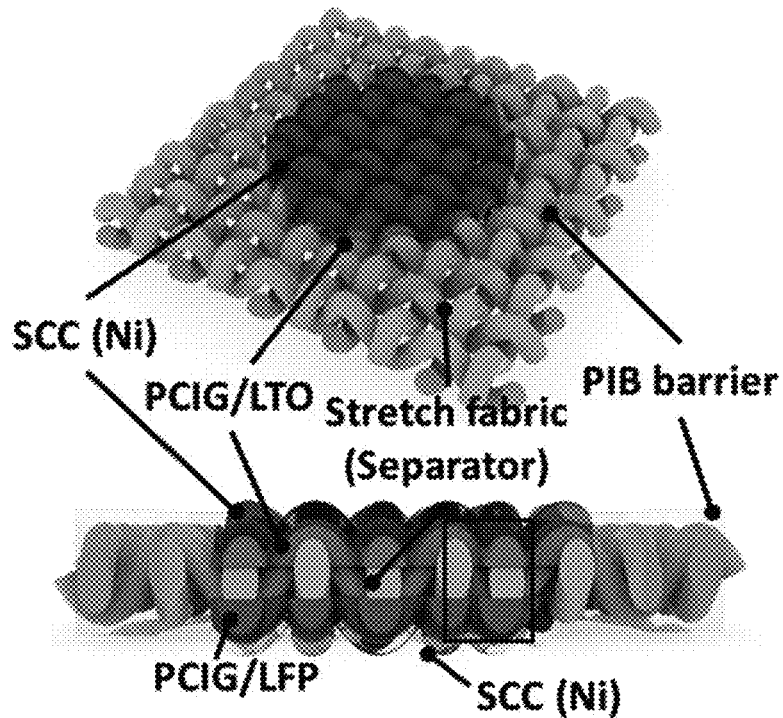
FIGS. 22A to 22E show the schematic diagram of a stretchable battery prepared in Example 5 (FIG. 22A), the cross-sectional scanning electron microscopic image of the stretchable battery printed on a stretchable fabric (FIG. 22B), the change in capacity depending on strain (FIG. 22C), the change in the voltage and current of the stretchable battery printed on an arm sleeve at various deformation angles of the elbow (FIG. 22D), and the photographs of the stretchable lithium-ion battery printed on the stretchable fabric before and after waring and stretching (FIG. 22E).
Figure 22B:
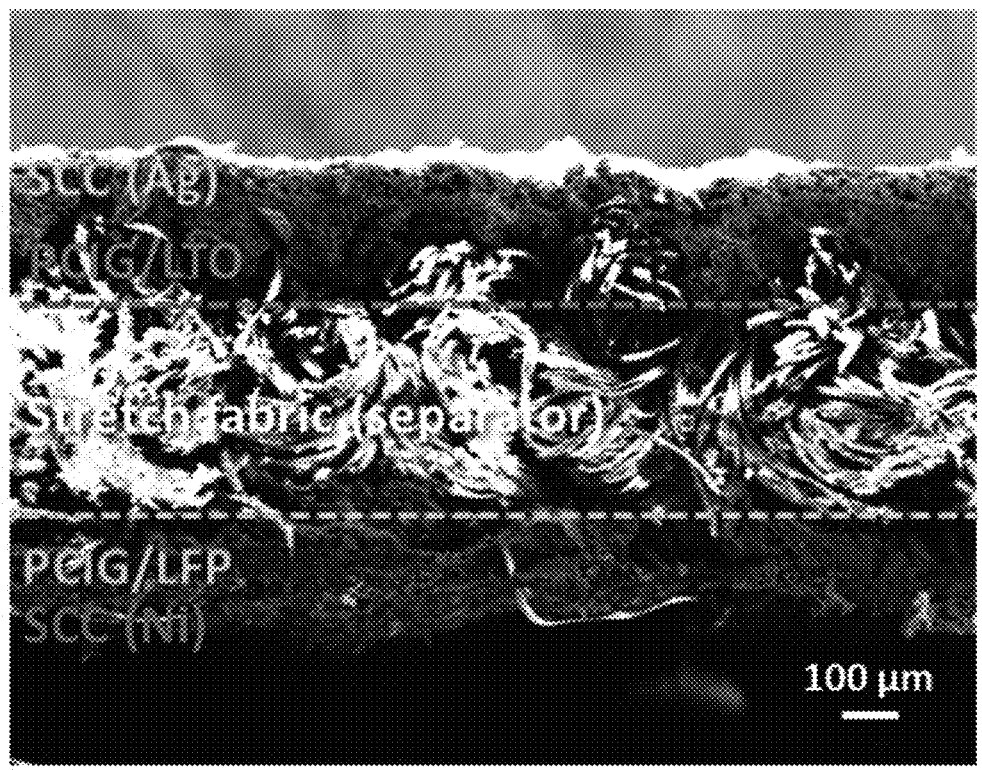
Figure 22C:
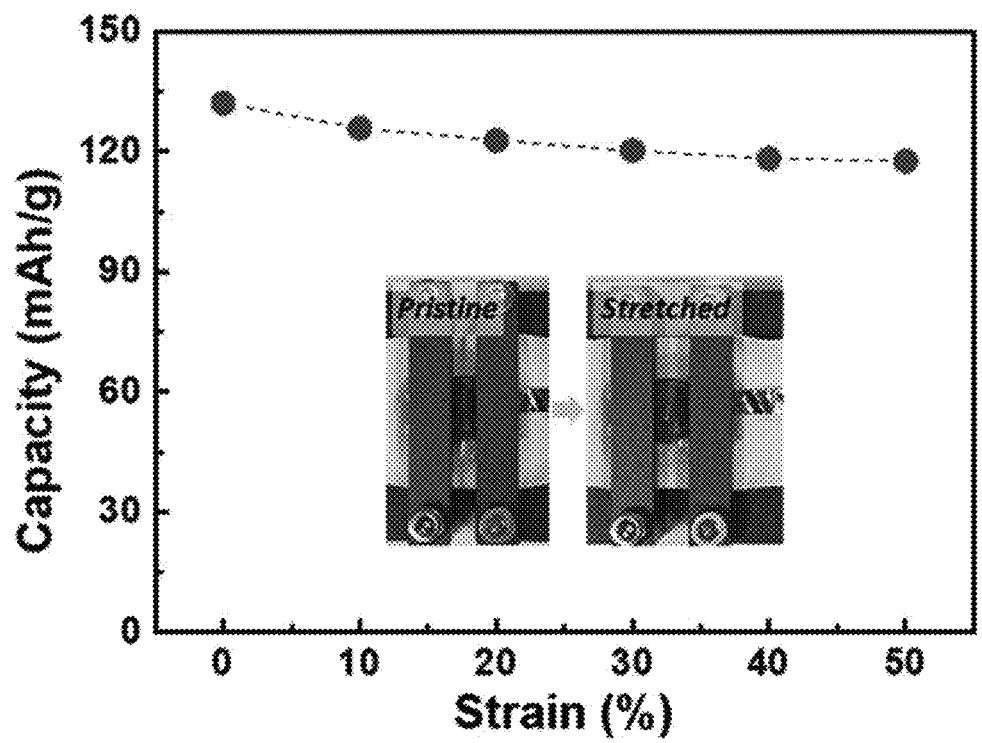
Figure 22D:
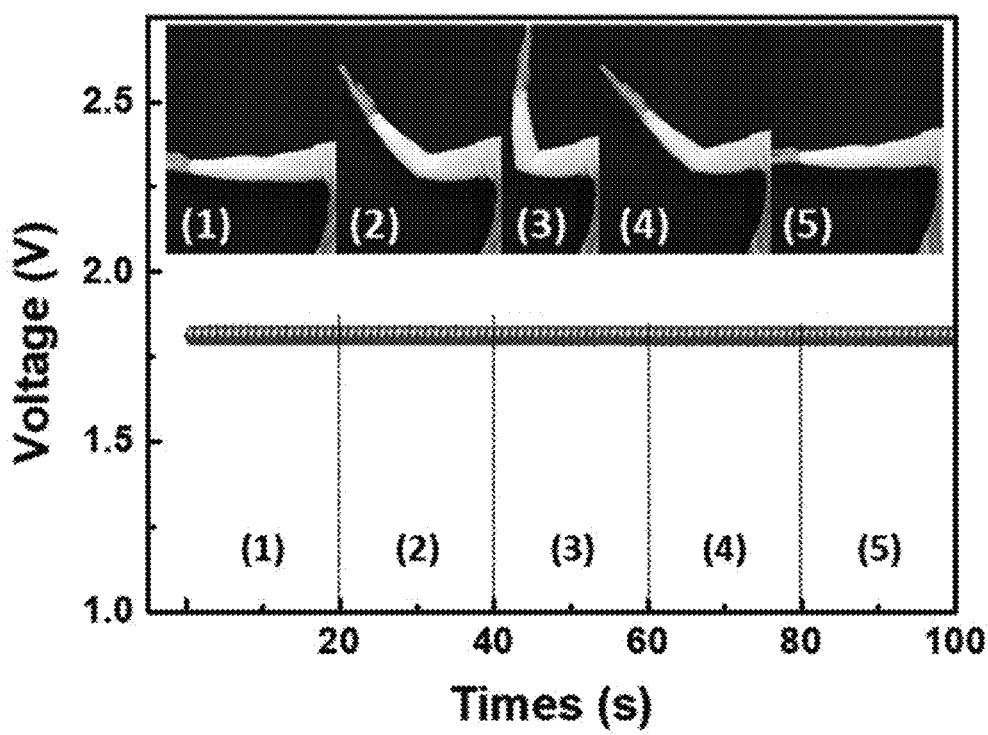
Figure 22E:

FIGS. 22A to 22E show the schematic diagram of the stretchable battery prepared in Example 5 (FIG. 22A), the cross-sectional scanning electron microscopic image of the stretchable battery printed on a stretchable fabric (FIG. 22B), the change in capacity depending on strain (FIG. 22C), the change in the voltage and current of the stretchable battery printed on an arm sleeve at various deformation angles of the elbow (FIG. 22D), and the photographs of the stretchable lithium-ion battery printed on the stretchable fabric before and after waring and stretching (FIG. 22E).

FIG. 22A shows that the stretchable battery consists of a printable stretchable current collector (SCC-Ag, SCC-Ni), a stretchable electrode (PCOG/LFP, PCOG/LTO), a stretchable fabric (separator) and a PBI encapsulant, and the stretchable battery is printed on a stretchable fabric.

FIG. 22B shows that the stretchable fabric itself can act as a stretchable separator and the stretchable electrode and the stretchable current collector (SCC-Ag, SCC-Ni) are screen-printed on both sides. That is to say, the stretchable fabric acts as a separator and the battery is formed by printing and stacking on the stretchable fabric. Then, after sealing the battery with a PIB encapsulant, a 1 M LiPF$_6$ electrolyte was injected into the battery.

Figure 23:
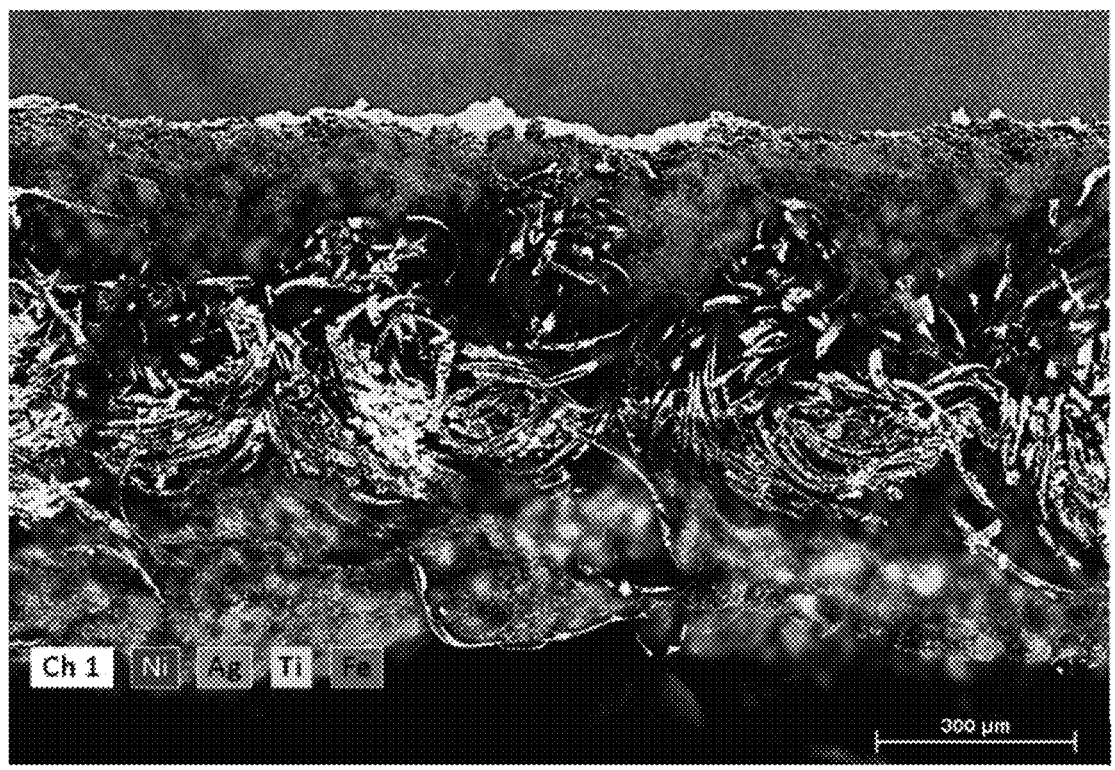
FIG. 23 shows the EDS spectrum of a stretchable battery having an SCC-Ni/PCOG-LFP/stretchable fabric (separator)/PCOG-LTO/SCC-Ag stacking structure, prepared in Example 5.

FIG. 23 shows the EDS spectrum of the stretchable battery having the SCC-Ni/PCOG-LFP/stretchable fabric (separator)/PCOG-LTO/SCC-Ag stacking structure, prepared in Example 5. From the cross-sectional SEM images of FIG. 22B and FIG. 23 and elemental mapping of the stretchable battery, it was confirmed that the 500-μm thick stretchable fabric, PCOG/LFP positive electrode and PCOG/LTO negative electrode were conformally coated with a high mass load (11.7 mg/cm²).

Referring to FIG. 22C, the stretchable battery of Example 5 screen-printed on the stretchable fabric exhibited capacities of 132 and 117 mAh/g at 0% and 50% strain, respectively, and 88% capacity retention at 50% strain. The areal capacity and energy density were 1.54 mAh/cm² and 2.8 mWh/cm², respectively, which were the highest values for an organic-based stretchable battery.

Figure 24:
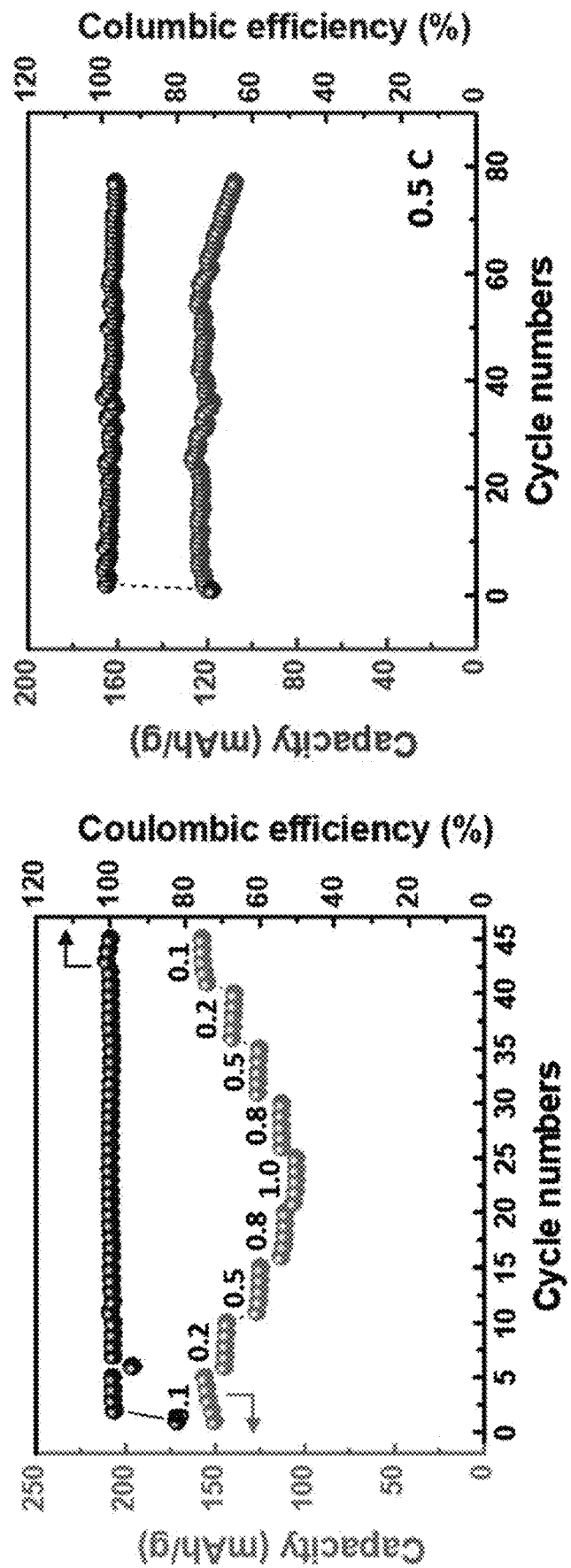
FIG. 24 shows the rate performance and coulombic efficiency of a stretchable battery screen-printed on a stretchable fabric, prepared in Example 5, depending on the number of charge-discharge cycles.

FIG. 24 shows the rate performance and coulombic efficiency of the stretchable battery screen-printed on the stretchable fabric, prepared in Example 5, depending on the number of charge-discharge cycles. Referring to FIG. 24, it was confirmed that the stretchable fabric can effectively act as a stretchable support and a battery separator through electrolyte uptake (>300%). In addition, the stretchable fabric-based stretchable battery maintained a coulombic efficiency close to 100% despite the increased number of charge-discharge cycles, and exhibited superior long-term stability with 90% capacity retention during 80 cycles at 0.5 C in the air. Through this, it can be seen that the stretchable fabric-based stretchable battery is stable against mechanical deformation since the components and the printed electrode are firmly attached to the stretchable fabric, and exhibits high performance, small capacity change, and long-term stability in the air.

Figure 25:
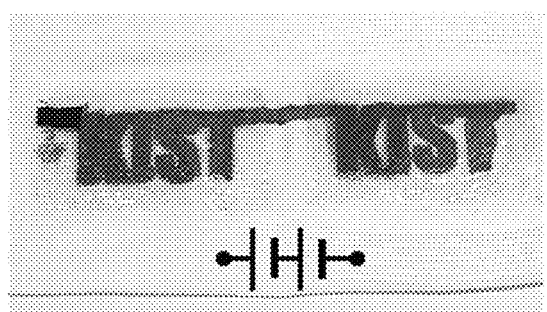
FIG. 25 shows the photograph of a stretchable battery with a logo printed on a stretchable fabric, prepared in Example 5, and the dimension of the pattern of an electrode.
Figure 25:
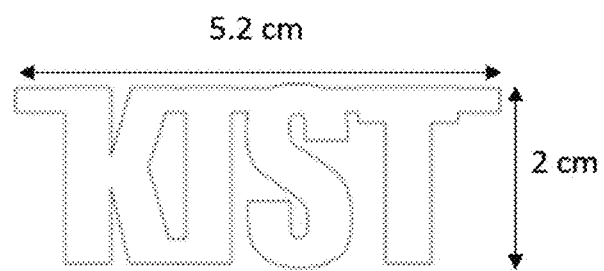

FIG. 25 shows the photograph of the stretchable battery with a logo printed on a stretchable fabric, prepared in Example 5, and the dimension of the pattern of the electrode.

Figure 26:
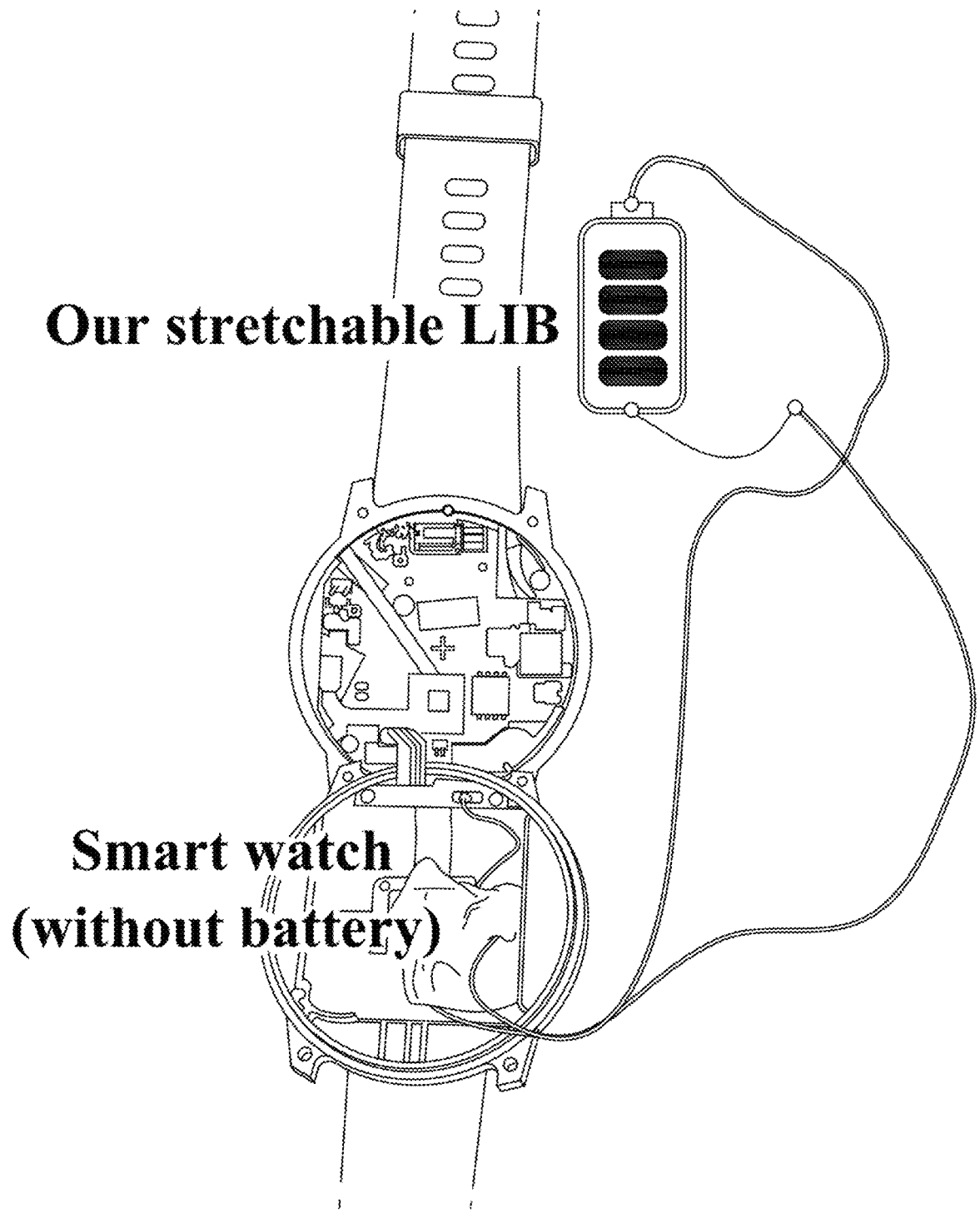
FIG. 26 shows the photograph of a disassembled smartwatch without a stretchable battery prepared in Example 5.

FIG. 26 shows the photograph of a disassembled smartwatch without a stretchable battery prepared in Example 5.

Referring to FIGS. 22D and 22E and FIGS. 25 and 26, as a result of measuring discharge voltage of the stretchable LIB prepared on a stretchable arm sleeve fabric with a size of 5.2×2 cm² at various elbow bending angles, the voltage was hardly changed despite the large change in the elbow bending angle. Two stretchable batteries printed on the stretchable arm sleeve were connected in series. They could successfully power the smartwatch (operating at 3.7 V) under various deformations such as donning, taking off, stretching and bending of the elbow. Through this, it can be seen that a stretchable battery using a PCOG-based electrode, an SCC current collector, a stretchable separator and an encapsulant has superior mechanical stability and can be used in a wearable and skin-attachable electronic device as an integrated energy storage device.

As described above, the stretchable battery of the present disclosure, which includes an electrode, a current collector, a separator and an encapsulant, is printable and has superior stretchability. Specifically, the stretchable batteries prepared in Examples 2-5 exhibited superior energy storage performance with a capacity of 130 mAh/g at 0.5 C under 50% strain, and showed stable electrochemical performance even after 1000 repeated stretching/releasing cycles under various deformations in the air.

In particular, the introduction of the fluorine-based polymer binder of a physically crosslinked organogel (PCOG) to the electrode and the separator allowed easier access to the electrolyte and resulted in improved stability and adhesivity. Therefore, stretchability and interfacial adhesivity can be conferred to the existing binder material having high ion conductivity, which is used in the existing LIB. In addition, by introducing a stretchable current collector and using an ink-based printing technique, the freedom of battery structure can be improved greatly, such as direct printing on a substrate or next to another stretchable active device, or building of a 3D interdigitated structure and a stacking structure.

Since the stretchable battery of the present disclosure has superior stretchability, exhibits superior speed performance under high mass load due to the use of printable components, it can have superior areal capacity and energy density comparable to those of an unstretchable battery. In addition, stretchable batteries of various shapes can be prepared through printing using various materials and they can retain stability and mechanical stability for a long time in deformed state even after repeated stretching/releasing cycles.

Finally, the stretchable battery of the present disclosure can be printed directly on a stretchable fabric. The stretchable battery printed on the stretchable fabric can retain high specific capacity and areal energy density and can exhibit superior mechanical stability for use of in a wearable watch. Through this, the stretchable and printable battery can make a promising platform for a free-from stretchable battery due to the possibility of use of various materials, the flexibility of structural form factors and the energy storage performance comparable to that of an unstretchable battery. In addition, it can be used for a next-generation wearable or implantable electronic device.

What is claimed is:

1. A method for preparing a stretchable electrode, comprising:
    preparing a mixture by mixing a fluorine-based polymer binder in a Fenton's reagent solution to form a hydroxyl-functionalized fluorine-based polymer binder by Fenton's oxidation;
    recovering the hydroxyl-functionalized fluorine-based polymer binder from the mixture;
    preparing a fluorine-based polymer binder solution by dissolving the hydroxyl-functionalized fluorine-based polymer binder in a ketone-based solvent;
    preparing an electrode slurry comprising an electrode active material, a conductor and a carbonate solvent or an ionic liquid in the fluorine-based polymer binder solution;
    preparing a stretchable current collector comprising a matrix polymer, a conductive particle and a carbon material; and
    preparing a stretchable electrode by coating the electrode slurry on the stretchable current collector and then drying the same.

2. The method for preparing a stretchable electrode according to claim 1, wherein the fluorine-based polymer binder is one or more selected from a group consisting of poly(vinylidene fluoride) (PVDF), poly(vinylidene fluoride-co-hexafluoropropylene) (PVDF-HFP) and poly(vinylidene fluoride-co-tetrafluoroethylene) (PVDF-TFE).

3. The method for preparing a stretchable electrode according to claim 1, wherein the Fenton's reagent solution is a mixture of ferrous sulfate hydrate ($FeSO_4 \cdot 7H_2O$) and hydrogen peroxide.

4. The method for preparing a stretchable electrode according to claim 1, wherein the ketone-based solvent is one or more selected from a group consisting of acetone, methyl ethyl ketone, methyl isobutyl ketone, methyl butyl ketone, diethyl ketone, cyclopentanone and cyclohexanone.

5. The method for preparing a stretchable electrode according to claim 1, wherein the carbonate solvent is one or more selected from a group consisting of ethylene carbonate, diethyl carbonate, dimethyl carbonate, ethyl methyl carbonate and propylene carbonate.

6. The method for preparing a stretchable electrode according to claim 1, wherein the ionic liquid is formed from bonding of a cation selected from a group consisting of an imidazolium-based cation, a pyrrolidinium-based cation, a piperidinium-based cation, an ammonium-based cation and a phosphonium-based cation and an anion selected from a group consisting of tetrafluoroborate ($BF_4^-$), bis(trifluoromethanesulfonyl)imide ($TFSI^-$), bis(fluorosulfonyl)imide ($FSI^-$) and hexafluorophosphate ($PF_6^-$).

7. The method for preparing a stretchable electrode according to claim 1, wherein the electrode active material is a positive electrode active material or a negative electrode active material.

8. The method for preparing a stretchable electrode according to claim 7, wherein
the positive electrode active material is one or more selected from a group consisting of LiFePO$_4$ (LFP), LiMnPO$_4$ (LMP), LiMn$_2$O$_4$ (LMO), Li[Ni$_x$Co$_{(1-x)/2}$Mn$_{(1-x)/2}$]O$_2$ (0.1≤x≤1) (NCM), LiCoO$_2$ (LCO), Li[Ni$_{1-x-y}$Co$_x$Al$_z$]O$_2$ (0.01≤x≤0.5, 0.01≤y≤0.3, 0.01≤z≤0.2) (NCA) and Li[Ni$_{0.89}$Co$_{0.05}$Mn$_{0.05}$Al$_{0.01}$]O$_2$ (NCMA), and
the negative electrode active material is one or more selected from a group consisting of Li$_4$Ti$_5$O$_{12}$ (LTO), graphite and mesocarbon microbeads (MCMBs).

9. The method for preparing a stretchable electrode according to claim 1, wherein the conductor is one or more selected from a group consisting of carbon black, acetylene black, carbon nanotube, and graphene.

10. The method for preparing a stretchable electrode according to claim 1, wherein
the fluorine-based polymer binder solution, the electrode active material and the conductor are mixed at a weight ratio of 10-30:63-75:1-10 in the electrode slurry, and
the carbonate solvent or the ionic liquid is mixed at a weight ratio of 1:0.1-10 based on the content of solid components comprising the fluorine-based polymer binder solution, the electrode active material and the conductor.

11. The method for preparing a stretchable electrode according to claim 1, wherein
the matrix polymer is one or more selected from a group consisting of polyisobutylene, a polystyrene-polyisobutylene-polystyrene block copolymer, a polystyrene-polyisoprene-polystyrene block copolymer, a polystyrene-polybutadiene-polystyrene block copolymer, a polystyrene-polyethylene-butylene-polystyrene block copolymer, ethylene-vinyl acetate and butyl rubber,
the carbon material is one or more selected from a group consisting of multi-walled carbon nanotube, single-walled carbon nanotube, double-walled carbon nanotube, carbon black, and conductive carbon, and
the conductive particle is one or more selected from a group consisting of Ag, Ni, Co, Fe, Au, Pt, Ru, Rh, Os, Ir, Pd and stainless steel.

12. The method for preparing a stretchable electrode according to claim 11, wherein the conductive particle is a mixture of a first metal particle, a second metal particle and a third metal particle at a weight ratio of 1-3:2-4:4-6.

13. The method for preparing a stretchable electrode according to claim 12, wherein the first metal particle has a particle size of 50-200 nm, the second metal particle has a particle size of 0.1-5 μm, and the third metal particle has a particle size of 1-100 μm.

14. The method for preparing a stretchable electrode according to claim 1, wherein
the fluorine-based polymer binder is poly(vinylidene fluoride), poly(vinylidene fluoride-co-hexafluoropropylene) or a mixture thereof,
the ketone-based solvent is acetone, methyl ethyl ketone or a mixture thereof,
the carbonate solvent is ethylene carbonate, diethyl carbonate or a mixture thereof,
the conductive particle is a mixture of a first metal particle, a second metal particle and a third metal particle at a weight ratio of 1.5-2.5:2.5-3.7:4.2-5.6, and
the first metal particle has a particle size of 80-170 nm, the second metal particle has a particle size of 0.9-4.2 μm, and the third metal particle has a particle size of 4-60 μm.

15. The method for preparing a stretchable electrode according to claim 14, wherein
the Fenton's reagent solution is a mixture of ferrous sulfate hydrate (FeSO$_4$·7H$_2$O) and hydrogen peroxide,
the fluorine-based polymer binder is poly(vinylidene fluoride),
the ketone-based solvent is acetone,
the carbonate solvent is ethylene carbonate,
the electrode active material is a positive electrode active material or a negative electrode active material,
the positive electrode active material is LiFePO$_4$ (LFP) and the negative electrode active material is Li$_4$Ti$_5$O$_{12}$ (LTO),
the conductor is a carbon black,
the electrode slurry is a mixture of fluorine-based polymer binder in gel form or having a network structure, the electrode active material and the conductor at a weight ratio of 24-26:67-70:6-8,
the matrix polymer is polyisobutylene,
the conductive particle is Ag or Ni,
the conductive particle is a mixture of a first metal particle, a second metal particle and a third metal particle at a weight ratio of 1.8-2.2:2.9-3.3:4.6-5.3,
the first metal particle has a particle size of 100-150 nm, the second metal particle has a particle size of 1-3.5 μm, and the third metal particle has a particle size of 5-50 μm, and
the carbon material is multi-walled carbon nanotube.

16. A method for preparing a stretchable electrode, comprising:
preparing a mixture by mixing a fluorine-based polymer binder in a Fenton's reagent solution to form a hydroxyl-functionalized fluorine-based polymer binder by Fenton's oxidation;
recovering the hydroxyl-functionalized fluorine-based polymer binder from the mixture;
preparing a fluorine-based polymer binder solution by mixing the hydroxyl-functionalized fluorine-based polymer binder with a crosslinking agent;
preparing an electrode slurry comprising an electrode active material, a conductor and a carbonate solvent or an ionic liquid in the fluorine-based polymer binder solution;
preparing a stretchable current collector comprising a matrix polymer, a conductive particle and a carbon material;
coating the electrode slurry on the stretchable current collector and then drying the same; and
preparing a stretchable electrode having a crosslinked network structure through heat treatment or UV irradiation of the stretchable current collector having the electrode slurry coated and dried.

17. The method for preparing a stretchable electrode according to claim 16, wherein the crosslinking agent is one or more selected from a group consisting of a bisphenol-based crosslinking agent, a peroxide-based crosslinking agent, a polyamine-based crosslinking agent, a triazine-based crosslinking agent, an oxazole-based crosslinking agent, an imidazole-based crosslinking agent, an azide-based crosslinking agent and a thiazole-based crosslinking agent.

* * * * *